(12) United States Patent
Dereszynski et al.

(10) Patent No.: US 10,169,221 B2
(45) Date of Patent: Jan. 1, 2019

(54) METHOD AND SYSTEM FOR WEB-SITE TESTING

(71) Applicant: WEBTRENDS, INC., Portland, OR (US)

(72) Inventors: Ethan Dereszynski, Portland, OR (US);
Peter Crossley, Portland, OR (US);
Spencer Wood, Portland, OR (US);
Dean C. Kimball, Renton, WA (US)

(73) Assignee: ACCELERATE GROUP LIMITED, Leatherhead (GB)

( * ) Notice: Subject to any disclaimer, the term of this patent is extended or adjusted under 35 U.S.C. 154(b) by 54 days.

(21) Appl. No.: 15/432,110

(22) Filed: Feb. 14, 2017

(65) Prior Publication Data

US 2017/0168924 A1 Jun. 15, 2017

Related U.S. Application Data

(63) Continuation-in-part of application No. 14/094,397, filed on Dec. 2, 2013, now abandoned, which is a continuation of application No. 12/507,765, filed on Jul. 22, 2009, now Pat. No. 8,627,288.

(60) Provisional application No. 61/135,572, filed on Jul. 22, 2008.

(51) Int. Cl.
*G06F 11/36* (2006.01)
*H04L 12/26* (2006.01)
*G06F 17/30* (2006.01)

(52) U.S. Cl.
CPC ...... *G06F 11/3688* (2013.01); *G06F 11/3684* (2013.01); *G06F 17/3089* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 8,756,579 B1 * | 6/2014 | Colton | G06F 11/3624 717/124 |
| 9,400,774 B1 | 7/2016 | Kim et al. | |
| 2003/0145316 A1 * | 7/2003 | McKinlay | G06F 8/61 717/173 |

(Continued)

OTHER PUBLICATIONS

International Search Report, dated Apr. 28, 2017.

*Primary Examiner* — Isaac T Tecklu
(74) *Attorney, Agent, or Firm* — Meunier Carlin & Curfman LLC

(57) ABSTRACT

The current document is directed to methods and systems for testing web sites. In certain implementations of the methods and systems, a testing service collects customer page-access and conversion information on behalf of a web site. The testing service is straightforwardly accessed and configured, through a web-site-based user interface, and is virtually incorporated into the web site by simple HTML-file modifications. A more efficient web-site-testing system nonuniformly distributes web-site accesses among web-page variants in order to more quickly and computationally efficiently determine a most effective web-page variant among a set of tested web-page variants. In certain implementations, non-uniform distribution of web-site accesses among web-page variants is facilitated by a Bayesian-inference method.

19 Claims, 57 Drawing Sheets

(56) References Cited

U.S. PATENT DOCUMENTS

| | | | | |
|---|---|---|---|---|
| 2004/0199818 | A1* | 10/2004 | Boilen | G06F 11/36 714/25 |
| 2007/0271352 | A1* | 11/2007 | Khopkar | G06Q 30/02 709/217 |
| 2008/0127097 | A1* | 5/2008 | Zhao | G06F 11/3664 717/124 |
| 2009/0100345 | A1* | 4/2009 | Miller | G06F 11/3688 715/738 |
| 2010/0064281 | A1* | 3/2010 | Kimball | H04L 41/0853 717/124 |
| 2010/0205523 | A1* | 8/2010 | Lehota | G06F 17/30905 715/235 |
| 2010/0287229 | A1* | 11/2010 | Hauser | G06F 21/316 709/203 |
| 2011/0224946 | A1* | 9/2011 | Brayman | G06F 11/3419 702/176 |
| 2011/0246511 | A1* | 10/2011 | Smith | G06F 17/3089 707/769 |
| 2011/0307799 | A1* | 12/2011 | Aronov | G06F 11/3688 715/744 |
| 2012/0174075 | A1* | 7/2012 | Carteri | G06F 11/3688 717/127 |
| 2012/0265824 | A1* | 10/2012 | Lawbaugh | G06F 11/3664 709/206 |
| 2012/0278741 | A1* | 11/2012 | Garrity | G06Q 10/10 715/760 |
| 2014/0189714 | A1* | 7/2014 | Lawbaugh | H04L 41/0253 719/313 |
| 2014/0351796 | A1* | 11/2014 | Gur-esh | G06F 11/3604 717/126 |
| 2015/0154102 | A1* | 6/2015 | Kimball | H04L 41/0853 717/131 |
| 2015/0254328 | A1* | 9/2015 | Dereszynski | G06Q 30/0277 707/739 |
| 2017/0344530 | A1* | 11/2017 | Krasadakis | G06F 17/241 |

* cited by examiner

```
<!DOCTYPE html PUBLIC "-//W3C//DTD XHTML 1.0 Transitional//EN" "http://www.w3.org/TR/xhtml1/DTD/xhtml1-transitional.dtd">
<html xmlns="http://www.w3.org/1999/xhtml">
<head>
  <meta http-equiv="Content-Type" content="text/html ; charset=UTF-8" />
  <title>Demo Web Site Confirmation | Widemile Optimization Platform</title>
  <style type="text/css">
  Body  { margin:   0; padding:  0; background:  #b3b3b3; text-align:center;  } img{ border:none; }
  #container{ background: #fff url (images/demo_site_bg.jpg) no-repeat 0 0; margin:36px auto;/*center*/height:660px; width:952px; }
  #header{ padding:24px 24px 0 24px;  }
  #left{ float:left; width:369px; margin:36px 0px 0px 24px;   }    *    >  #left   {margin:36px 0px 48px;   }/*reset ie6 double margin bug*/
  #right{ float:right; width:459px; margin:36px 24px 0px 0px;  }   *    >  #right  {margin:36px 48px 0px 0px;  }/*reset ie6 double margin bug*/
  #button{ margin:36px 0px;  }
  </style>
  <!--insert: Widemile Optimization Platform Client Library  -->
  <script type="text/javascript" src="http://www.widemile.com/js/wm_capi.js"></script>
</head>
<body>
<!-- insert: Widemile conversion Tracking Code -->
<script type="text/javascript"> WM.setup();</script>
<div id="main_ext">
  <div id="container">
    <div id="header">
    <div id="headliner">
        <img src="images/demo_site_confimration_hd.jpg" alt="Confirmation" />
    </div>
    <div id="left">
    <div id="hero">
        <img src="images/demo_site_confimration_hs.jpg" alt="" />
    </div>
    </div>
    <div id="right">
    <div id="offer">
        <img src="images/demo_site_confirmation_offer.jpg" alt="Thank You" / >
    </div>
    <div id="button">
        <a href="index.htm">
            <img src="images/demo_site_confirmation_btn.jpg" alt="Home Button" />
        </a>
    </div>
    </div>
</div>
</body>
</html>
```

Figure 3

| | factor 1 | factor 2 | factor 3 | factor 4 |
|---|---|---|---|---|
| level 1 | I DO LEGAL STUFF FOR YOU, REALLY | BOB'S LEGAL SERVICES | | BILL ME NOW |
| level 2 | I'M YOUR PIT BULL, BABY | HONEST BOB'S LEGAL SERVICES | | BILL ME HONESTLY NOW |
| level 3 | HEY, POINT ME AND I'LL BITE | CHECKS-IN-THE-MAIL LEGAL SERVICES | | TAKE MY DOUGH |
| level 4 | I'M YOUR GREAT WHITE SHARK | PREDATOR FOR HIRE | | BILL ME NOW AND FOREVER |
| level 5 | CONTRACTS, LICENSES, NON-ADVERSARIAL LITIGATION | | | BILL ME SHAMELESSLY |
| level 6 | I DO ANYTHING FOR MONEY | | | |

Figure 7

```
<!DOCTYPE html PUBLIC "-//W3C//DTD XHTML 1.0 transitional//EN" "http://www.w3.org/TR/xhtml1/DTD/xhtml1-transitional.dtd">
<html xmlns="http://www.w3.org/1999/xhtml">
<head>
<meta http-equiv="Content-Type" content="text/html ; charset=UTF-8" />
<title>Demo Web Site: Landing Page walkthrough | Widemile Optimization Platform</title>
<style type="text/css">
body { margin: 0; padding: 0; background: #b3b3b3; text-align:center; } img{ border:none; }
#container{ background: #fff url(images/demo_site_bg.jpg) no-repeat 0 0; margin:36px auto;/*center*/ height:660px; width:952px; }
#header{ padding:24px 24px 0 24px; }
#left{ float:left; width:369px; margin:36px 0px 24px; } * > #left { margin:36px 0px 0px 48px; }/*reset ie6 double margin bug*/
#right{ float:right; width:459px; margin:36px 24px 0px 0px; } * > #right { margin:36px 48px 0px 0px; }/*reset ie6 double margin bug*/
#wm_offer{ margin:36px 0px; }
</style>
<!-- insert: Widemile Optimization Platform Client Library -->
<script type="text/javascript" src=:"http://www.widemile.com/js/wm_capi.js"></script>     ──── 1402
</head>
<body>
<!-- insert: Widemile PageView Tracking Code -->
<script type="text/javascript">WM.setup();</script>
<div id="main_ext">                                                                       ──── 1404
    <div id="container">
        <div id="header">
            <div id="wm_headline">
                <img src="images/demo_site_hd_green.jpg" alt="Green Headline 1" />
            </div>
        </div>
        <div id="left">
            <div id="wm_hero">
                <img src="images/demo_site_hs_green.jpg" alt="Green Hero 1" />
            </div>
        </div>
        <div id="right">
            <div id="wm_offer">
                <img src="images/demo_site_offer_green.jpg" alt="Green Offer 1" />
            </div>
            <a href="conversion.htm"><div id="wm_button">
                <span id="wm_INSERT_BUTTON">
                    <img src="images/demo_site_btn_green.jpg" alt="Green Button 1" />
                </span>
            </div></a>
        </div>
    </div>
</div>
</body>
</html>
```

Figure 14 simplecapi.js

```
//modify the page based on the experiment data
var g_data=null;
var g_moniker=null;
var g_uid=null;
function loadExperiment() {
                getExperimentDataFromServer();
                var replacements = g_data;
                //render the new elements that where loaded from the server
                for ( var i = 0; i < replacements.length; i++) {
                                document.getElementById(replacements[i].divID).innerHTML=replacements[i].content;
                }
}

//this simulates the kind of data the widemile server would return.
//control.js contains contents of factors and levels to update on the page see below.
//control.js call setExperimentData(data)
//{divID:"hero",content:"<img src='pentagon.png'alt='pentagon'/>"},
//{divID:"info",content:"This is a green pentagon.Look how pretty it is."};

function getExperimentDataFromServer(){
    //create new script block and add to the browser DOM to load external server call
    var script=createElement("script",document.body);
    script.src="http://ots.server.com/js-control/"+g_moniker+"/"+g_uid+"/control.js";
}

//data[{divID:"hero",content:"<img src='pentagon.png'alt='pentagon'/>"},
//     {divID:"info",content:"This is a green pentagon. Look how pretty it is."}];
function setExperimentData(data){
    g_data=data;
} function createVisitorID() {
    var value=null;
    if (document.cookie["uid"]==null) {
       value=newDate().time+"-"+rand(10);
       document.cookie["uid"]=newCookie(value);
    } else {
       value=document.cookie["uid"]
    }
     return value;
} function setup(moniker) {
    g_moniker=moniker;
    g_uid=createVisitorID();
    loadExperiment();
}
```

Figure 15

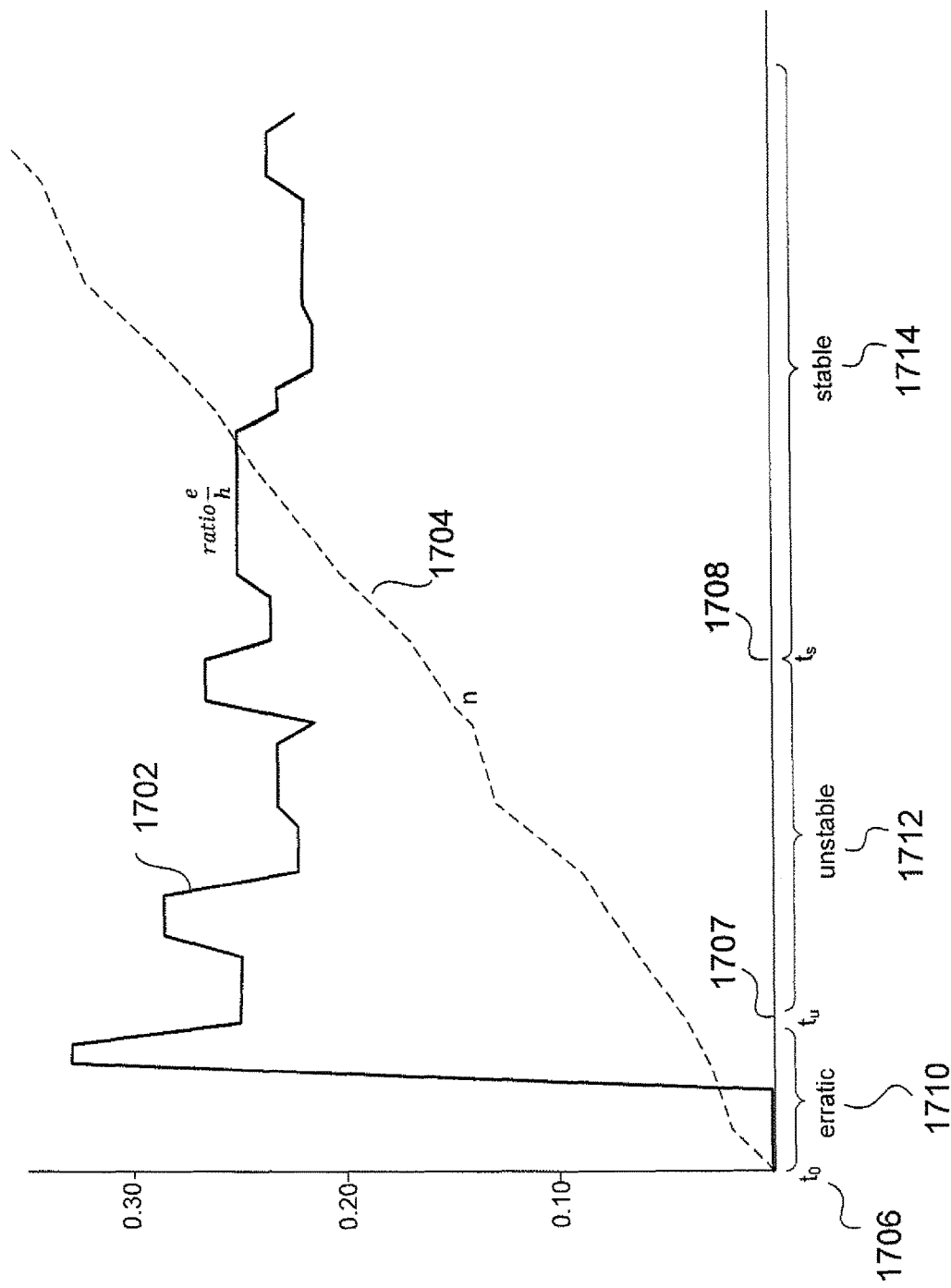

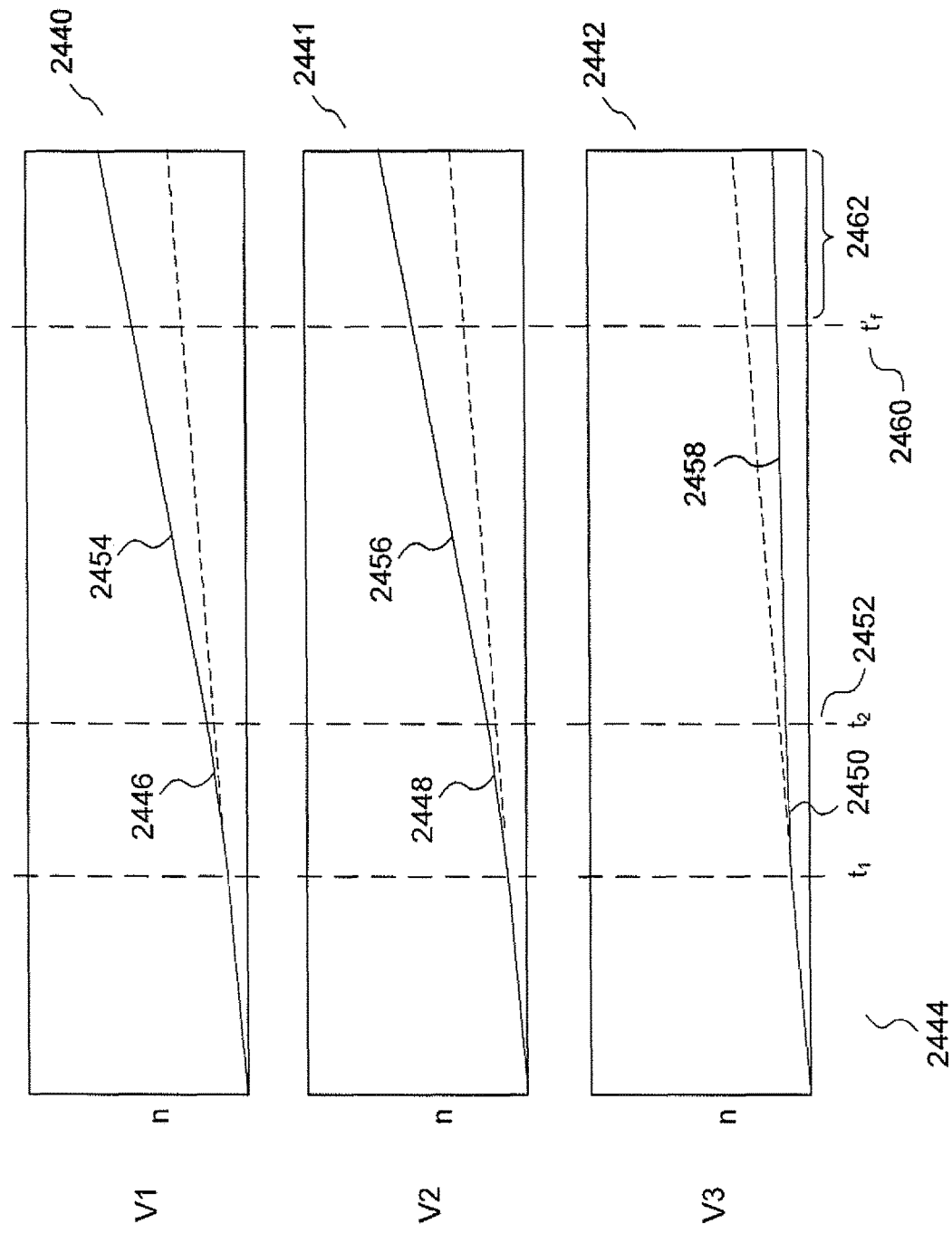

2712

$$P(H|E) = \frac{P(E|H) \cdot P(H)}{P(E)}$$

- probability of observing E given H
- prior probability
- 2716
- posterior probability
- 2714
- marginal likelihood – probability of observing E

*H* is the hypothesis
*E* is the evidence, i.e. new data
*P(H)* is the prior probability, an estimate of the probability of *H* before *E* is observed
*P(H|E)* is the posterior probability, an estimate of the probability of *H* after *E* is observed
*P(E|H)* is the probability of observing *E* given *H* is true
*P(E)* is the unconditional probability of observing *E*

$$P(s_i = x_i) = \binom{v_i}{x_i} r_i{}^{x_i}(1-r_i)^{v_i-x_i},$$

where $s_i$ is the number of positive events for variation $i$;
  $v_i$ is the number of accesses to variation $i$;
  $x_i$ is the number of positive events among the $v_i$ accesses; and
  $r_i$ is the positive − event rate.

3004

$$P(r_i) = \Gamma(\alpha_i + \beta_i)\frac{r_i{}^{\alpha_i-1}(1-r_i)^{\beta_i-1}}{\Gamma(\alpha_i)\Gamma(\beta_i)},$$

where $\alpha$ and $\beta$ are beta − distribution, hyper values,
  set to $\alpha$ = number of positive events and
    $\beta$ = number of non − positive events.

3006

$$P(r_i) = \Gamma(\alpha_i' + \beta_i')\frac{r_i{}^{\alpha_i'-1}(1-r_i)^{\beta_i'-1}}{\Gamma(\alpha_i')\Gamma(\beta_i')},$$

where $\alpha_i' = \alpha_i + x_i$,
  $\beta_i' = \beta_i + v_i - x_i$;
  $x_i$ is number of new positive events; and
  $v_i$ is number of new accesses.

Figure 30

$$p'_i = P(r'_i | \alpha'_i, \beta'_i) > P(r'_j | \alpha'_j, \beta'_j) \forall j \neq i$$

3202

$$= \prod_{j=0, j\neq i}^{n-1} P(r'_i | \alpha'_i, \beta'_i) > P(r'_j | \alpha'_j, \beta'_j) \forall j \neq i$$

$$= \prod_{j=0, j\neq i}^{n-1} P(r'_i > r'_j | \alpha'_j, \beta'_j) P(r'_i | \alpha'_i, \beta'_i)$$

3204

$$= \prod_{j=0, j\neq i}^{n-1} \int_0^{1.0} I_{r'_i}(\alpha'_j, \beta'_j) \Gamma(\alpha'_i + \beta'_i) \frac{r_i^{\alpha'_i}(1-r_i)^{\beta'_i - 1}}{\Gamma(\alpha'_i)\Gamma(\beta'_i)} dr'_i,$$

where $p'_i$ is the new estimate for the probability that
the posterior $r'_i$ for variant $i$ is greater than
the posterior $r'_j$ for all variants $j$, where $j \neq i$; and
$I_{r'_i}(\alpha'_j, \beta'_j)$ is the cumulative density function for the
posterior beta function for $r'_i$ with parameters $\alpha'_j$ and $\beta'_j$

3206

$$\langle p'_0, p'_1, p'_2, \ldots, p'_{n-1} \rangle = P_{init}$$

However, $\epsilon_{MIN} \leq p'_i \leq \epsilon_{MAX}$ and $\sum_{i=0}^{n-1} P'_i = 1.0$.

3212 — Therefore,
$P_{init} \rightarrow$ optimization $\rightarrow P_{final}$
where optimization is:

3210

3208

3214

$$\begin{array}{c} minimize \\ \sum_{i=0}^{n}|z_i| \end{array} \sum_i p'_i - z_i$$

subject to $\epsilon_{MIN} \leq p'_i - z_i \leq \epsilon_{MAX}$

Figure 32

METHOD AND SYSTEM FOR WEB-SITE TESTING

CROSS-REFERENCE TO RELATED APPLICATIONS

This application is a continuation-in-part of application Ser. No. 14/094,397, filed Dec. 2, 2013, which is a continuation of application Ser. No. 12/507,765, filed Jul. 22, 2009, which claims the benefit of Provisional Application No. 61/135,572, filed Jul. 22, 2008.

TECHNICAL FIELD

The current document is directed to web sites and web-site-based businesses and organizations, and, in particular, to a method and system for testing a web site in order to collect data that can be subsequently used to evaluate and optimize the web site.

BACKGROUND OF THE INVENTION

During the past 20 years, the development of the hypertext markup language ("HTML") and web browsers has led to the creation and development of whole new industries and businesses, including Internet retailing of goods and services, search-engine services, electronic encyclopedias, direct retailing and distribution of multi-media content and software, social-networking services, and a variety of additional industries and businesses. Many businesses are based on a web site, a collection of interlinked web pages that are provided to web-site users from a web server, generally one or more servers or higher-end computer systems that receive web-page requests from users via the Internet and respond to the requests by transmitting, to requesting users, HTML files that encode web pages displayed by browser applications executing on users' computers.

The creation and maintenance of an effective web site may involve engineers and professionals of a number of different disciplines, including software engineers and web-page developers, artists, writers, and other content creators, and analysts who monitor a web site and evaluate the effectiveness of the web site on an on-going basis. As one example, an Internet retailer may spend millions of dollars in retailing web-site design and development, using teams of engineers, developers, and content creators, and may undertake continuous evaluation of retail results associated with a retailing web site, using marketing professionals and other analysts, in order to attempt to identify potential changes to the web site that can be fed back to the designers and content creators in order to optimize the web site with respect to specific goals and constraints. For an Internet retailer, the total amount of sales generated from a retailing web site, the overall number of visitors who navigate past the home page of a website, the number of redirections to allied web sites using links provided on pages of the web site, and many other metrics may comprise the goals for web-site optimization. Constraints may include human and financial resources needed to effect the changes to the web site, the time needed to make the changes, compatibility of added features with widely used browsers and browser plug-in programs, and many other such constraints.

As with any type of live or run-time testing, testing undertaken by marketing professionals and analysts may represent, to a web-site-based business or information service, large expenditures in money, time, and other resources. Furthermore, live testing may unintentionally negatively impact the web site, by creating unintended interruptions, errors, and access delays for customers. Costs and potential liabilities of web-site testing may therefore constitute a significant additional constraint for web-site optimization. For this reason, web-site developers and owners seek cost-effective, time-and-resource-economical, and minimally intrusive methods and systems for web-site testing that can provide a sound statistical basis for web-site analysis and optimization.

SUMMARY

The current document is directed to methods and systems for testing web sites. In certain implementations of the methods and systems, a testing service collects customer page-access and conversion information on behalf of a web site. The testing service is straightforwardly accessed and configured, through a web-site-based user interface, and is virtually incorporated into the web site by simple HTML-file modifications. A more efficient web-site-testing system nonuniformly distributes web-site accesses among web-page variants in order to more quickly and computationally efficiently determine a most effective web-page variant among a set of tested web-page variants. In certain implementations, nonuniform distribution of web-site accesses among web-page variants is facilitated by a Bayesian-inference method.

BRIEF DESCRIPTION OF THE DRAWINGS

FIG. 3 shows the contents of an HTML file that encodes the exemplary web page shown in FIG. 2 and that includes simple modifications.

FIGS. 6-7 illustrate factors, factor levels, and test design.

FIG. 14 shows the HTML modifications used to virtually incorporate a testing service that represents one implementation of the methods and systems to which the current document is directed into a web site.

FIG. 15 provides an exemplary script-library download service that represents one implementation of the methods and systems to which the current document is directed by a testing into a web-site server.

FIGS. 17A-C illustrate collection of data, over time, for web-page variant V1 during the course of web-page testing.

FIGS. 24A-C illustrate a problem with currently practiced web-page testing and a new method for web-page testing that more efficiently utilizes computational and temporal resources to select a best variant from among multiple variants under test.

FIGS. 27A-B provide an overview of the Bayesian-probability-based approach used in one implementation of the currently described testing method.

FIG. 30 shows the basis of a continuous, periodic, or intermittent update of the weights assigned to variants to control the nonuniform distribution of web accesses to variants during testing.

FIG. 32 illustrates computation of an estimate for the probability that the posterior positive-event rate $P'_i$ for a web-page variant $i$ is greater than the posterior positive-event rates $P'_j$ for the other web-page variants j under test.

DETAILED DESCRIPTION OF THE INVENTION

Certain implementations of the methods and systems to which the current document is directed are related to live, real-time testing of a web site. There are many different types of web sites and web-site servers that can be tested by the currently described methods and systems. In the following discussion, a generalized web site is tested. It should be noted, at the onset, that the currently described methods and systems are not restricted to a particular class or type of web site, but are generally applicable to a wide variety of different types of web sites and web-site based businesses and organizations. For example, the currently described methods and systems can be applied to test and analyze the effectiveness of an Internet-commerce web site, but can also be applied to non-commercial information-distribution web sites, including on-line encyclopedias, to non-commercial social-networking web sites, to search-engine service providers, and many other types of web sites and web-site-based businesses. It should also be noted, at the onset, that the method and system implementations are primarily directed to minimally-intrusive, cost-effective, and time-and resource-efficient live, on-line experimentation and statistics collection. The statistics and data collected by method and system implementations can be subsequently analyzed by a variety of different analytics packages in order to generate various types of reports that provide information to web sites that can be used for optimization. The analytical analysis and reporting may be executed on the testing service computer facilities or on remote computing facilities. Certain implementations also provide time-efficient and cost-efficient test design and test implementations.

In a first subsection, below, a first set of implementations is described. In a second subsection, a family of new, more efficient testing methods and systems are described. In one implementation, the new, more efficient testing methods and systems nonuniformly distribute web-site accesses among web-page variants in order to more quickly and computationally efficiently determine a most effective web-page variant among a set of tested web-page variants.

Figure 1:
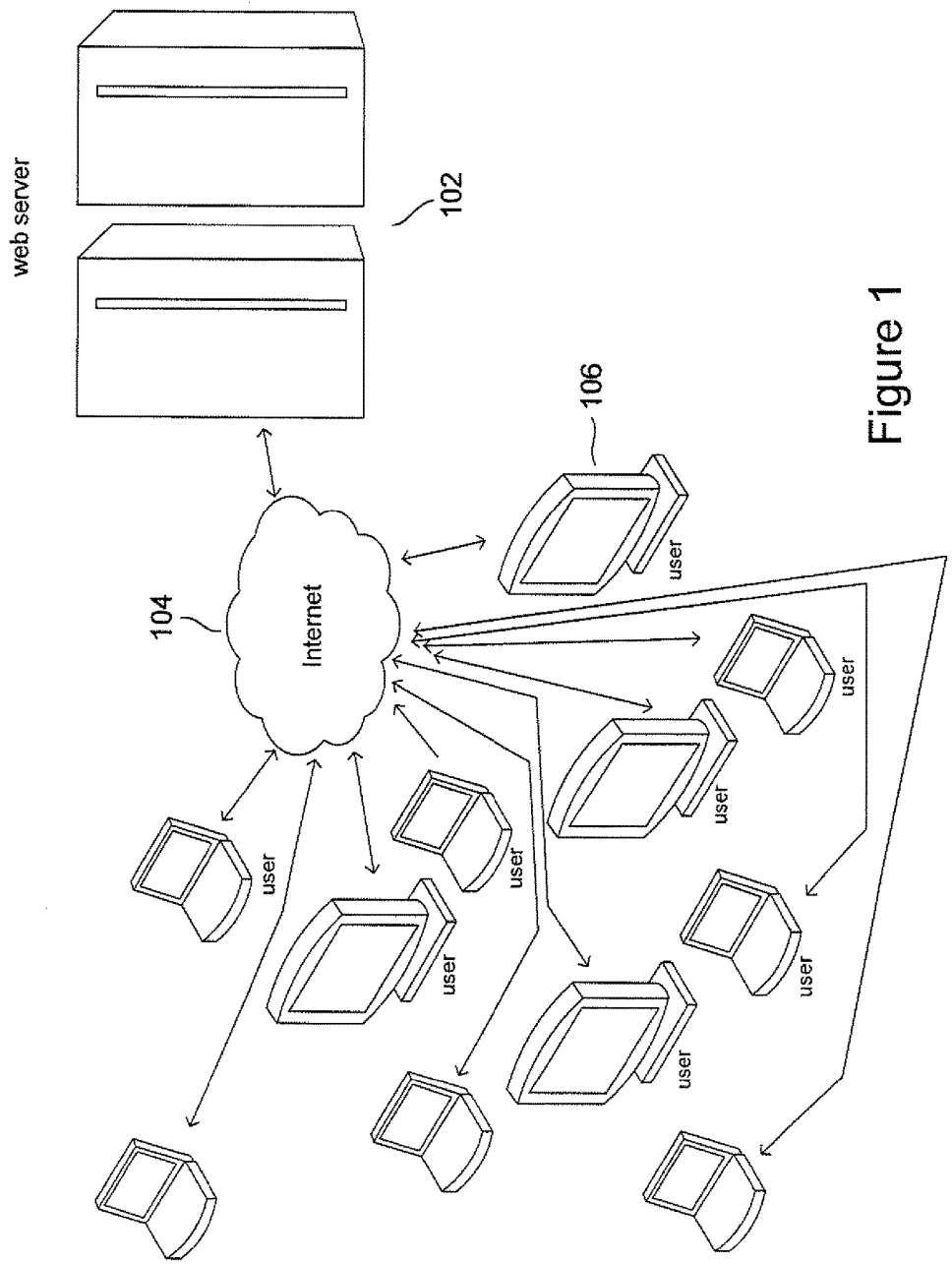
FIG. 1 provides a context for discussion of the methods and systems to which the current document is directed.

A First Set of Implementations of the Web-Site Testing Methods and Systems Disclosed in the Current Document FIG. 1 provides a context for discussion of the methods and systems to which the current document is directed. In FIG. 1, a server 102, comprising one or more servers and/or other types of computer systems, transmits HTML-encoded web pages through the Internet 104 to a large number of user or customer computers, including user computer 106. As discussed above, the web server may be owned and operated by an Internet retailing organization, an information-distribution system, a social-networking system, or another type Internet-based transactional or content-distribution system. In general, the web server runs continuously, at all times during the day and night, providing HTML-encoded web pages and, usually, additional types of information and services, including downloads of executable code, scripts, and other such information for specific types of web-based applications.

Figure 2:
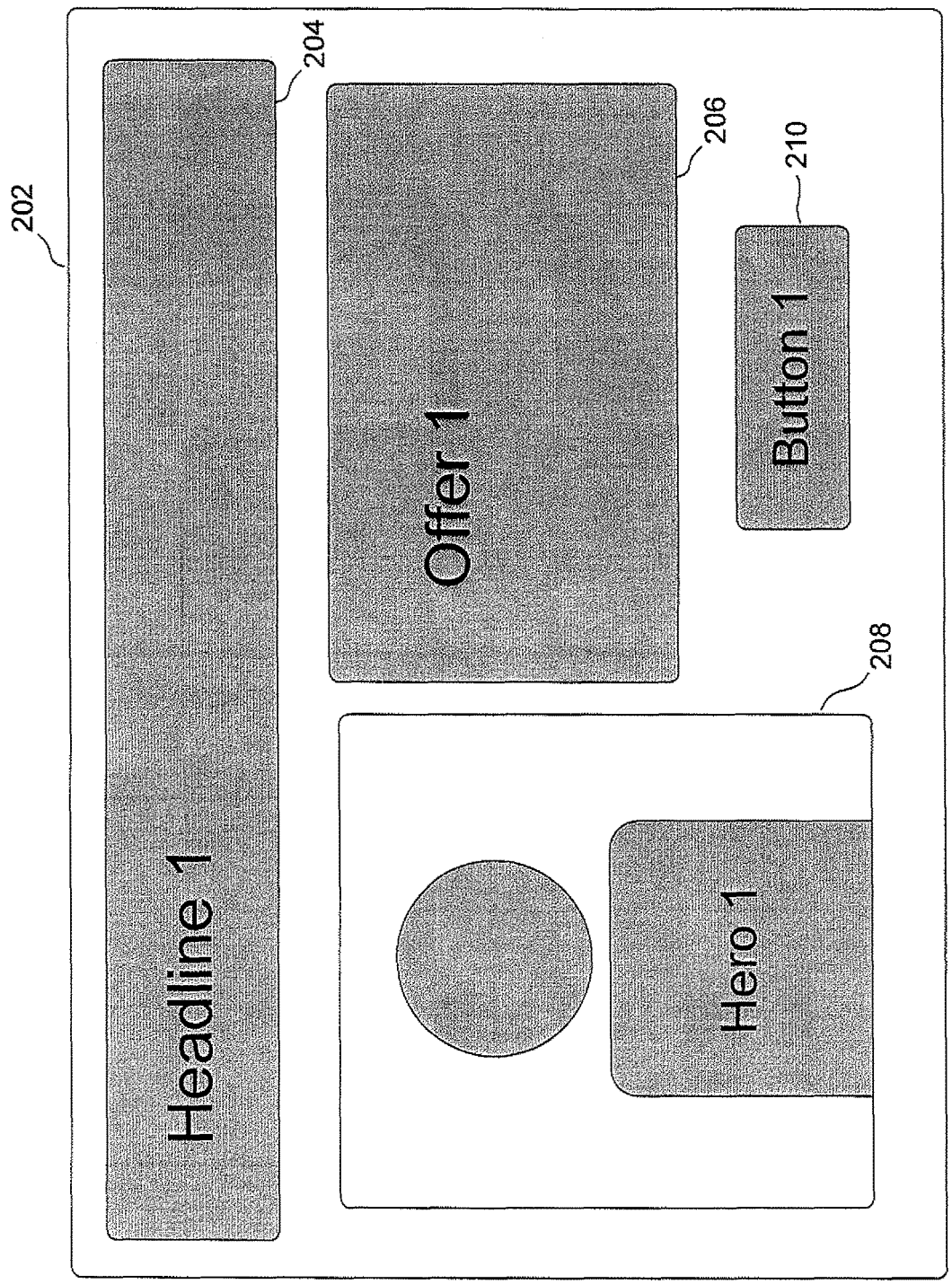
FIG. 2 shows a simple, exemplary web page.

FIG. 2 shows a simple, exemplary web page. A web page is described by an HTML file, discussed below, which is processed by a web browser executing on a computer in order to generate a web page, as shown in FIG. 2, that is displayed to a user on a display device. The exemplary web page 202 includes a headline graphic 204, an offer graphic 206, a hero graphic 208, and a button graphic 210. The exemplary web page is subsequently discussed in the context of tests and experiments in which altered versions of the web page are provided to users of the web server that serves the web page in order to test the effects of modifications to the web page.

FIG. 3 shows the contents of an HTML file that encodes the exemplary web page shown in FIG. 2 and that includes simple modifications according to implementations. The modifications, used to virtually incorporate a testing service into a website, are discussed below with reference to FIG. 14.

A complete discussion of HTML is beyond the scope of the current document. In FIG. 3, portions of the HTML file are correlated with features in the displayed web page shown in FIG. 2. In addition, general features of HTML are illustrated in FIG. 3. HTML is hierarchical, in nature. In FIG. 3, double-headed arrows, such as double-headed arrow 302, have been drawn to the left of the HTML code in order to illustrate tags and tag scoping within the HTML file. In general, HTML statements are delimited by a pair of tags, and are hierarchically organized by scope. For example, an outermost statement begins with a first tag of a tag pair that begins with the text "<html xmlns=" (304 in FIG. 3) and ends with a last tag of the tag pair that begins with the text "</HTML" (306 in FIG. 3). The scope of outermost statement encompasses the entire HTML code. The double-headed arrow 302 at the left of the HTML code, which represents the scope of this statement, spans the entire HTML file. A second-level that begins with the first tag of a tag pair "<head>" 308 and ends with the last tag of the tag pair "</head>" 310 spans a first portion of the HTML file, as indicated by double-headed arrow 312, and a second statement bounded by the first and last tags of a tag pair "<body>" 314 and "</body>" 316 span a second portion of the HTML file, indicated by double-headed arrow 318. By examining the tags within the exemplary HTML file, shown in FIG. 3, and the double-headed indications of the scope of tag-delimited statements, the hierarchical nature of HTML can be readily appreciated.

Figure 4:
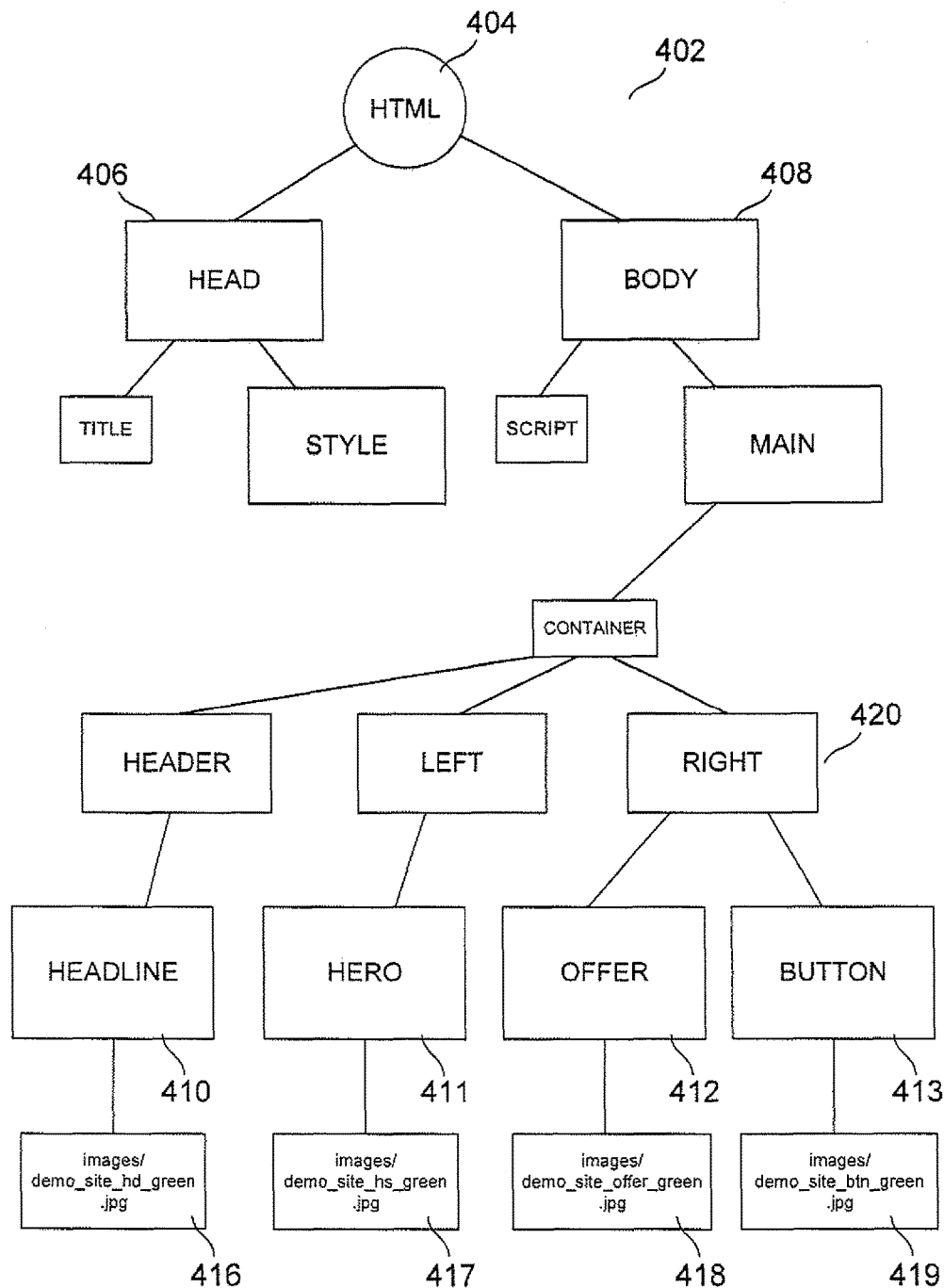
FIG. 4 provides a tree-like representation of the contents of the exemplary HTML file shown in FIG. 3.

FIG. 4 provides a tree-like representation of the contents of the exemplary HTML file shown in FIG. 3. The tree 402 shown in FIG. 4 is constructed from the double-headed arrows that annotate the HTML code, in FIG. 3, that span the scopes tag-delimited statements in the exemplary HTML file. For example, the root node 404 corresponds to double-headed arrow 302, and the second level "head" 406 and "body" 408 nodes correspond to double-headed arrows 312 and 318 in FIG. 3, respectively. Note that, at the very bottom of the tree representation of the HTML file, shown in FIG. 4, the four leaf nodes 416-419 represent the four features 204, 206, 208, and 210 of the displayed web page encoded by the exemplary HTML file, shown in FIG. 2. Each of these nodes is essentially a reference to an image file that contains a JPEG image of the corresponding web-page feature. The head statement, represented by node 406 in FIG. 4, includes formatting information, references to highest-level resource-location directories, and a great deal of additional information that is used by a browser to plan construction of a displayed web page. The body statement, represented by node 408 in FIG. 4, includes references to image files, text, and other features that are rendered by the browser into displayed features of the web page. Intermediate nodes include identifiers, particular met-data information, and references to scripts that are downloaded and run by the web browser during web-page rendering and/or display.

As a specific example, node 416, a direct and only descendant of the node labeled "headline" 410 in FIG. 4, corresponds to the headline feature 204 displayed in the exemplary web page shown in FIG. 2. This node also corresponds to double-headed arrow 320 in FIG. 3. The statement "<img src="images/demo_site_hd_green.jpg" indicates that the displayed object is encoded as a JPEG image "demo_site_offer_green.jpg" that can be found in a file-system sub-directory "images."

In order to transform an HTML file into a displayed web page, a web browser constructs a tree-like binary-encoded data object referred to as a "document object model" ("DOM.") The exact contents and structure of a DOM is beyond the scope of the current document. However, certain implementations of the currently described methods and systems rely on standardized DOM-editing interfaces that provide routines to identify nodes and subtrees within a DOM and to edit and modify identified nodes and subtrees. Once a browser has created a DOM from the exemplary HTML file shown in FIG. 3, DOM-editing routines can be used to locate the node in the DOM corresponding to the node "headline" 410 in FIG. 4 and replace or modify that node to reference a different image. Following modification, the web browser would then display a modified web page in which the headline image 204 in FIG. 2 is replaced by a different image. To effect more dramatic changes, an entire subtree of a DOM, such as the subtree rooted by a node corresponding to the node "right" 420, can be removed or replaced, to change groups of displayed features. While the implementation of the methods and systems to which the current document is directed, discussed below, uses DOM tree modification techniques, other types of modification techniques provided by interfaces to other types of binary representations of web pages may be used, in alternative implementations. The DOM is only one of many possible binary representations that may be constructed and employed by web browsers.

Another feature of the exemplary HTML file shown in FIG. 3 is that the various features displayed in FIG. 2 are, in HTML, wrapped by tag-delimited identifiers. For example, the "wm_headline" tag indicated by double-headed arrow 320 and by node 410 in FIG. 4 is an identifier for the headline-image-reference statement 322. Alphanumeric identifiers, such as the identifier "wm_headline," are introduced into an HTML file in order to give easy-to-understand and easy-to-use labels or handles for various objects, particularly objects that correspond to displayed features in a web page. Although objects can be easily identified in this manner, other methods for identifying objects within an HTML file, as well as corresponding nodes of DOM trees and other such binary representations of a rendered page, can be used to reference display objects.

Figure 5:
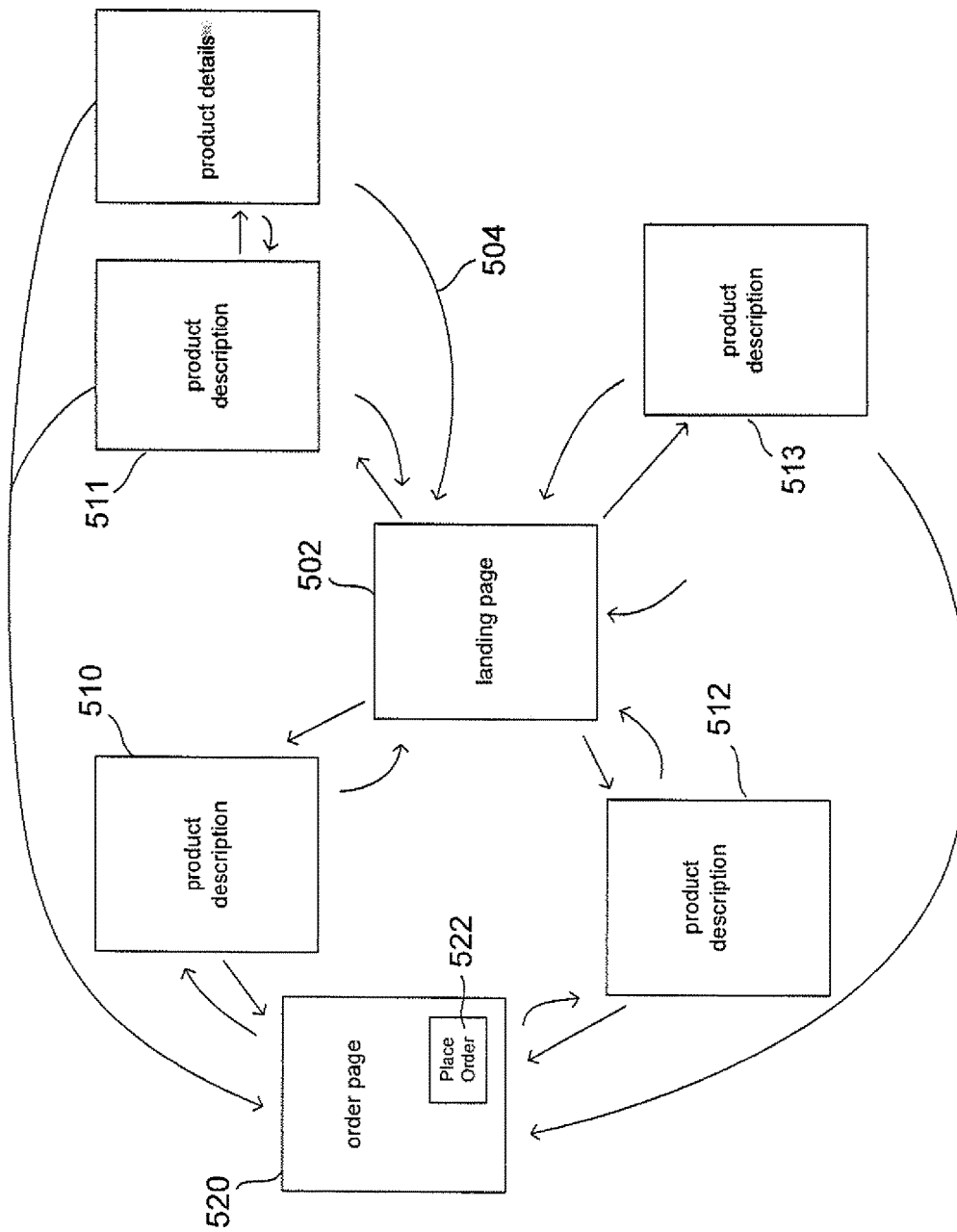
FIG. 5 illustrates a simple web site comprising seven web pages.

FIG. 5 illustrates a simple web site comprising seven web pages. Each web page, such as web page 502, is represented by a rectangle in FIG. 5. Curved arrows, such as curved arrow 504, indicate navigational paths between the web pages. Accessing the web site illustrated in FIG. 5, a user generally first accesses a landing page 502 as a result of clicking a link provided by another web page, such as a web page provided by a search engine, or provided in a list of bookmarked links by a web browser. The landing page is often, but not necessarily, a home page for the website. A home page is a central portal for access to all of the remaining web pages in the web site. In general, a user navigates through the web site by clicking on displayed links embedded in web pages. For example, the web site illustrated in FIG. 5 is a retailing web site. The landing page provides links to four different pages 510-513 that provide product descriptions for four different products. A user, after viewing the landing page 502, may click a link in order to navigate to a display of a product-description page 510. In the exemplary web site shown in FIG. 5, a user may subsequently navigate from a product-description page or product-details page to a central order page 520 that contains a button or feature 522 to which the user can input a mouse click in order to order one or more products. In certain cases, web sites may comprise a single page and, in other cases, a web site may comprise tens to hundreds or more pages, linked together in a network-like graph describing various navigational paths between web pages.

An example application of web-site testing would be to monitor access, by users, of the web pages shown in FIG. 5 in order to attempt to determine how often users end up navigating to the order page and clicking the place-order button 522. One might then modify one or more of the pages, and again monitor users' access to the pages and subsequent input to the place-order button 522. In this way, by testing collected user responses to various alternative web pages, web-site developers and managers may be able to determine an optimal set of web pages that provides the highest ratio of inputs to the place-order button 522 to user accesses of the landing page 502. In testing parlance, clicking the place-order button 522, in the exemplary web site shown in FIG. 5, is, in this example, considered to be a conversion event. One goal of optimizing the web site might be to increase the percentage of users clicking on the place-order button 522 after initially accessing the landing page 502. However, conversion events may be arbitrarily defined, and there may be multiple conversion events for a particular web site. Optimization of a web site may also involve multiple, often at-least partially contradictory goals. One goal may be to increase the number of accesses to any page other than the landing page by users who have initially accessed the landing page. Another goal may be to increase total accesses to the landing page, regardless of subsequent page accesses by users accessing the landing page. Another goal may be to obtain maximum possible conversion rates, even at the expense of decreasing the overall rate of page accesses.

Figure 6:
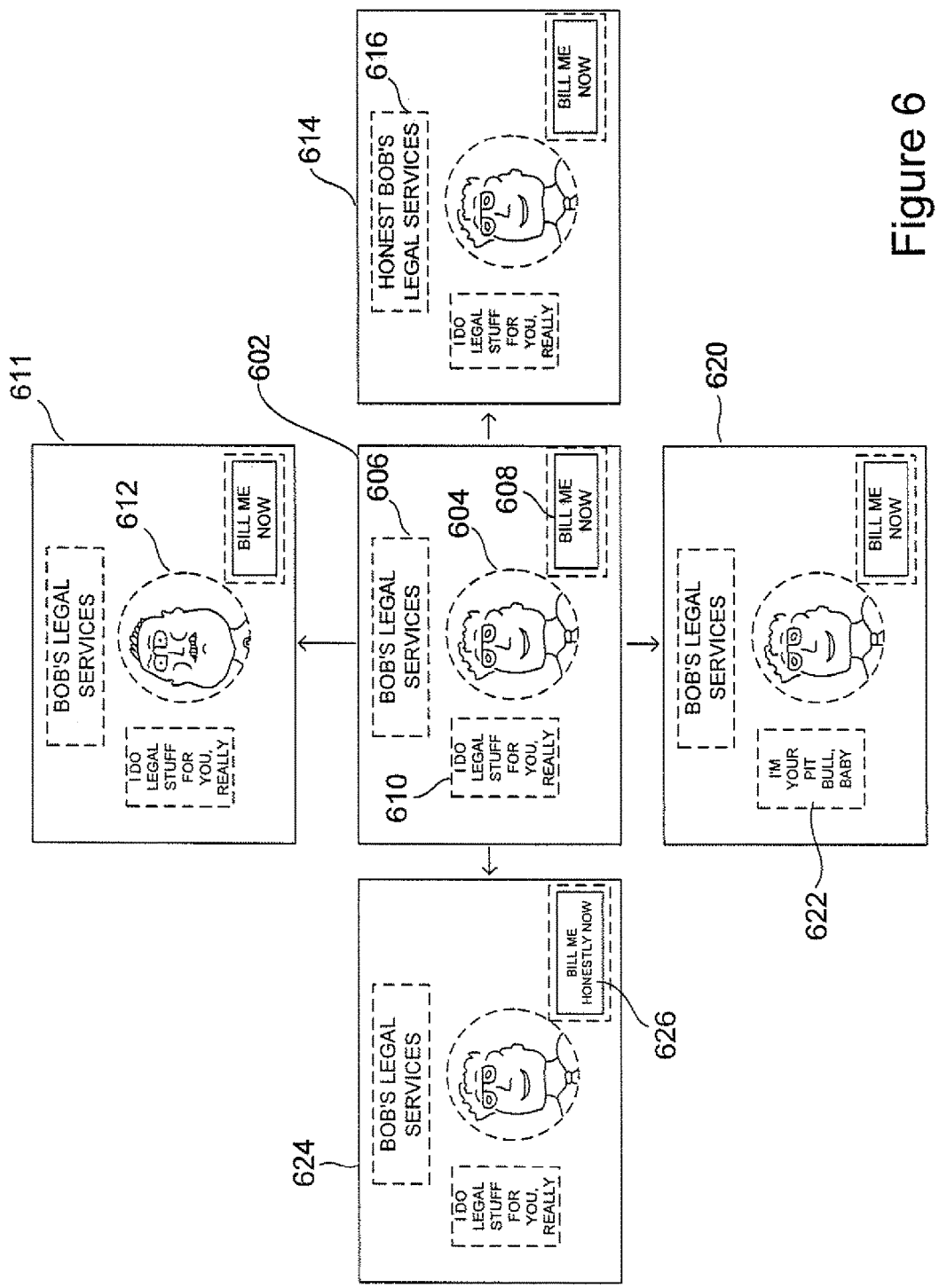

FIGS. 6-7 illustrate factors, factor levels, and test design according to implementations. In FIG. 6, an initial, prototype web page 602 is shown. A web-site owner or developer may decide to systematically alter the prototype web page in order to test the effects of the systematic alterations, so that alterations that appear to maximize goals can be made to the web page in order to optimize the web page. The prototype web page includes a portrait image 604, a title 606, a user-input feature 608, and an informational message 610. A systematic tester may decide to alter each of these web-page features, one-at-a-time, in order to determine the effects of the altered features on measured user response. For the web page shown in FIG. 6, the measured user response, or conversion event, would likely be user input to the user-input feature 608. As shown in FIG. 6, a tester may devise a first test web page 611 in which the prototype image 604 is replaced with a different image 612. The tester may devise a second test page 614 in which the title feature 606 is replaced with a different title feature 616. Similarly, the tester may devise a third test page 620 in which the informational message 610 of the prototype web page is replaced with a different informational message 622. Finally, the tester may create a fourth test web page 624 in which the user-input feature 608 of the prototype web page is replaced with a differently labeled user-input feature 626. The systematic tester may change a single feature, in each of the four test pages, in order to judge the effect of changing that feature in isolation from any other changes to the web page that might be contemplated. However, the strictly one-feature-change-at-a-time method would fail to provide data for the effects of various combinations of changes, such as changing both the headline and a portrait and, moreover, would require significant developer time and effort. FIG. 7 illustrates a related approach to the testing approach discussed with reference to FIG. 6 that represents one implementation of the methods and systems to which the current document is directed. In FIG. 7, the tester has prepared a table of factors and factor levels. Each factor in the table is represented by a column, such as the first column 702 corresponding to factor 1. Each factor is a feature, or group of related features, on a displayed web page that the tester wishes to alter in order to determine whether or not to alter the feature in order to optimize the web page with respect to one or more optimization goals. The various alternatives for each factor are referred to as levels. Thus, for example, factor 1, represented in the table by column 702, corresponds to the information message (610 in FIG. 6), for which the tester has devised six different alternatives, each corresponding to one of six different levels associated with that factor. The tester has devised four alternatives for factor 2, the title feature (606 in FIG. 6), five alternatives for factor 3, the portrait feature (604 in FIG. 6), and five alternatives for the fourth factor, the user-input feature (608 in FIG. 6). Then, having specified the factors, or web-page features, to be altered, and the various different alternatives for each feature, the tester might try generating all possible test pages corresponding to all possible combinations of level values for the factors in order to test the different alternative web pages to determine an optimal set of four levels corresponding to optimal alternatives for the four factors. Unfortunately, an exhaustive, combinatorial test, in most cases, is not feasible. Even for the very simple example of FIGS. 6 and 7, there are 1260 different alternative pages, including the prototype page, which can be constructed by varying between one and four factors according to the variations, or levels, provided in the table provided in FIG. 7. In general, for the statistics collected from testing to have significance, a sufficient number of tests need to be conducted so each of the different test pages is displayed a relatively large number of times during the test. In the example of FIGS. 6 and 7, each different alternative web page among the 1260 possible alternative web pages may need to be displayed hundreds or thousands of times to users in order to accumulate sufficient test data to make valid statistics-based judgments. In many cases, the number of factors and number of levels for each factor may be far larger than in the simple example shown in FIGS. 6 and 7.

The variations of factors, or levels, may include changes in content, display size, display color, object position in the displayed image, or many other different types of changes. Again, as discussed above, a factor may include multiple display features.

Because of the general infeasibility of full, exhaustive, combinatorial testing of all possible web-page variations, certain method and system implementations use an experimental-design method referred to as "the orthogonal-array method." This method devises a non-exhaustive test strategy that nonetheless gathers sufficient, well-distributed test data in order to make reasonable inferences with regard to the effects of altering the factors in all possible ways. In essence, the orthogonal-array method involves devising a sparse sampling of all possible variations of the web page that provides information about the various dependencies between the different levels of the different features. The orthogonal-array method involves specifying the factors and specifying the levels for each factor for a particular test run, and then, based on the factors and levels for each factor to be tested in a particular test run, devises a set of alternative web pages, by varying the specified factors according to the specified levels, that provide a good basis for collecting statistics for the features to be tested. The orthogonal-array method is well known in testing and statistics. Many additional types of test-design methods may also be used. Whatever test-design technique is employed, each test run defined by clients is associated with a test design that controls generation and distribution of experiments, or modified web pages.

Figure 8:
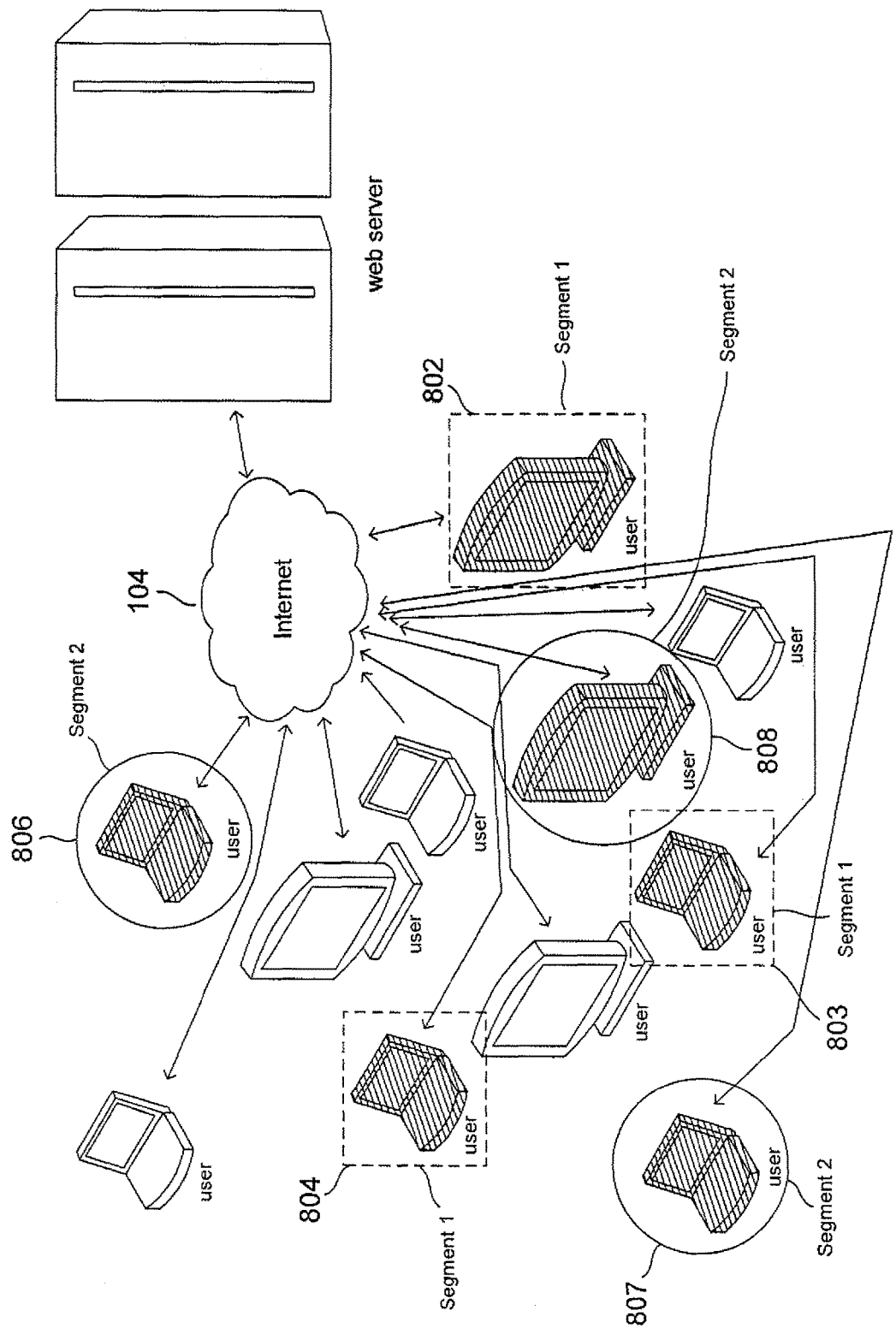
FIG. 8 illustrates the concept of segments in testing of web pages.

FIG. 8 illustrates the concept of segments in testing of web pages. FIG. 8 shows the web server and users of the web server using the same illustration conventions as used in FIG. 1. However, in FIG. 8, a first set of three users 802-804 are marked as belonging to a first segment, segment 1, and a second set of three users 806-808 are marked as belonging to a second segment, segment 2. During live, real-time testing of web sites, according to implementations, alternative versions of web pages are provided to subsets of the total number of users, or customers, accessing the web server. During a particular test run, altered web pages are provided to a specified segment of users. A segment of users, or customers, can be defined by any of a wide variety of different parameters. For example, a segment of users may be defined by the web page or link by which the users or customers navigated to a test page served by the web server. Segments may be defined by time periods, by the Internet domains through which users access the Internet, or by many other different criteria.

Figure 9:
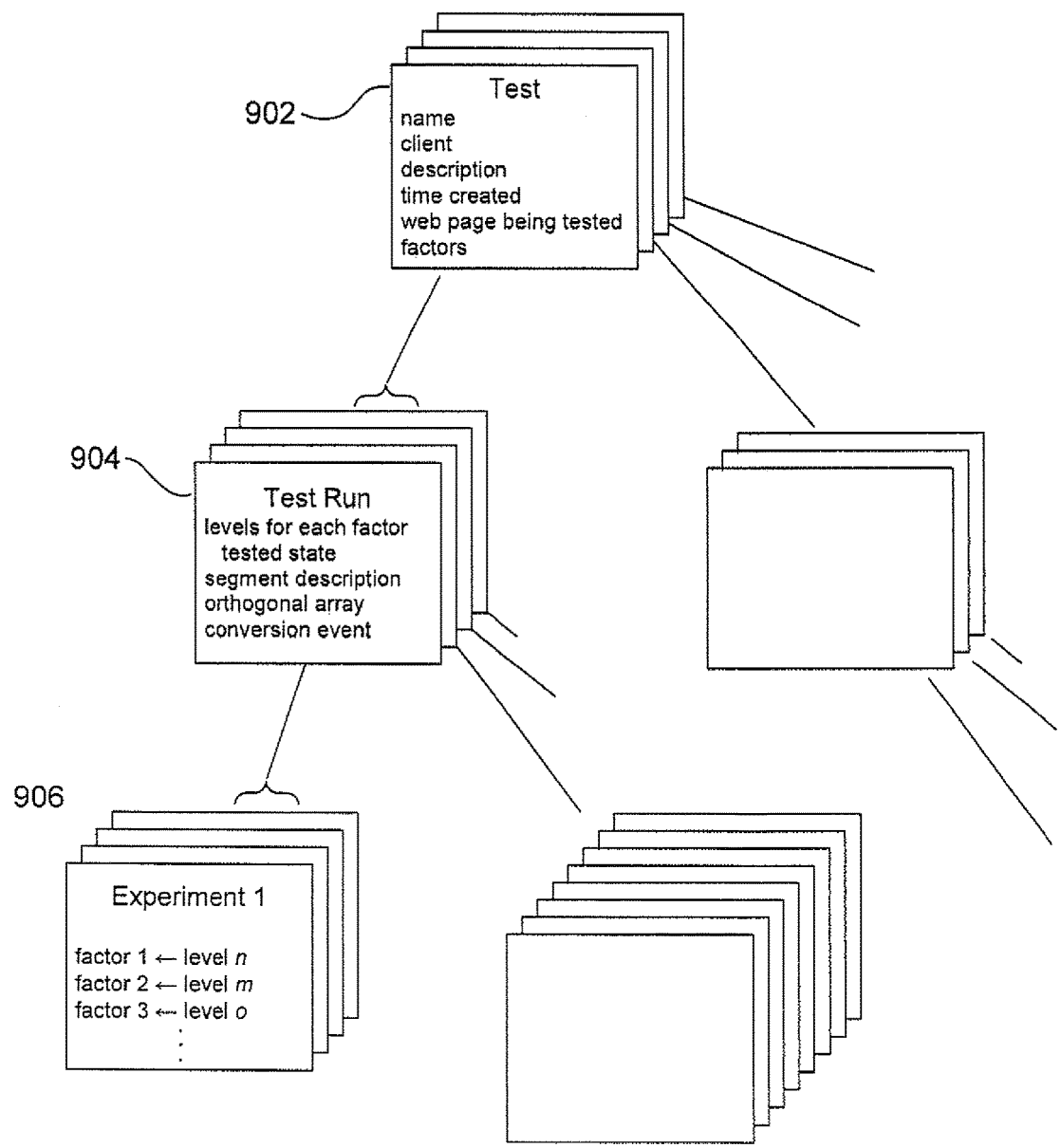
FIG. 9 illustrates the data and data structures that define tests, test runs, and experiments according to certain implementations of the currently disclosed methods and systems.

FIG. 9 illustrates the data and data structures that define tests, test runs, and experiments according to certain implementations of the currently disclosed methods and systems. A testing service may, at any given time, carry out a large number of different tests for many different client web-site-based organizations. Each test is defined by a test record, such as test record 902 in FIG. 9. Information contained in the test record includes an alphanumeric name of the test, an identifier for the client on behalf of whom the test has been created, a description of the test, an indication of the time that the test was created, an indication of the web page that is tested by the test, and a list of the factors that may be involved in any particular test run associated with the test. Note that the factors can be specified by the identifiers associated with features or objects displayed in the web page. For example, referring to FIGS. 2-4, a list of factors for a test of the exemplary web page shown in FIG. 2 may include the alphanumeric strings: "wm_headline," "wm_hero," "wm_offer," and "wm_button."

Any particular test may be carried out over a series of test runs. For example, each test run may be carried out at a different time, with respect to a different segment of users, and may test a different array of features and feature levels. Thus, each test record, such as test record 902 in FIG. 9, may be associated with one or more test-run records, such as test-run record 904 in FIG. 9. Test-run records include information such as the levels to be used for each factor, with the levels specified as URLs, or other references to images and other resources, or as text strings or other data directly displayed by the browser, a current state of the test run, a description of the segment to which the test run is directed, an indication of the particular orthogonal-array basis or other test design for the test run, and an indication of one or more conversion events for the test run. Finally, using the orthogonal-array basis or other test design selected for the test run, a test run is associated with a set of experiments, such as experiment 906 in FIG. 9. Each experiment corresponds to an altered web page that is displayed to users during the test run. An experiment is essentially defined by associating each factor, tested in the test run, with a particular level, or referenced resource, according to a matrix of test pages generated by the orthogonal-array basis or other test design selected for the test run.

Figure 10:
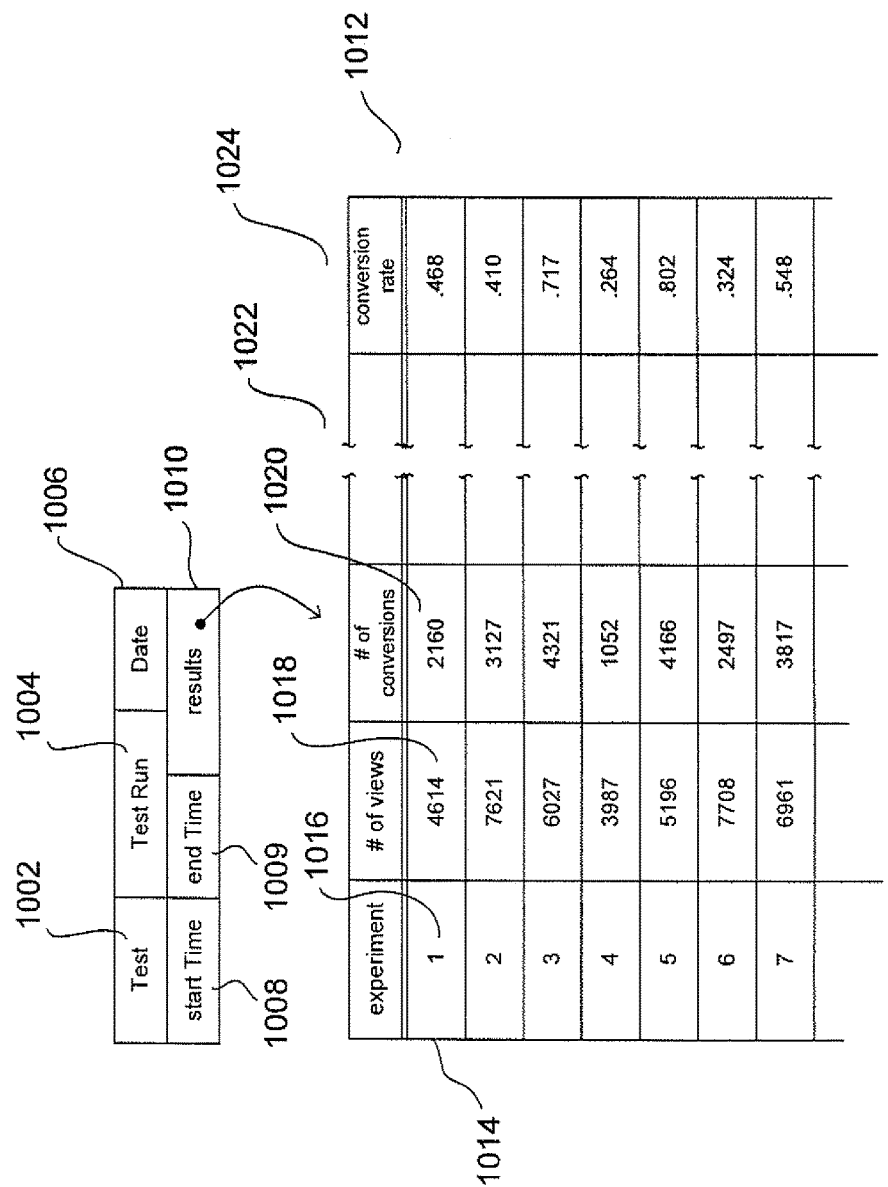
FIG. 10 illustrates the nature of the statistics, or test results, that are collected for a particular test run by certain of the methods and systems to which the current document is directed.

FIG. 10 illustrates the nature of the statistics, or test results, that are collected for a particular test run by certain of the methods and systems to which the current document is directed. The results include indications of the test 1002 and test run 1004, the date on which the test run was conducted 1006, a start time and an end time for the test run 1008-1009, and a reference 1010 to a results table 1012 in which test results are tabulated. The test results table includes a row for each experiment associated with the test run, such as row 1014 in experimental-results table 1012. The row includes an indication of the experiment to which the row corresponds 1016, a count of the number of the times that the page corresponding to the experiment was accessed by a user of an active segment 1018, an indication of the number of times that a user who accessed the test page generated a corresponding conversion event 1020, other similar numerical information in additional columns 1022, and, finally, a computed conversion rate 1024 for each experiment. The test results shown in FIG. 10 are but one example of the type of statistics and data that can be collected during a test run according to method and system implementations. Different or additional statistics may be collected by different implementations, or according to different test configurations created by test-service clients.

There are many different possible ways of testing a web server in order to accumulate test results, discussed above with reference to FIG. 10, for tests defined for particular web pages and factors associated with those web pages, as discussed above with reference to FIG. 9. One method would require the web server to design a test by creating all or a subset of possible alternative test pages and to then develop a test-page-serving system that would execute concurrently with, or as part of, the web server on an intermittent or continuous basis. As discussed above, testing methods and systems that require the web server to develop and run tests may be prohibitively expensive, both in time and resources, for web-site owners or web-site-based organizations. Furthermore, such testing methods can inadvertently cause serious financial losses and other non-financial damage to a web site. For example, were the test pages improperly constructed or served, sales or other activities generated by real-time users may be lost and, in worst cases, the web site could potentially lose business from particular customers and users altogether. Real-time testing additionally involves significant security risks. A malicious hacker or employee might be able to alter the test system to display fraudulent or offensive test pages, for example. Finally, similar to problems encountered in a variety of physical and behavioral systems, poorly or improperly design tests may so perturb the system being tested that the statistics collected from the tests are meaningless or, in worst cases, lead to false conclusions. For example, a poorly designed test engine may introduce significant delays in web-page service to customers or users. As a result, the conversion rate measured during a test run may fall precipitously, not because of particular alterations made to test web pages, but instead because the significant time delay encountered by users for whom the test page is constructed and to whom the test web page is transmitted. For these, and many other reasons, web-site-based-organization test design and execution can be undesirable and, in worst cases, disruptive and damaging to the web-site-based organization.

An alternative approach, to which method and system implementations are directed, involves using a third-party testing service, in tandem with the web server that serves the web site to be tested. However, simply conducting tests by a third-party server does not guarantee that the many pitfalls and disadvantages discussed above with respect to web-site-based-organization test design and execution are necessarily avoided. In fact, in many cases, the pitfalls and disadvantages discussed in the preceding paragraph may be exacerbated by third-party testing of web sites and web servers. For example, in the case that a test web page, requested by a customer, needs to be prepared by the third-party server, in response to a request generated by the web site as a result of a user request for the web page being tested, test-page serving may be significantly delayed, deleteriously perturbing the users' interaction with the web server to the point that the test statistics end up meaningless or misleading. As another example, security issues may be compounded by distributing testing tasks between a web-server computer system and a third-parting testing server. Method and system implementations employ an array of techniques and features that address these pitfalls and disadvantages, and that provide minimally intrusive and cost-effective testing for web sites and web servers.

Figure 11:
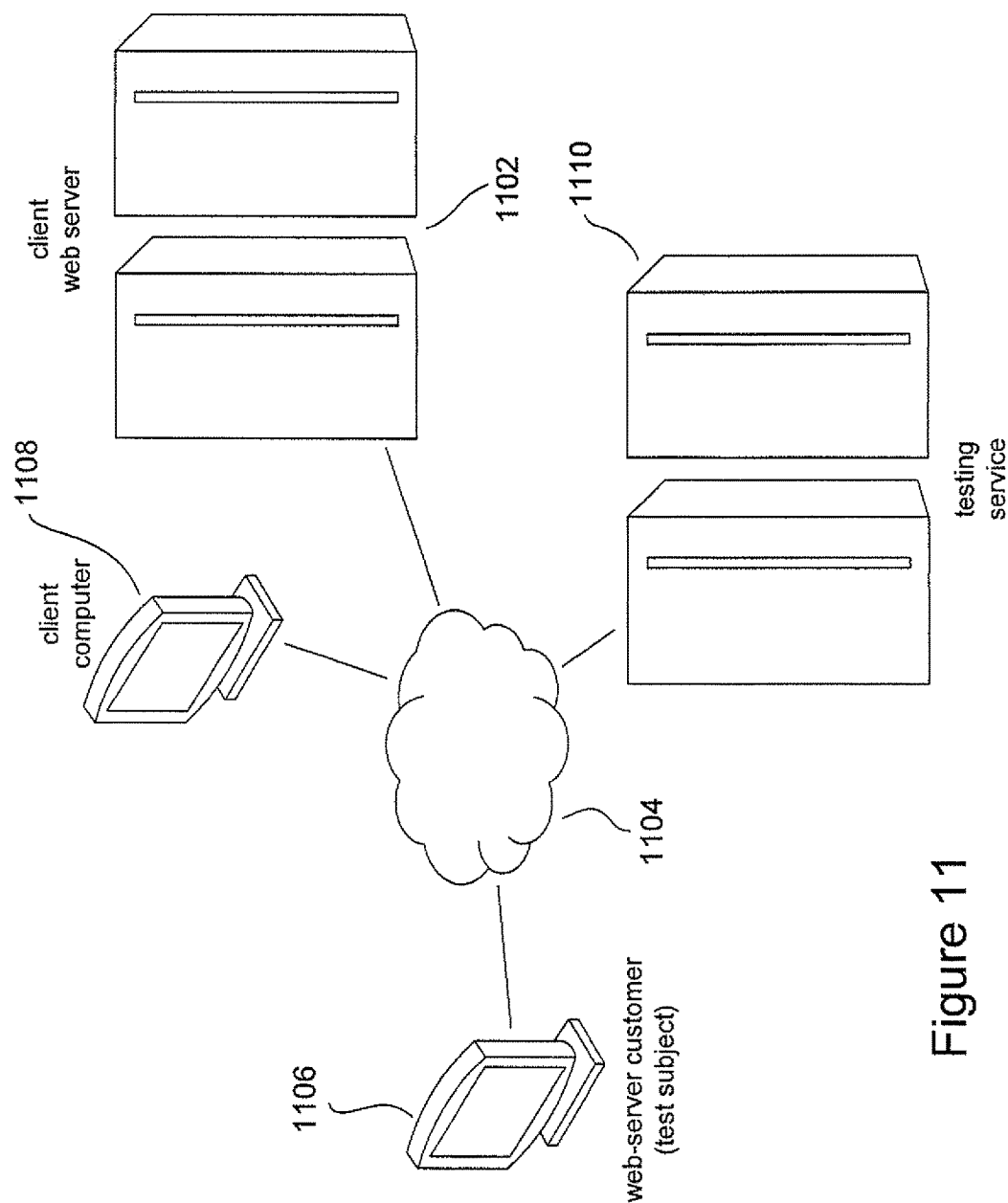
FIG. 11 illustrates the testing environment used, by certain of the methods and systems to which the current document is directed, to carry out web-site testing.

FIG. 11 illustrates the testing environment used, by certain of the methods and systems to which the current document is directed, to carry out web-site testing. In FIG. 11, the web site 1102 is represented as one or more servers or large computer systems that serve web pages through the Internet 1104 to a generally large number of web-site users or customers, including user 1106. The web site or web server is regarded, in the following discussion, as a client web server of the testing service. The client web server also includes a client computer 1108 by which the client web-server-based organization can access various third-party services and web servers through the Internet. Finally, a web-site testing service is provided by, in the implementation of the methods and systems to which the current document is directed shown in FIG. 11, a distinct server or servers 1110 accessible to the client web server 1102, the web server customer 1106, and client computer 1108 via the Internet 1104.

The testing service is used by the client web-site-based organization, referred to as the "client," below, to design and run real-time, live tests of web pages provided by the client web server to users. In certain implementations, the testing service may run on the same computer systems as the client web server. In general, the testing service is geographically distinct from the client web server, and is concurrently used by multiple, different clients for concurrently executing many different test runs on behalf of the multiple clients.

FIGS. 12A-H illustrate the general method and system for web-site testing that represents one implementation of the methods and systems to which the current document is directed. FIGS. 12A-H all use the same illustration conventions, in which large rectangles represent the four entities shown in FIG. 11.

Figure 12A:
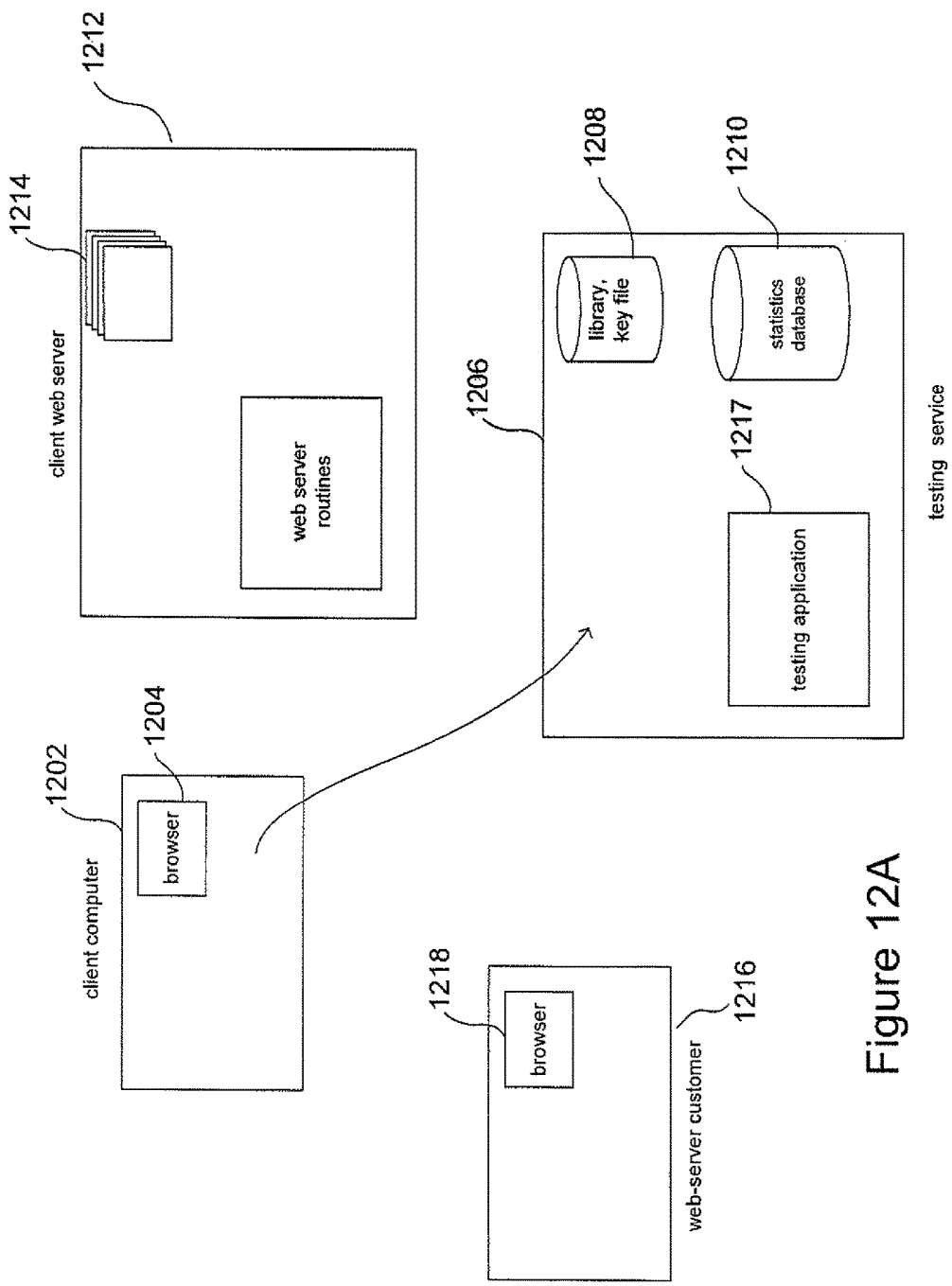
FIGS. 12A-H illustrate the general method and system for web-site testing that represents one implementation of the methods and systems to which the current document is directed.

A client establishes a relationship with the testing service, as shown in FIG. 12A, by accessing the testing service through a browser executing on the client computer. As shown in FIG. 12A, an employee or owner of the client web server uses the client computer 1202 to access a testing-service web site, via a browser 1204 running on the client computer, which allows the client web server to register as a client of the testing service. The testing service 1206 includes one or more databases 1208 and 1210 that store information used to construct library and key files that are downloaded to client web servers, store statistics collected during testing, and store various different data objects and records that describe clients, tests, test runs, experiments, and other data used to conduct web-site testing. The client web server 1212 serves a number of different web pages described by HTML files 1214 to users, represented by user 1216 who access the web pages served by the client-web server through a browser 1218 running on the customer computer 1216. The testing service and client web server additionally include web-server engines, application programs, and other components of servers and computer systems (1215 and 121 in FIG. 12A).

Figure 12B:
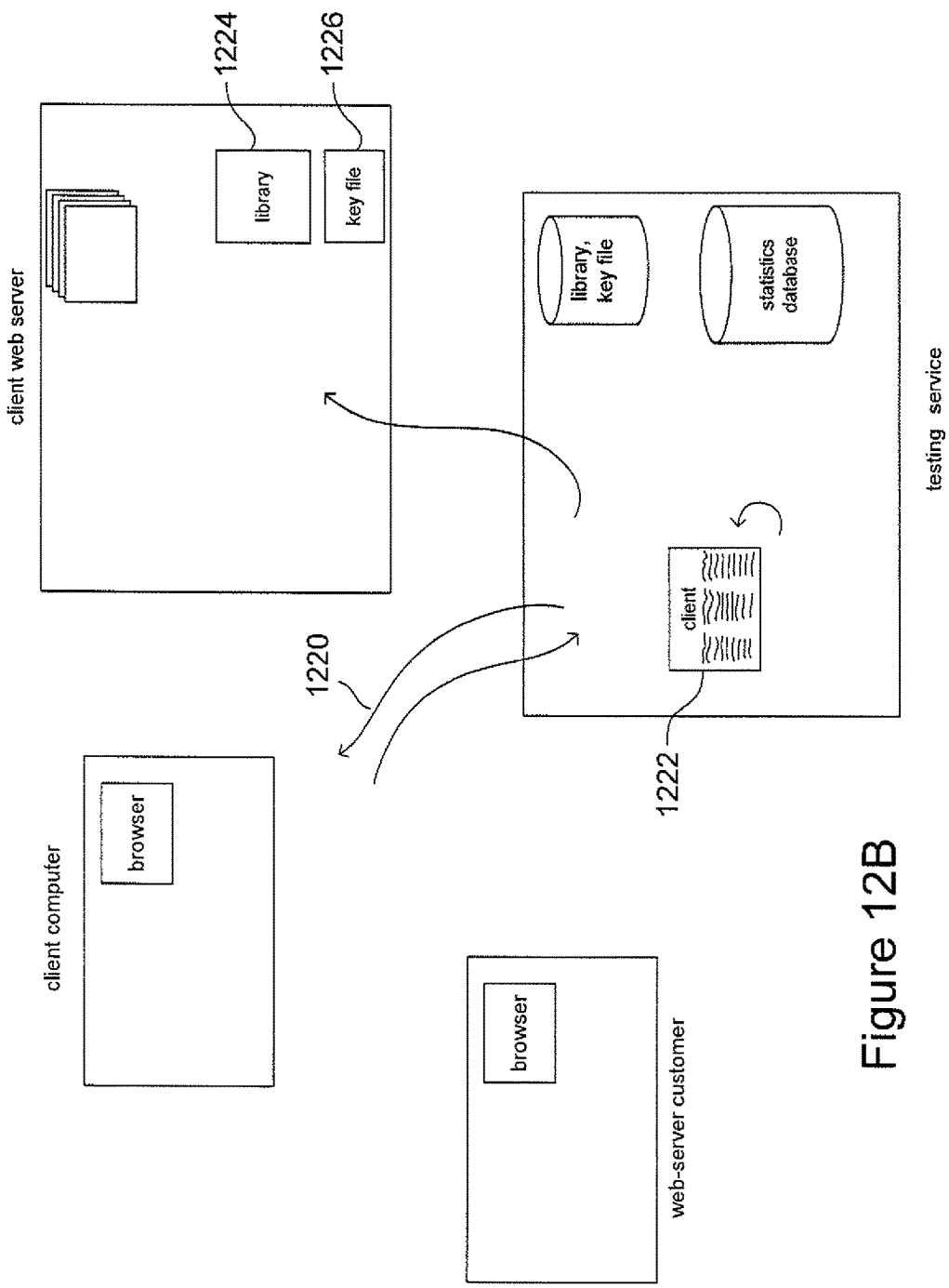

As shown in FIG. 12B, the client carries out a dialog 1220 with the testing service in order to provide the testing service with information about the client that allows the testing service to prepare a client record or records 1222 that describe the client and to store the client record or records in the database. In addition, the testing service may undertake various authorization and authentication steps to ensure that the client web server is a valid web server and that the client can transmit remuneration for testing services to the testing service. As part of client initialization, the testing service prepares a script library 1224 and a key file 1226 that the testing service downloads to the client web server. The script library 1224 includes routines that are called by client-web-server users during web-site testing. This library is referred to as a "script library" because script routines are often provided to browsers for execution. However, other types of routines may be provided by other types of libraries in alternative implementations. The key file 1226 includes cryptographic information that ensures that all information exchanges that occur between client users and the testing service are secure.

Figure 12C:
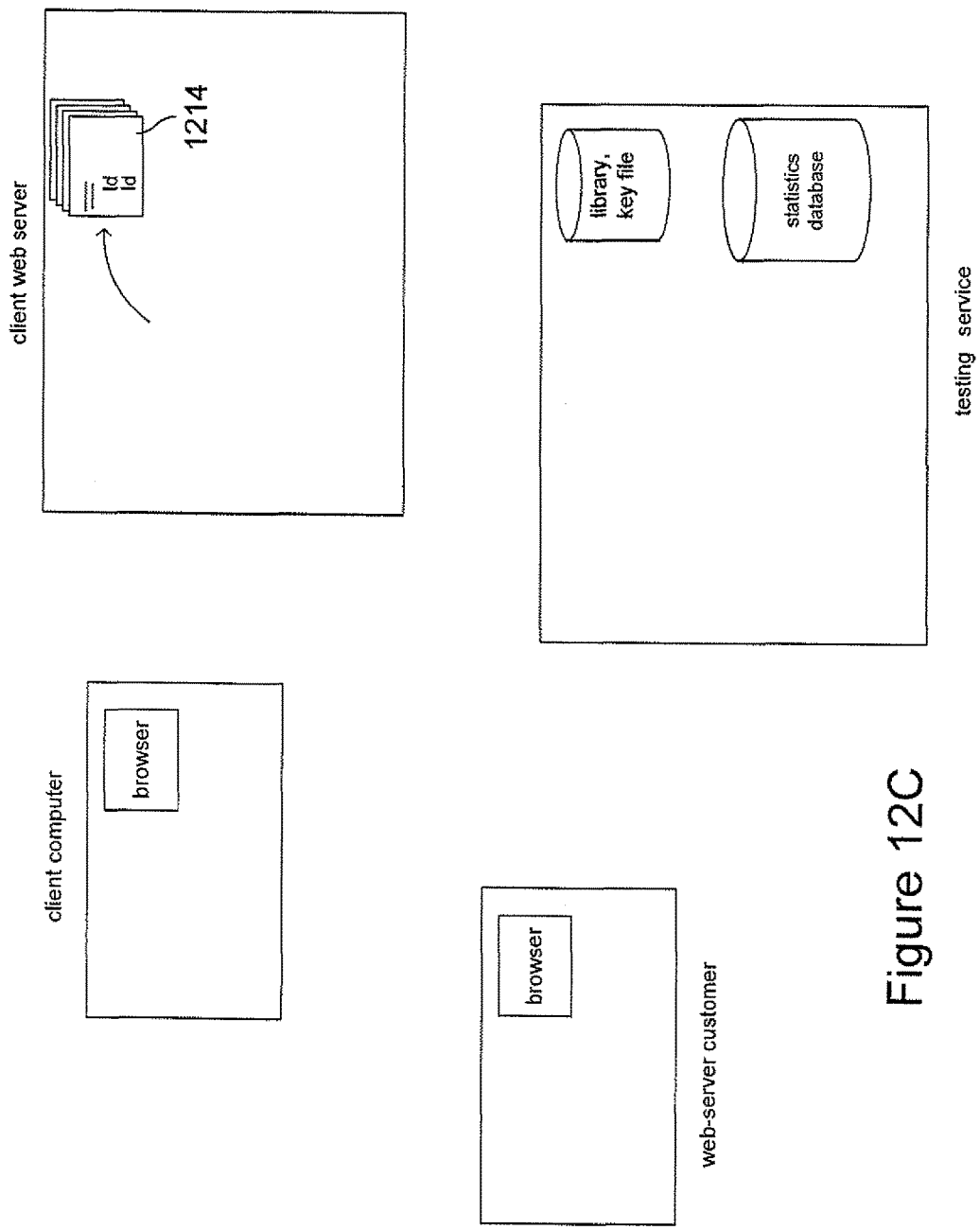

As shown in FIG. 12C, following client initialization, the client modifies any of the HTML encodings of web pages that may be altered during testing of the client-web server by the testing service. The alternations are minimal. To each HTML file that encodes a web page that may be tested, the client generally adds only two single-line statements and, in the case that display objects are not associated with identifiers, as discussed above with reference to FIG. 3, the client web server provide identifiers for each of the objects that may be specified as factors for testing of web pages. The single-line statements are generally identical for all client web pages, greatly simplifying the web-page modification carried out by the client. The first statement results in downloading of a script library from the client web server, and the second script launches one or more information exchanges between the testing server and user computer. In the case that a conversion event is tied to a specific user-activated display device, such as a button, a call to a conversion script is inserted into the HTML file, so that user activation of the user-activated display device generates an information-exchange transaction with the testing service corresponding to a conversion event. As discussed above, these may be the HTML identifiers discussed with reference to FIG. 3, or other types of identifiers. In many cases, simple changes to the HTML files can be automatically carried out by a script or by routines provided by a content-management-service application-programming interface.

Figure 12D:
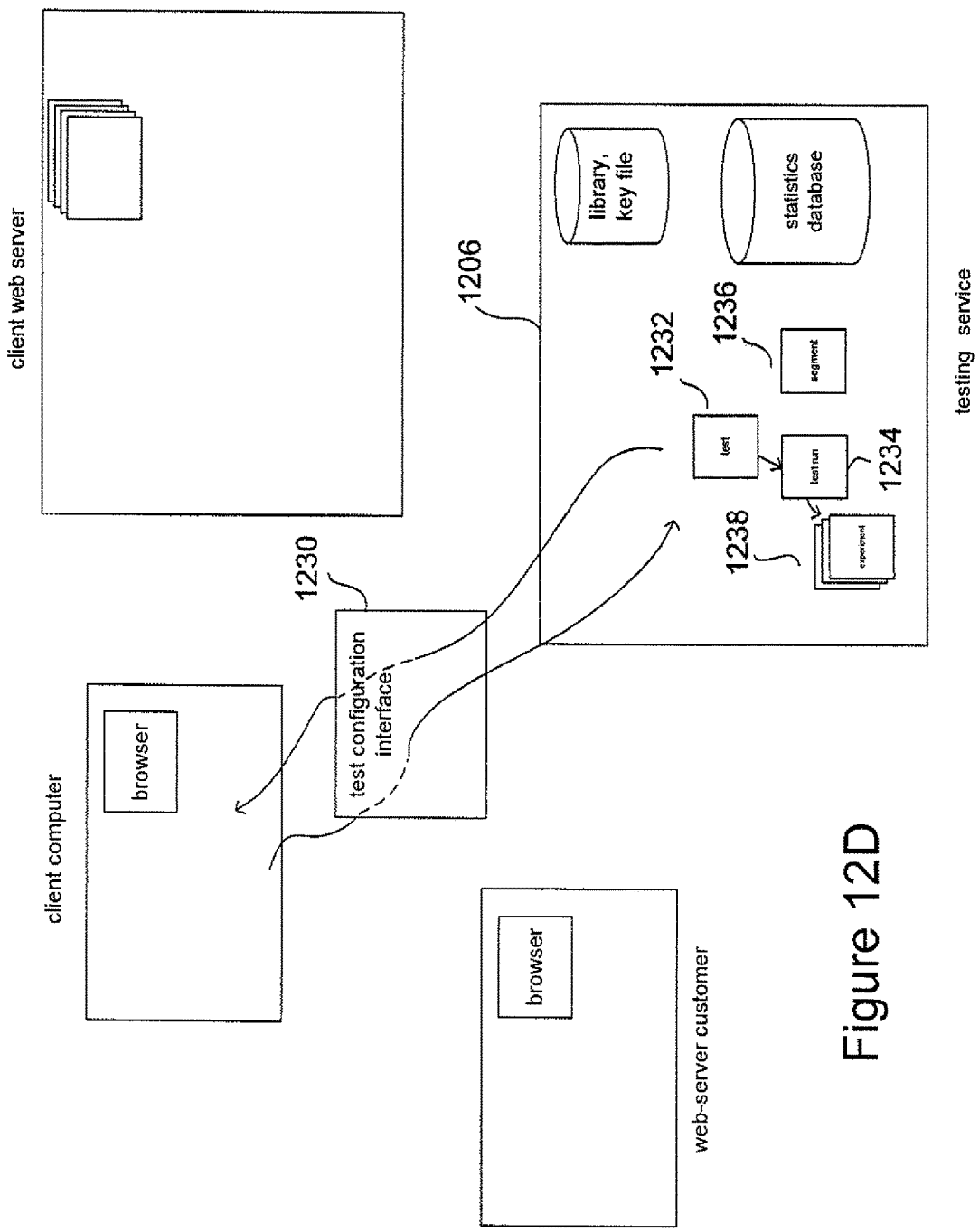

Following client initialization and modification of the HTML-file encodings of web pages that may be subsequently tested, the client can configure and run tests through a test-configuration interface provided as a website by the testing service to clients, as shown in FIG. 12D. The test configuration interface 1230 allows the client computer to define tests 1232, specify and modify already-specified test runs 1234, and specify segments 1236, and, using client-supplied test and test-run specifications, the testing service generates the experiments 1238 associated with each test run. All of the test, test-run, and segment information is stored in records associated with a reference to the client in one or more databases within the testing service. The test-configuration interface 1230 additionally provides run-time information to the client web server and allows the client web server to launch trial runs and test runs.

When a client web server has created a test and launched a test run for the test, the testing service provides modifications of the tested web page to users of the client-web-server during the test in order that the users receive altered web pages that constitute test experiments, and the testing service collects statistics based on users' access to web pages under test. This process is next described, with reference to FIGS. 12E-G.

Figure 12E:
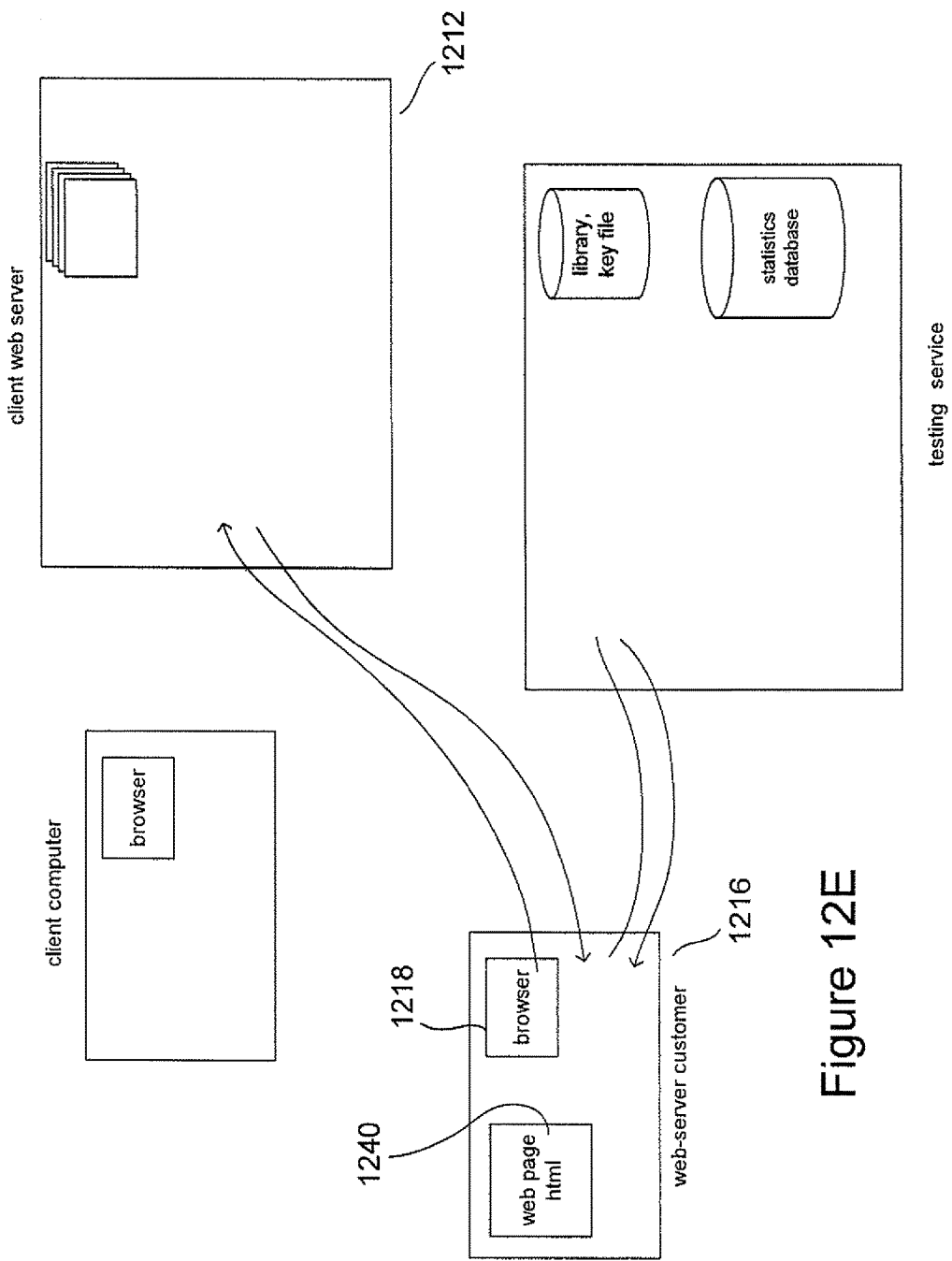

When a client-web-server user 1216 accesses a test web page, the client-web-server user sends an HTML-file request through the Internet to the client web server 1212, as shown in FIG. 12E, which returns the requested HTML page to the client-web-server user 1216 for rendering and display by the browser 1218 executing within the user's computer. As the browser begins to process the HTML file, the browser encounters a statement 1240 that causes the browser 1218 to request the script library from the client web server. When the script library is downloaded by the client web server, the HTML file is modified, on the user computer, to launch an additional information exchange with the testing service to download additional library routines from the testing service. This additional information exchange is carried out only when the web page being processed is an active test page, the user computer is a valid test subject for an active test, and the additional library routines are not already cached in the user computer's browser. Insertion of the library-routine-fetch statement is one of the two modifications to the HTML files corresponding to tested web pages made by the client.

Figure 12F:
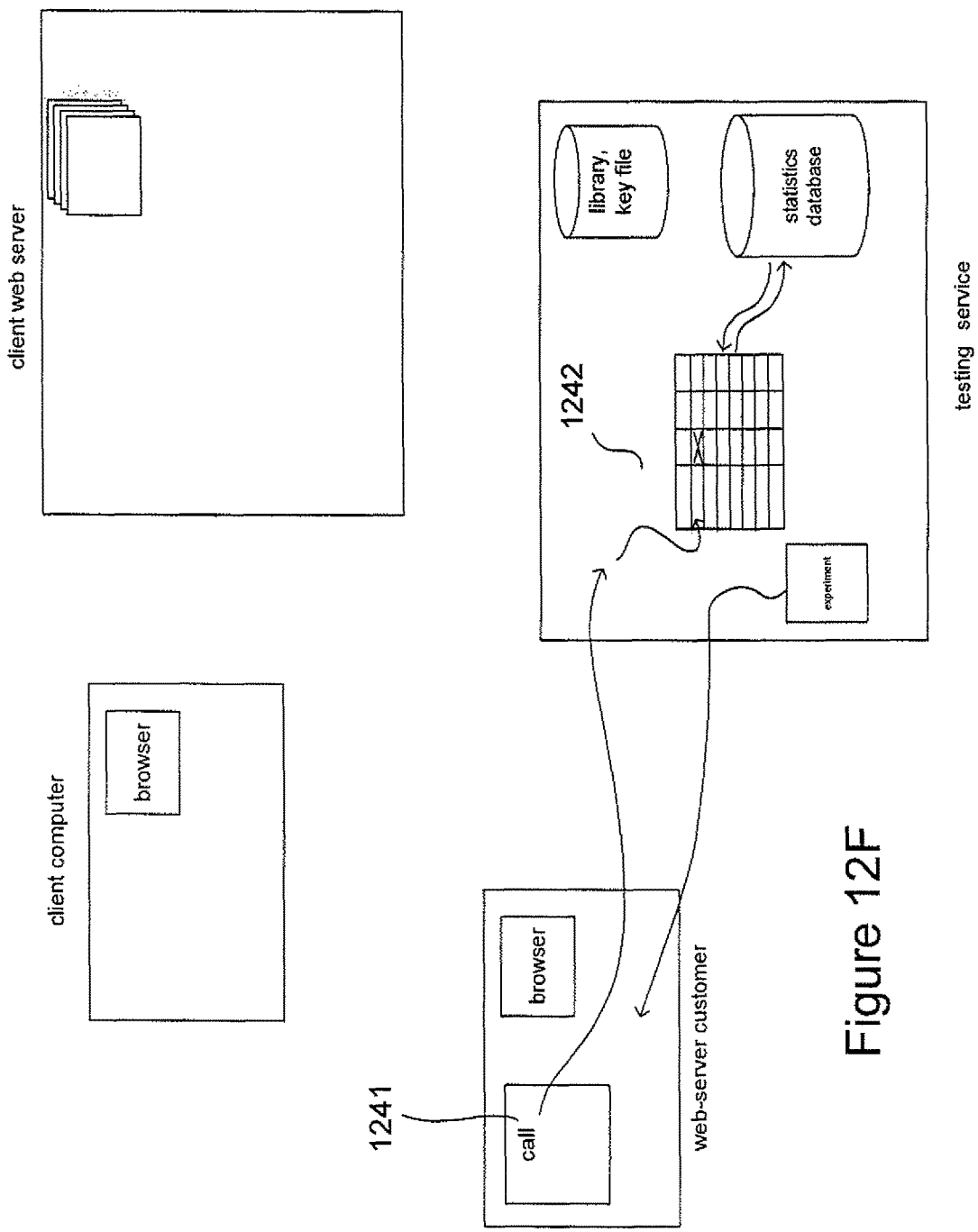
Figure 12G:
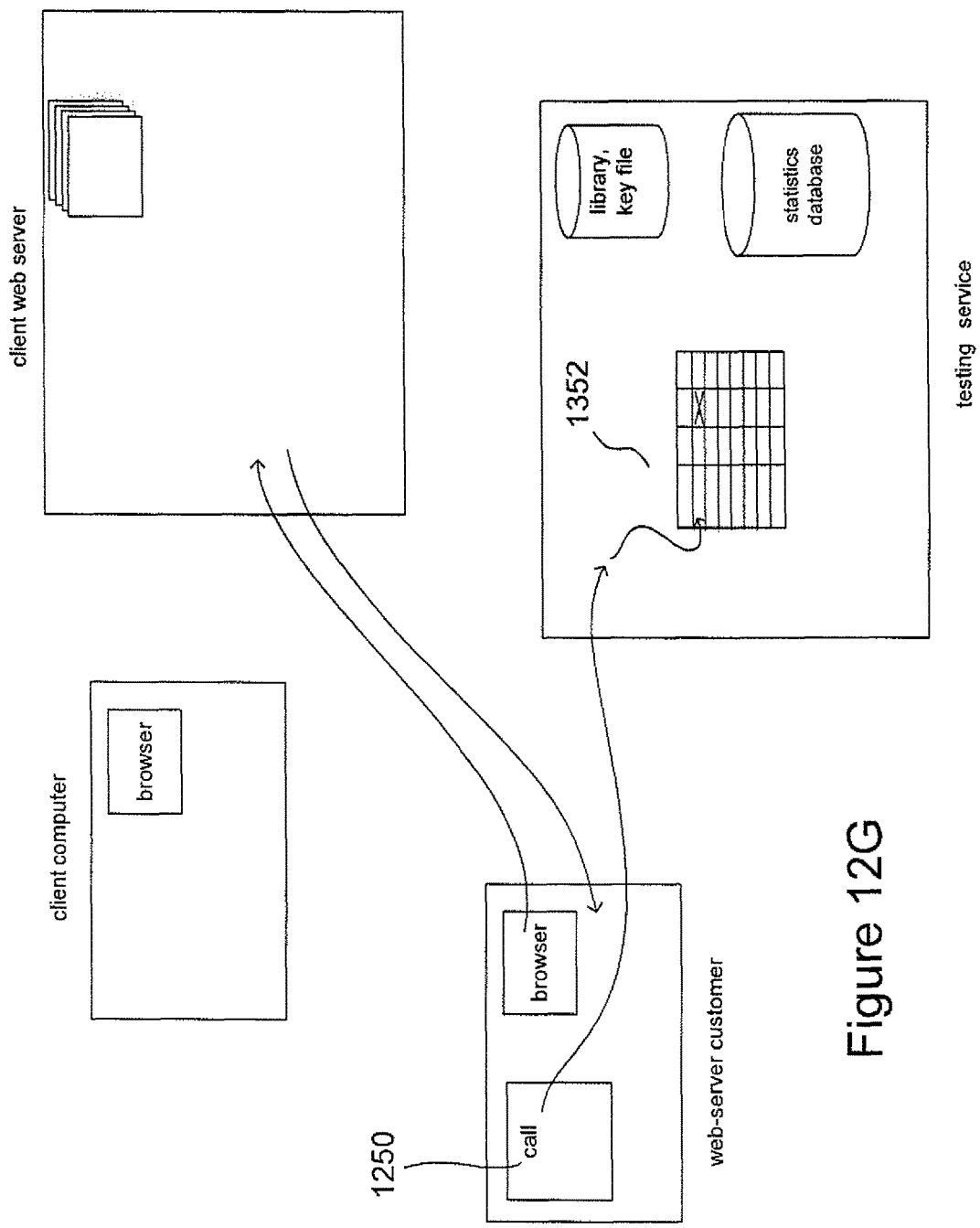

Next, as the browser continues to process the HTML, as shown in FIG. 12F, the browser encounters a call to the library routine "WM.setup" 1241. When executed by the browser, WM.setup initiates one or more information exchanges with the testing service during which the testing service can access cookies and other information associated with the web page on the user's computer, and the user computer receives web-page modifications from the testing service. Cookies can be used, for example, to ensure that a test subject who repeatedly accesses a landing page receives the same experiment, or test page, each time. Only when the web page being processed by the user computer is an active test page, and the user computer is an active test subject, are web-page modifications returned to the user computer by the testing service, and information uploaded by the testing service from the user computer. When this web page and user are validated, the testing service records the page accessed by the user, an identifier of the user, and a time of access in one or more database entries 1242 and returns a snippet, representing one or more nodes or sub-trees of the DOM corresponding to the web page, to the user computer, which modifies the DOM constructed by the browser to incorporate the snippet downloaded by the testing service to the user. In other words, the testing service downloads modifications that transform the web page downloaded by the user to a particular altered web page representing an experiment. Thus, following the information transaction illustrated in FIG. 12F, the user's browser alters the DOM and displays, to the user, the altered web page corresponding to an experiment as part of the test run. The snippet is constructed or retried by the testing service based on the orthogonal-array test basis or other test design. The stored test design defines the experiments, from which the testing service selects experiments for provision to users in order to obtain a well-distributed sampling of experiments during the test. Subsequently, as shown in FIG. 12G, should the user download a page, or invoke a feature on a page, corresponding to a conversion event, the user's browser, in processing the HTML file, encounters a library call 1250 that results in an information transaction between the user and testing service. The testing service checks to ensure that the web page is a valid conversion page for an active test, that the user is a valid test subject. When all of these tests are valid, the conversion event is recorded 1352 for the experiment by the testing service.

Figure 12H:
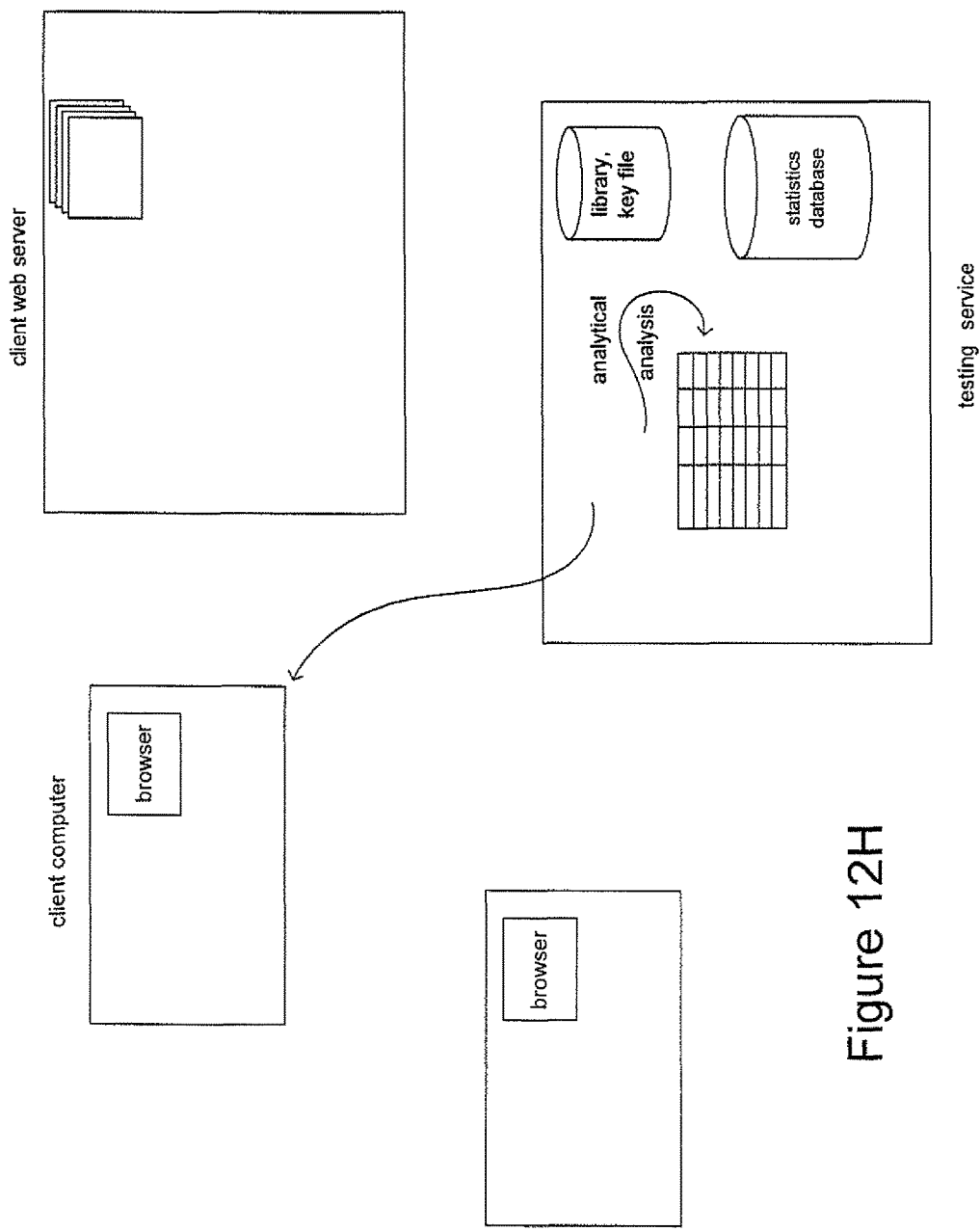

Finally, as shown in FIG. 12H, when the testing service has collected sufficient data to consider the test run to be complete, the testing service changes the status of the test run to complete, and may then undertake analysis and reporting of the test results. The test results may be automatically returned to the client web server, or may be subsequently returned, on demand, when the client checks the status of the test run and determines that the test run has been completed.

Figure 13A:
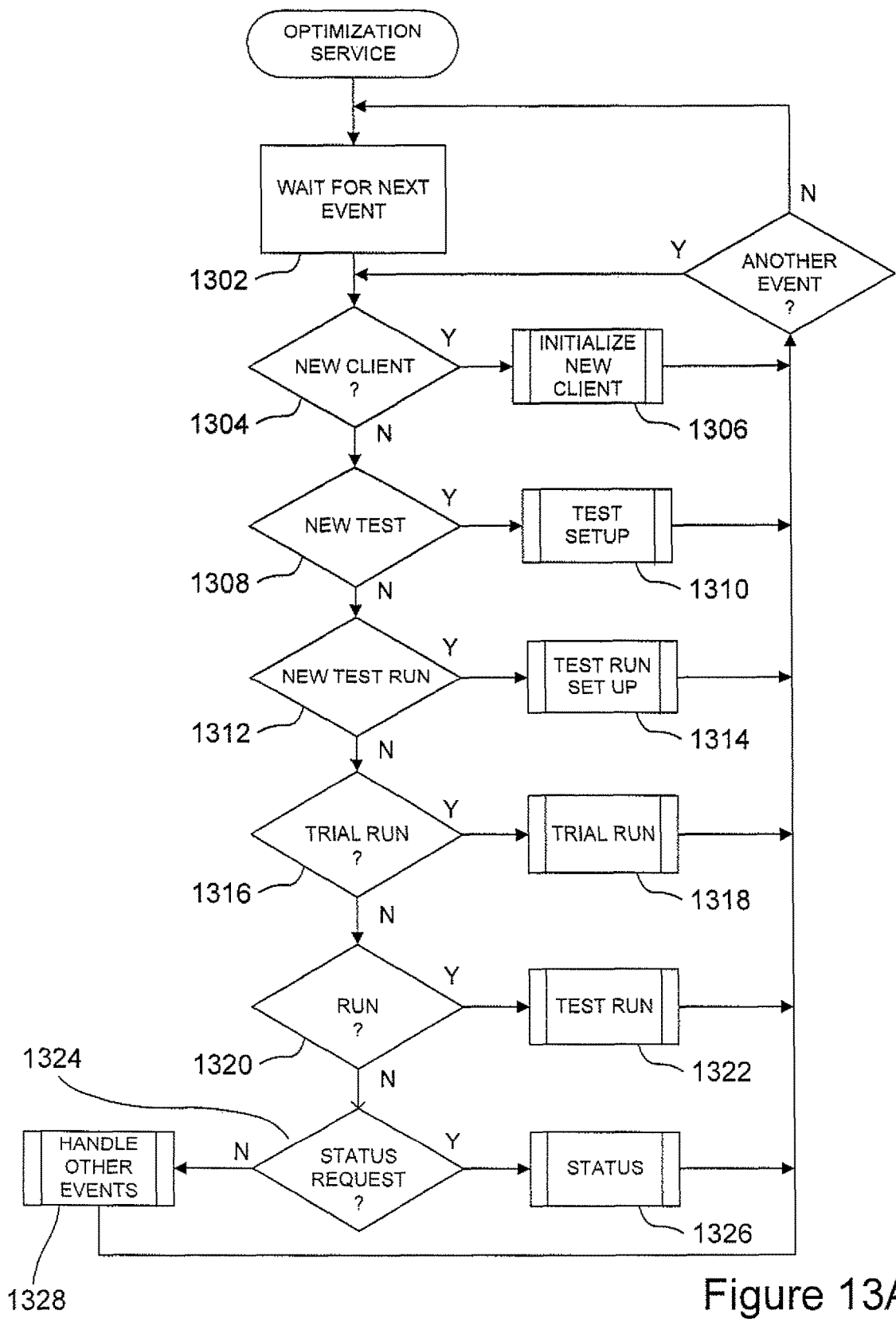
FIGS. 13A-H provide control-flow diagrams for a web-site testing service that represents one implementation of the methods and systems to which the current document is directed.

FIGS. 13A-H provide control-flow diagrams for a website testing service that represents one implementation of the methods and systems to which the current document is directed. FIG. 13A provides a high-level event loop carried out by the testing service on behalf of one or more clients. In step 1302, the testing services waits for a next client-generated event. When the event corresponds to access of the testing-service website for registration by a new client, as determined in step 1304, the routine "initialize new client" is called in step 1306. When the event is a request to construct a new test by an already-registered client through the test-configuration interface, as determined in step 1308, the routine "test setup" is called in step 1310. When the event is a request to configure a new test run, as determined in step 1312, the routine "test run setup" is called in step 1314. When the event is a request to launch a trial run, as determined in step 1316, the routine "trial run" is called in step 1318. When the event is a request to launch a test run, as determined in step 1320, the routine "test run" is called in step 1322. When the event is a status, information request, or information-update request, as determined in step 1324, then the routine "status" is called in step 1326. For example, a client can obtain test-result information during a test run, and can additional obtain analysis results following completion of a test run. Any of various additional types of events are handled in a default event handler in step 1328. Additional events include log-ons to the testing service web site by registered clients, during which clients are authorized and authenticated.

Figure 13B:
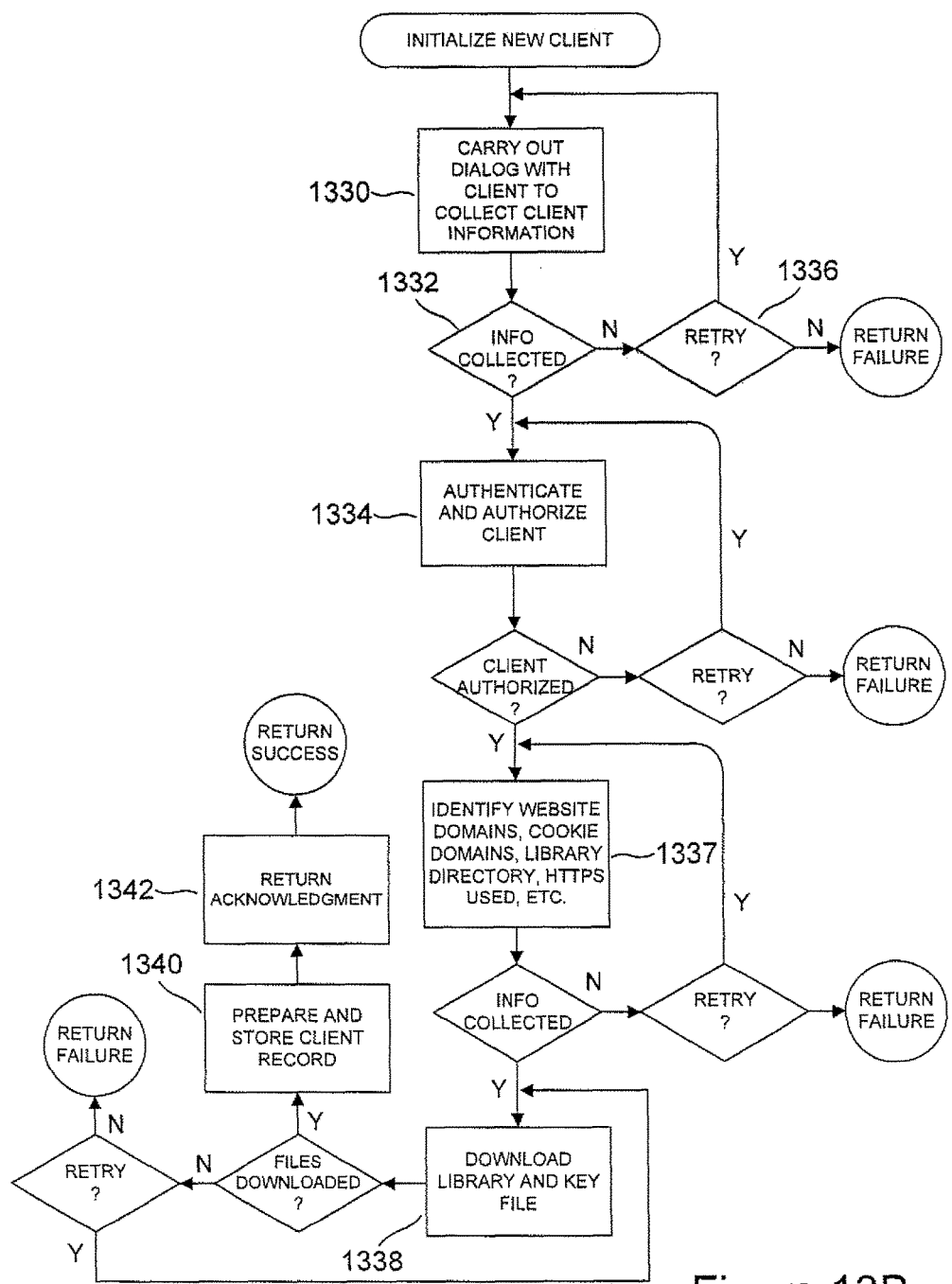

FIG. 13B provides a control-flow diagram for the routine "initialize new client" called in step 1306 of FIG. 13A. In step 1330, the testing service carries out a dialog, through the testing service web site interface, with a prospective client in order to collect information about the client. This information may include the client's name, address, billing address, web site URL, and other such information. If all needed information has been collected through this dialog, as determined in step 1332, then the testing service proceeds to authenticate and authorize the prospective client, in step 1334. Otherwise, as with most of the steps carried out by the testing service during dialogs with clients of the testing service, the testing service may elect to retry a previous step, as determined in the current case in step 1336, in order to make an attempt to acquire the remaining needed information or, in certain cases, may simply return an error message and fail. Once a client has been authorized, the testing service, in step 1337, either through a dialog or via automated methods, determines the web site domains and cookie domains of the client web server, and obtains, from the client, specification of a file-system location at which to download to the client web server the library and key files. In addition, the testing service determines whether or not to use a secure protocol when communicating with client-web-server users and any other information needed for executing tests. Then, in step 1338, the testing service creates and downloads the script library and key files to the client web server. In step 1340, the testing service prepares and stores one or more client records that describe the client and provide a basis for further interactions with the client and, finally, in step 1342, return an acknowledgement to the client. In an actual testing service system, client initialization may contain many additional steps, and may involve solicitation and acquisition of many additional different types of information.

Figure 13C:
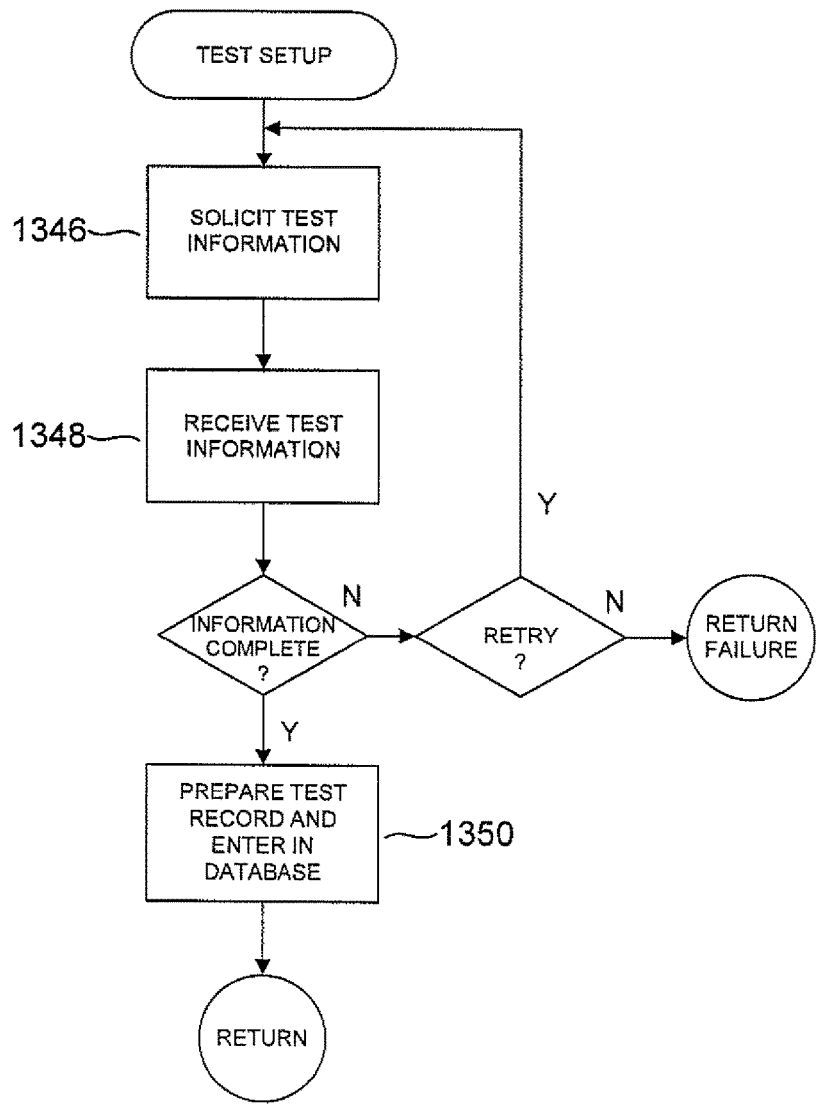

FIG. 13C provides a control-flow diagram for the routine "test set up" called in step 1310 of FIG. 13A. In step 1346, the testing service solicits test information from the client and receives the solicited information in step 1348. Steps may be iterated in order to carry out a dialog during which the needed information to prepare and store a record describing a test is acquired by the testing service. Once the information is received, the testing service prepares a test record and enters the test record in the testing service's database in step 1350 in association with, or referenced by, one or more client records. As discussed above, test information may include a test name, creation date, description, list of factors, and other information that provide a basis for subsequent construction of test runs.

Figure 13D:
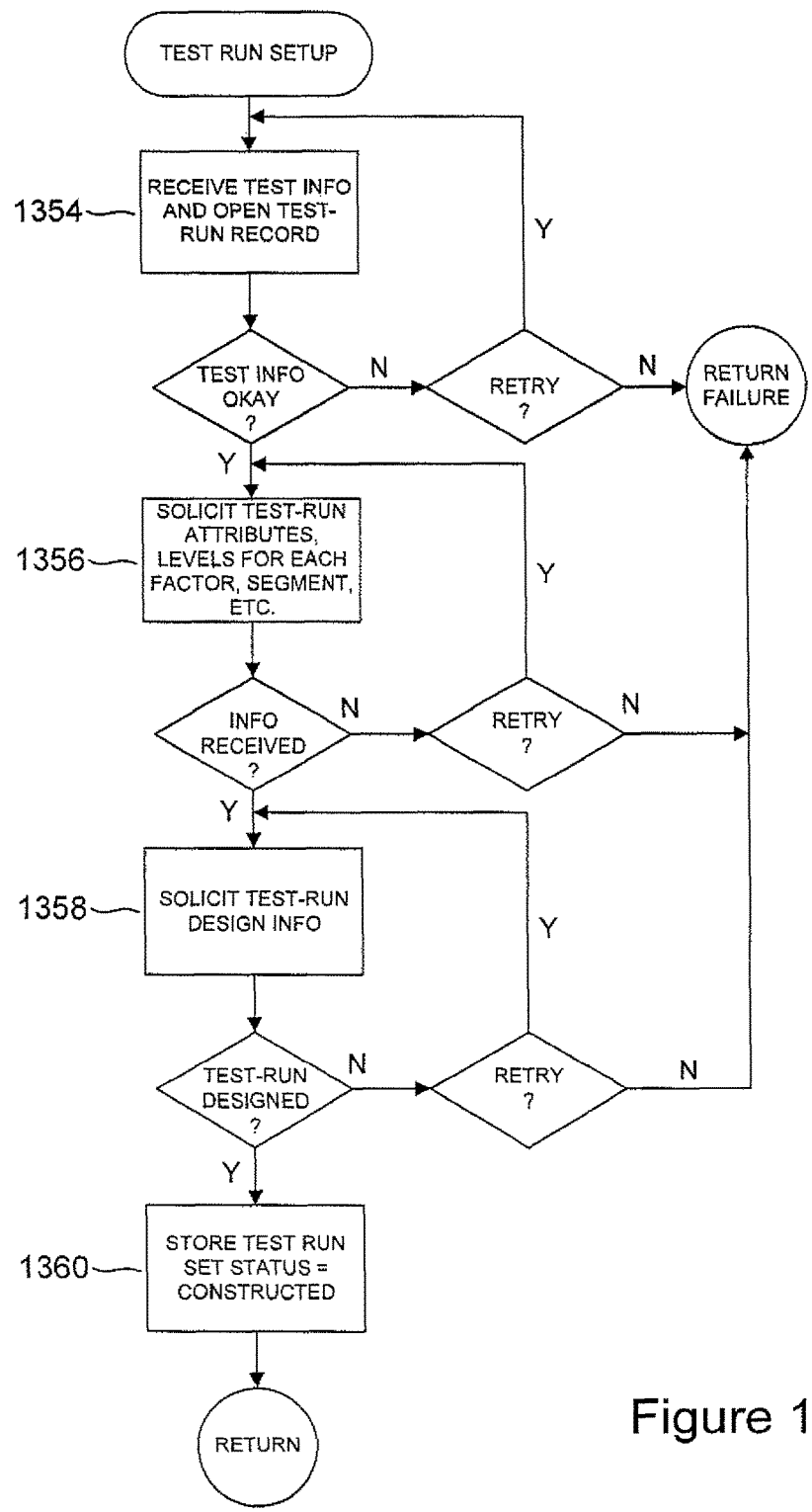

FIG. 13D provides a control-flow diagram for the routine "test run setup" called in step 1314 of FIG. 13A. In step 1354, the testing service receives information about a next test run and opens a test record for the test run. Step 1354 may involve multiple information exchanges with the client. It should also be noted that the client may elect to update or modify an already existing test run, in which case an already existing test-run record is accessed in step 1354. Next, in step 1356, the testing service carries out an information exchange with the client to obtain all the information that defines a test run, including various attributes, the levels for each factor, a specification of a test segment, and other such information. Once that information is received, then, in step 1358, the testing service provides various orthogonal-array-based or other test-design-based testing alternatives to the client, from which the client web server selects a particular test design. Various different orthogonal-array-based test designs or other types of test designs may be associated with different advantages and disadvantages, and selection of an orthogonal-array-based test or other test design may involve consideration of a number of different trade-offs, including potential length of the test run, computational requirements on the testing service, and many other such factors. Finally, in step 1360, the testing service prepares and stores a test-run record and, in addition, sets the test-run status to "constructed." Note that, in certain implementations, an initial under-construction status may be associated with a test run as it is being defined and constructed by the routine "test run setup."

Figure 13E:
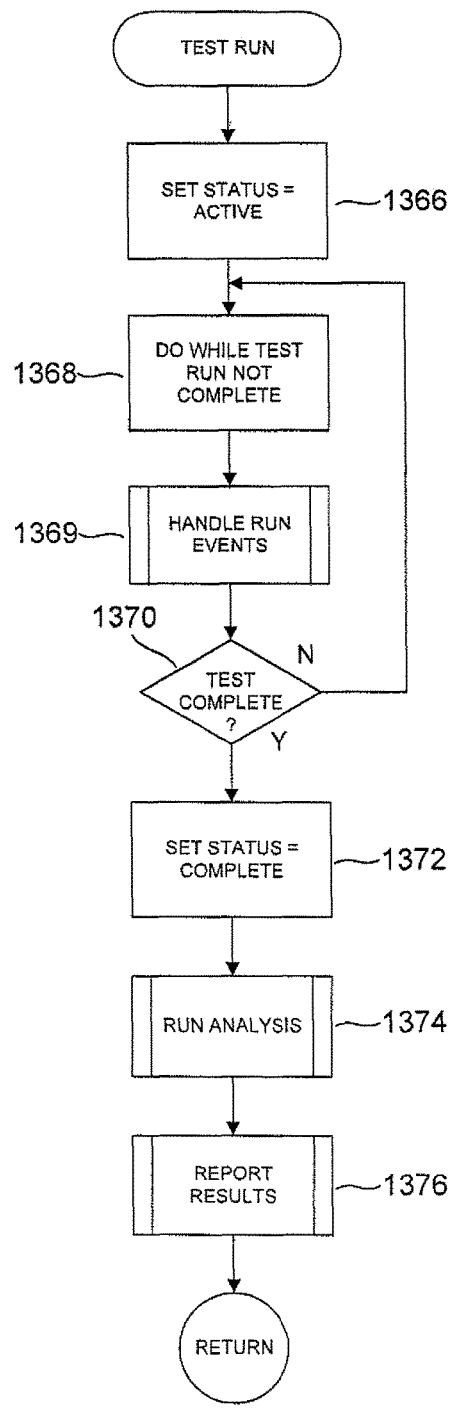

FIG. 13E provides a control-flow diagram for the routine "test run," called in step 1322 of FIG. 13A. In step 1366, the testing service sets the status of the test run to "active." Then, in a continuous loop comprising steps 1368-1370, the testing service continues to handle test-run events, primarily information exchanges with test subjects' computers invoked by execution of script-library routines by users' browsers, until the test is complete, as determined in step 1370. In general, a test run continues until sufficient data has been collected to provide statistically meaningful results. However, various implementations provide additional means for test runs to be halted through the test-configuration interface by clients, and may provide for halting of test runs by the testing service when certain desirable events or test-run-execution characteristics are detected during the test run by the testing service. Once a test run is completed, the testing service sets the status of the test run to "complete," in step 1372, and then may undertake analysis of the test results and reporting of results of the analysis, in steps 1374 and 1376. As briefly discussed, above, results may also be reported to a client during the test run, through the web-site interface.

Figure 13F:
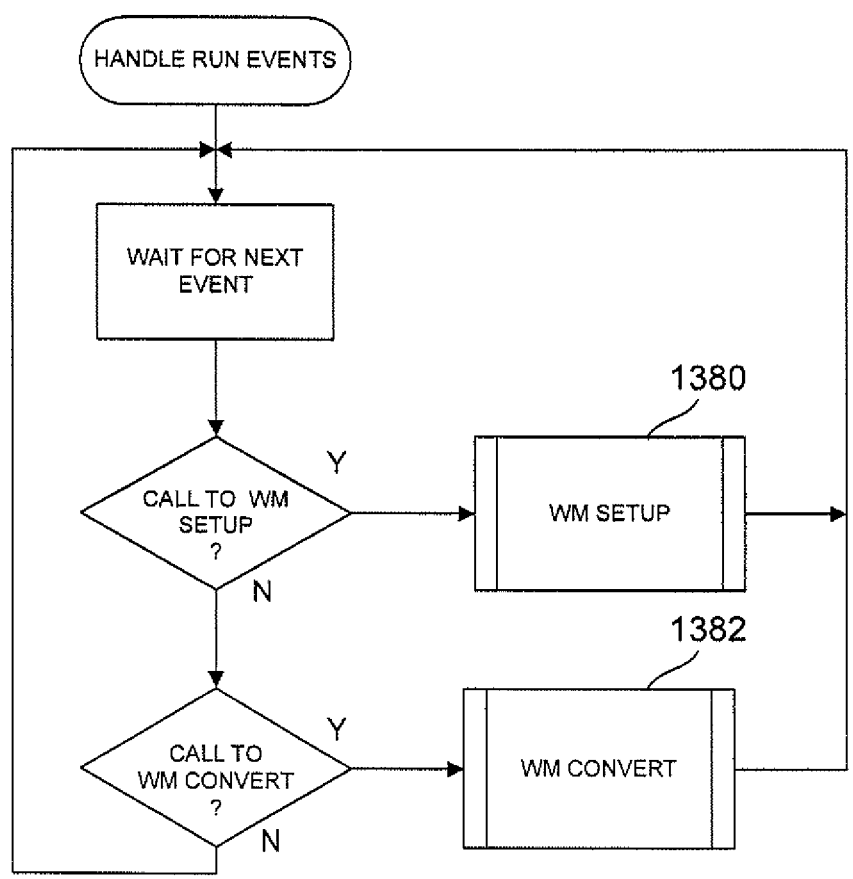

FIG. 13F is a control-flow diagram of the routine "handle run events" called in step 1369 of FIG. 13E. This routine is a simple event handler, in which messages sent from user computers as a result of calls to the script-library routine "WM.setup" by user browsers are handled by a call to the routine "wmsetup," in step 1380, and messages sent from user computers as a result of calls to the script-library routine "WM.convert" by user browsers are handled by a call to the routine "wm convert," in step 1382. Note that the script-library routines "WM.setup" and "WM.convert" are called by a browser running on the user computer, and those script routines, in turn, call routines that initiate an information transmission with the testing service.

Figure 13G:
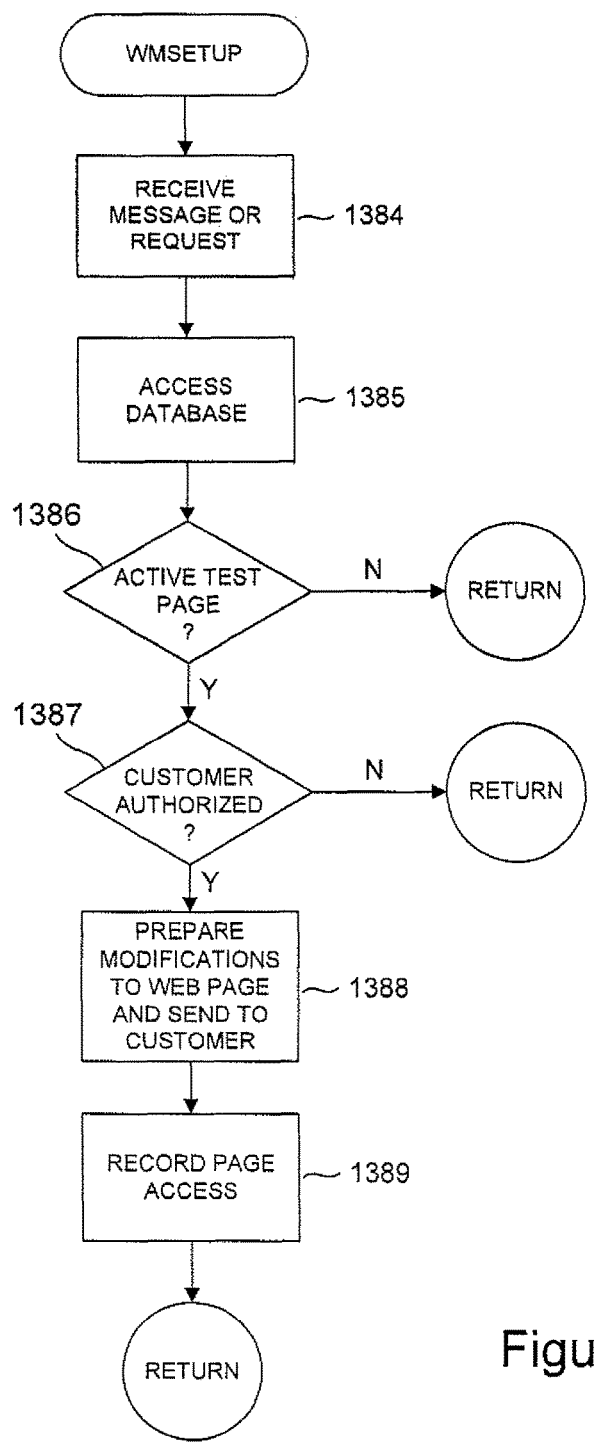

FIG. 13G provides a control-flow diagram of the routine "wmsetup" called in step 1380 of FIG. 13F. In step 1384, the testing service routine receives a message, for request, from a user computer as a result of execution, by a user's browser, of the script-library routine "WM.setup." In step 1385, the testing service uses a URL for the web page being processed to access the database or databases maintained by the testing service in order to determine whether or not the call to WM.setup represents a page-access event or a conversion event, the type of test being run, whether or not the web page is an active test page and the user computer is a valid and active test subject, and other such information. When the test page that included a call to "WM.setup," which, in turn, generated the message or request received in step 1384, is an active test page, as determined in step 1386 by the testing service, and when the user computer is an authorized test subject, as determined in step 1387, then, in step 1388, the testing service then in the case that the call to WM.setup represents a landing-page-access event, prepares the DOM modifications needed to generate an experiment for display on the user computer and transmits those modifications to the user computer. Finally, in step 1389, the testing services records either a landing-page-access event by the user computer or a conversion event, depending on the web page. Note that, in the case that the page from which the call to "WM.setup" was made is not an active test page, or in the case that the user computer is not an active and authorized test subject, the routine "wmsetup" simply returns. In other words, there is almost no performance penalty and no perturbation to the client's web server in the case that a user accesses an inactive test page or in the case that non-test-subject users access test pages. Steps 1384 and 1385 may include one or more information exchanges between the user computer and testing service.

Figure 13H:
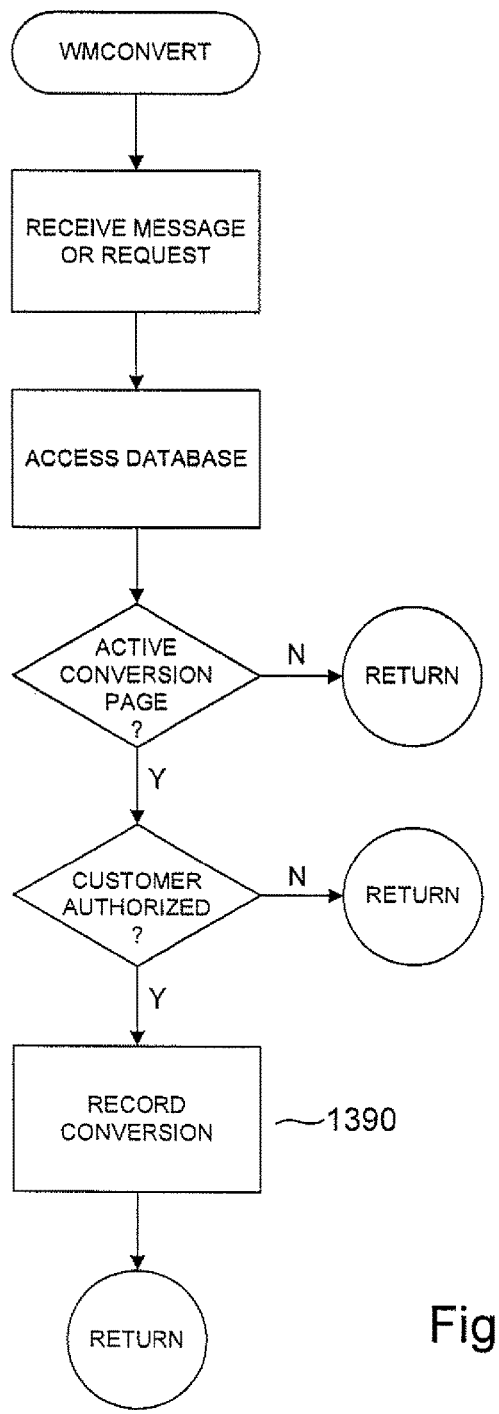

FIG. 13H is a control-flow diagram for the routine "wmconvert" called in step 1382 of FIG. 13F. This routine is similar to the routine "wmsetup," described with reference to FIG. 13G. The primary difference is that this routine is only called for a conversion event, which is recorded, in step 1390, as conversion event in a testing-service database.

The routine "trial run," called in step 1318 of FIG. 13A, is similar to the routine test-run, discussed above, with the exception that a trial-run status may be set for the test run during a trial run. The routine "trial run" is not further discussed. The routine "status," called in step 1326, returns status information with respect to test runs and other information about tests, test runs, and clients. Implementation of this routine is strongly dependent on the particular database organizations used by the testing service and on the particular web-site interface provided to clients, and is not further discussed.

FIG. 14 shows the HTML modifications used to virtually incorporate a testing service that represents one implementation of the methods and systems to which the current document is directed into a web site. The HTML code, previously shown in FIG. 3, includes first statement 1402 that directs a browser to download the script-routine library and a second statement 1404 that calls a script-library entry point "WM.setup" that results in sending a message or request to the testing service to indicate a landing-page-access event or page-access-conversion event. A page that includes a displayed object, activation of which is defined to be a conversion even, is similarly modified to include a call to the library routine "WM.convert." By merely adding two statements to an HTML file, or three in the case that the page corresponds both to a landing-page-access event and to a conversion event, the HTML file becomes a potential test web page, and the testing service is virtually incorporated into the client web server. Again, the statements used to modify landing-access-event-associated web pages are identical for all such web pages, as is the statement that is used to modify display-objects associated with conversion events. A client can easily write a script or other program, or use a content-management-system programming interface to introduce these identical statements into web pages. FIG. 15 provides an exemplary script-library download service that represents one implementation of the methods and systems to which the current document is directed by a testing into a web-site server.

New, More-Efficient Testing Methods and Testing Systems

Figure 16:
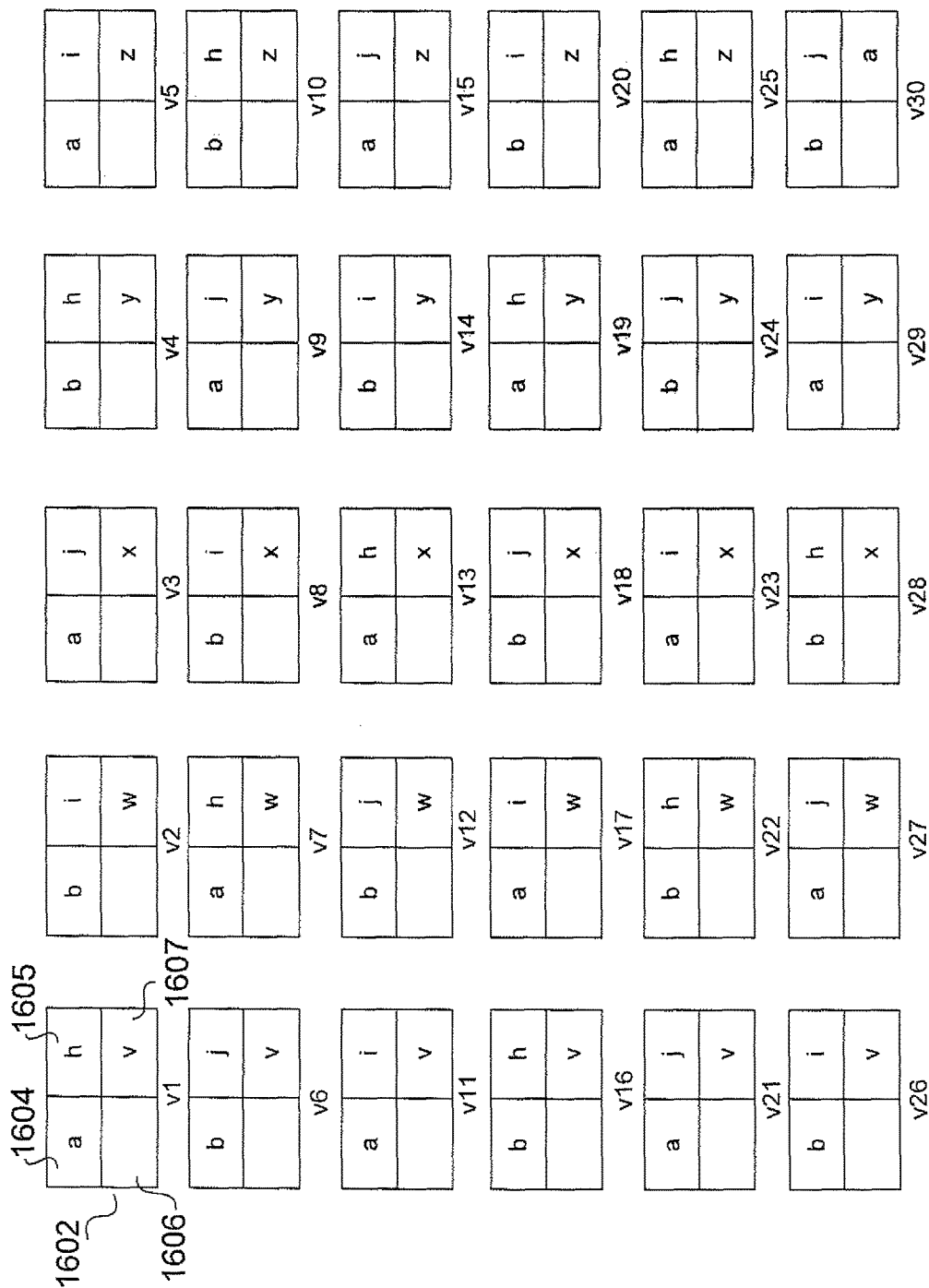
FIG. 16 illustrates a set of web-page variants that are to be tested using a web-page testing system.

FIG. 16 illustrates a set of web-page variants that are to be tested using a web-page testing system, such as that described in the first subsection, above. In FIG. 16, each web-page variant is represented by a rectangle, such as rectangle 1602. Each rectangle includes four regions, such as the regions 1604-1607 in rectangle 1602. The contents of the three regions 1604-1605 and 1607 are varied during the web-page test. Region 1606 is constant for all web-page accessors. Region 1604 can have one of two variations selected from the set {a, b}. The elements of the set are symbolic representations of the text, graphics, or other information displayed in region 1604. Region 1605 can have one of three variations selected from the set {h, i, j}. Region 1607 can have one of three variations selected from the set {v, w, x, y, z}. FIG. 16 shows the 30 different web-page variants obtained by combinations of the variations for the three regions. The cardinalities of the three sets of variations are 2, 3, and 5. Thus, there are 2·3·5=30 different possible web-page variants. Each variant, such as variant 1602, is labeled with a variant name. In the case of variant 1602, the variant name is "V1."

Figure 17A:
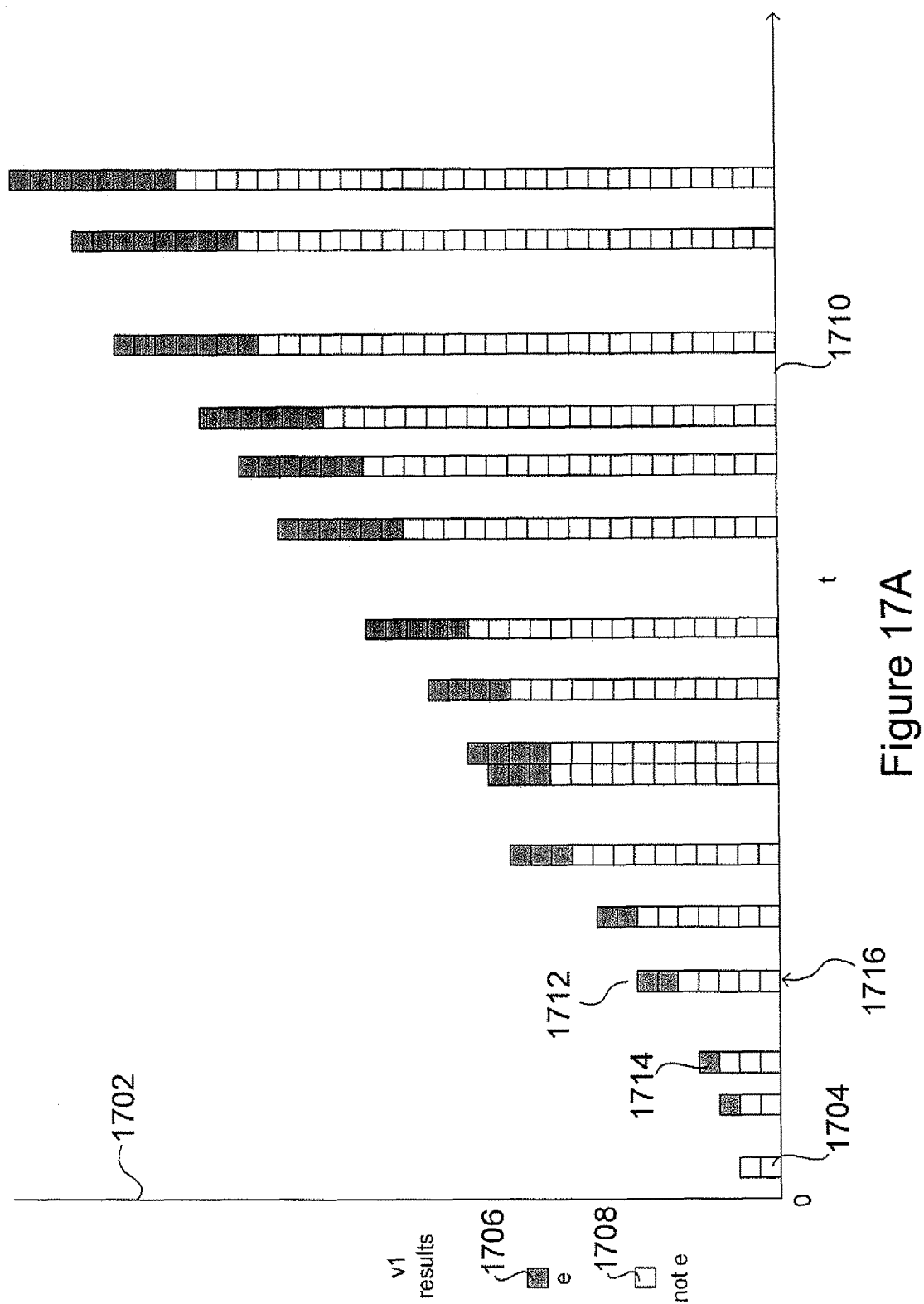
Figure 17B:
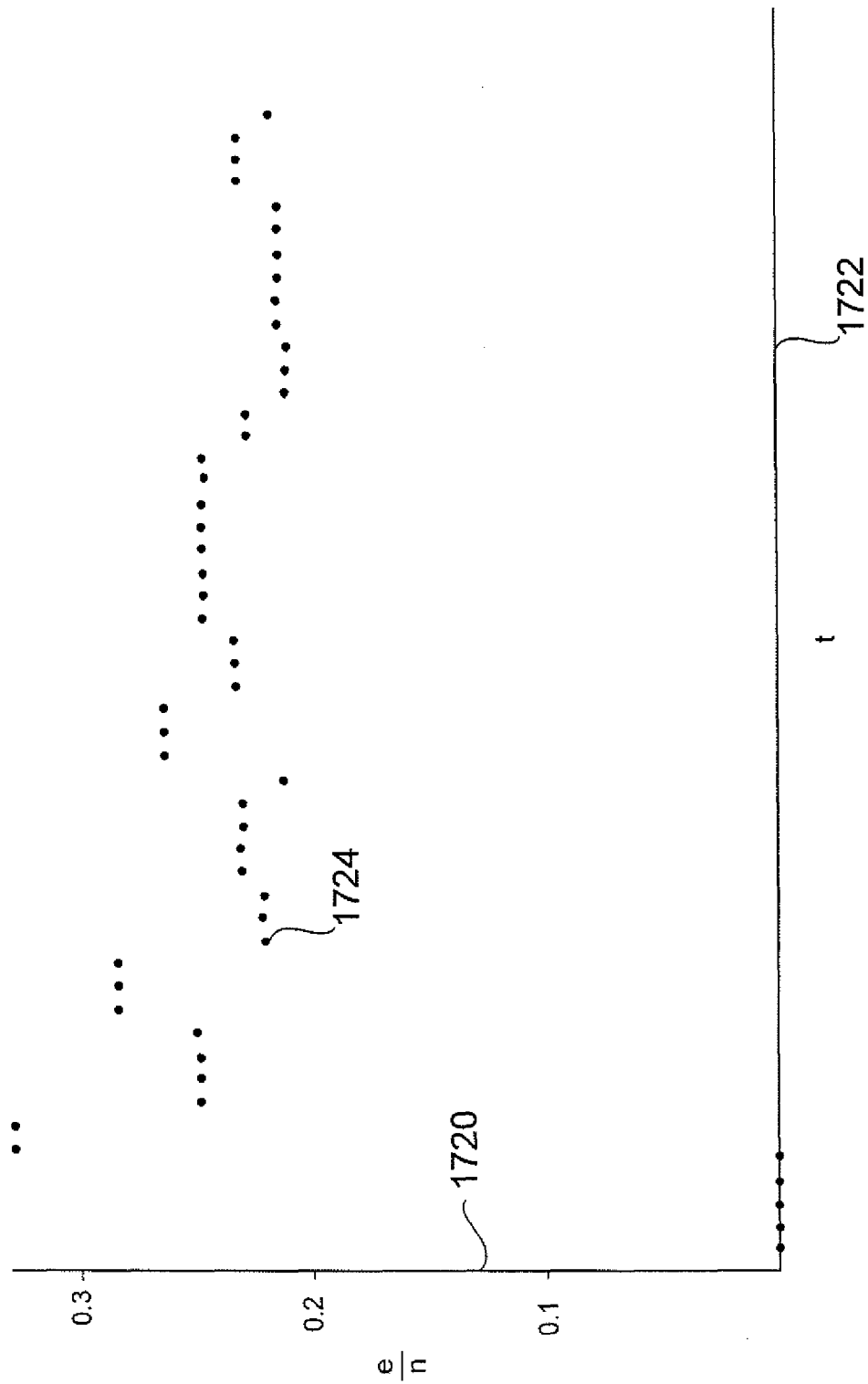

FIGS. 17A-C illustrate collection of data, over time, for web-page variant V1 during the course of web-page testing. In FIG. 17A, a plot is shown of the accumulation of data over time. The vertical axis for the plot 1702 represents the number of accesses to web-page variant V1. Each access, or each fixed number of accesses, are represented by a small rectangle, such as small rectangle 1704. A shaded small rectangle 1706 represents one or a fixed number of accesses in which a positive event occurred. An unshaded small rectangle 1708 represents one or a fixed number of accesses in which a non-positive event occurred. A positive event may be a conversion and the complementary non-positive event is an access to the web-page variant that did not lead to a conversion. However, as mentioned in the previous subsection, a positive event may be any action or particular event that occurs during access to the web-page variant, with the complementary non-positive event representing an access to the variant web page during which the action or an occurrence of the particular event is not detected. A positive event, for example, may be navigation, through a link displayed on the variant web page, to another web page within a fixed, maximum amount of time. As another example, a positive event may be display of the variant web page to a user for more than a minimum amount of time. Any detectable condition or action, or sequence or set of detectable conditions or actions, can be defined as the positive event for a web-page test.

The horizontal axis of the plot 1710 represents time. The columns of rectangles positioned along the horizontal axis, such as column 1712, represent the data collected for the variant web page at the point in time represented by the intersection of the base of the column with the horizontal axis. A next column is shown in the plot when the accumulated data changes. Thus, the accumulated data represented by column 1714 remained constant until the time 1716 corresponding to column 1712. The accumulated data represented by column 1712 indicates that $\frac{2}{7}$ of the accesses to the variant web page resulted in detection of the positive event. The heights of the columns increase over time as more variant web pages are provided to the number web-page accessors as the test proceeds.

FIG. 17B shows a different plot that represents the same information displayed in FIG. 17A. In FIG. 17B, the vertical axis 1720 represents the ratio of the number of detected positive events to the total number of accesses, $$\frac{e}{n}.$$

Note that, in this notation, the symbol e refers to the number of positive events. The horizontal axis again represents time. Each point in the plot, such as point 1724, represents the ratio $$\frac{e}{n}$$

at each successive, discrete time point during the test. As indicated above, the ratio $$\frac{e}{n}$$

is computed from the columns shown in FIG. 17A as the ratio of the number of small shaded rectangles to the total number of rectangles in the columns.

FIG. 17C shows yet another plot that represents the same information displayed in FIG. 17A. The plot shown in FIG. 17C uses the same axes that are used in FIG. 17B. In the plot shown in FIG. 17C, the points plotted in FIG. 17B are connected by line segments to produce a curve-like representation of the discrete data 1702, or an curve. Another dashed-line curve 1704 represents the number of accesses and at each point in time. This dashed-line curve can be thought of as being generated from the heights of the columns shown in FIG. 17A.

The horizontal axis is partitioned into three regions by time points $t_0$ 1706, $t_u$ 1707, and $t_s$ 1708. In the first region 1710, from time points $t_0$ to $t_u$, the $$\frac{e}{n}$$

curve is quite erratic, shooting suddenly from the lowest possible $$\frac{e}{n}$$

value to the maximum observed $$\frac{e}{n}$$

value in a very short space of time. The reason for this erratic behavior is that, in this region, an insufficient number of variant-web-page accesses, or samples, have occurred to provide a statistically meaningful estimate of the ratio $$\frac{e}{n}.$$

In the second region 1712, between time points $t_0$ and $t_s$, the $$\frac{e}{n}$$

curve 1702 is unstable, oscillating relatively rapidly between relatively low and relatively high values. In the final region 1714, extending rightward from time point $t_s$, the $$\frac{e}{n}$$

curve becomes reasonably stable. Fluctuations in $$\frac{e}{n}$$

ratio, in this stable region, generally reflect changing conditions during the test. For example, a news story or news bulletin distributed during the test may influence web-page accessors to generate a greater number of positive events. As another example, lowering of the price of a product or service by a competitor to the owner of the web site being tested may influence web-page accessors to generate a fewer number of positive events. Clearly, testing of variant web pages generally needs to proceed until sufficient data is accumulated for all of the $$\frac{e}{n}$$

curves for the web-page variants to reach a stable region 1714. Of course, the amount of time required for a particular $$\frac{e}{n}$$

curve to reach stability may differ from the amount of time required for a different $$\frac{e}{n}$$

curve for a different variant to reach the stable region.

Figure 18:
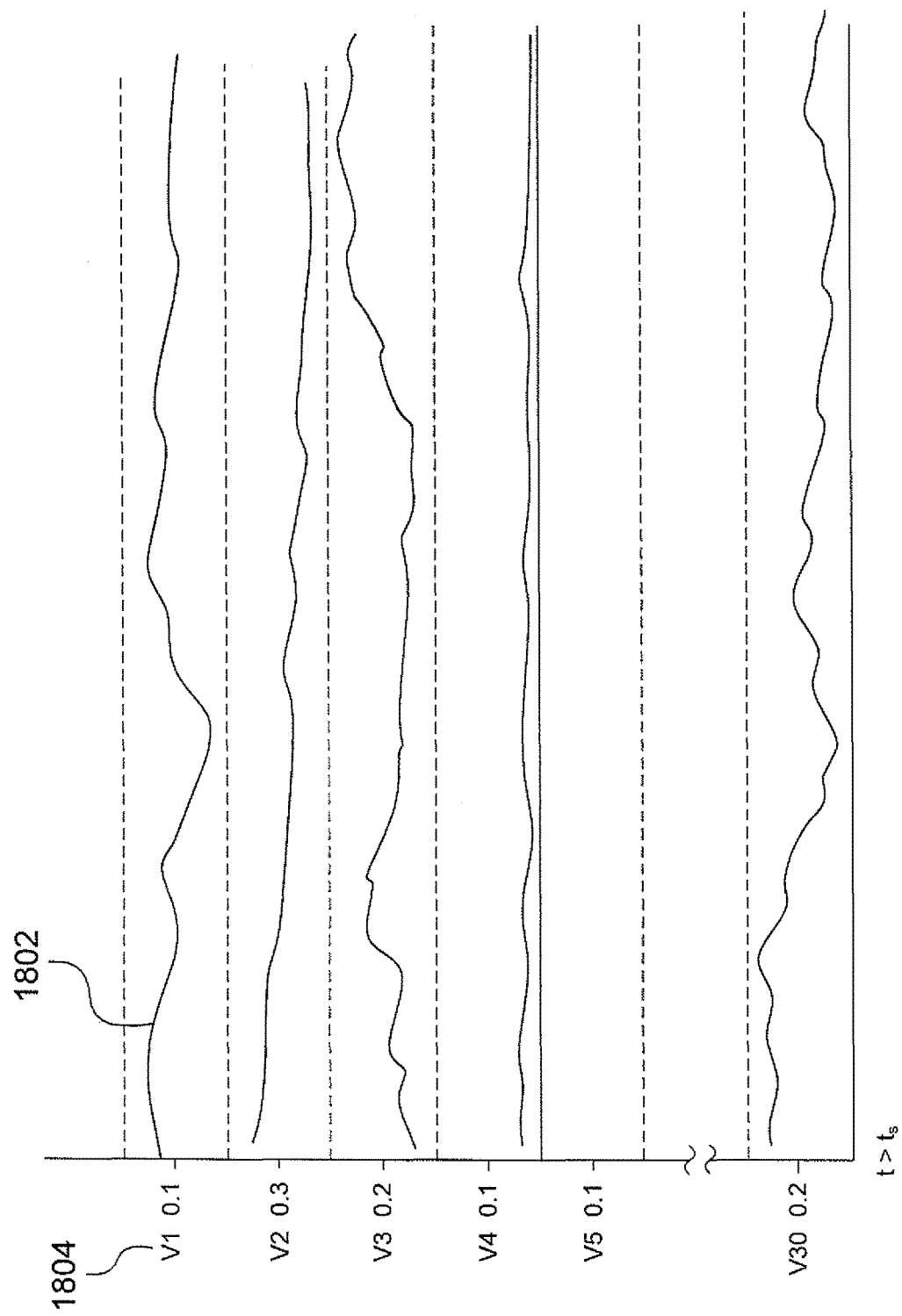
FIG. 18 illustrates the parallel nature of a web-page-variant testing.

FIG. 18 illustrates the parallel nature of a web-page-variant testing. As mentioned above, during testing, each of the web-page variants is repeatedly accessed by web-site users, with each access generating either a non-positive or positive event. Thus, as shown in FIG. 18, during testing, each web-page variant can be thought of as producing an $$\frac{e}{n}$$

curve, as discussed above with reference to FIGS. 17A-C. In the plot shown in FIG. 18, each $$\frac{e}{n}$$

curve, such as $$\frac{e}{n}$$

curve 1802, is associated with a particular web-page variant, such as web-page variant V1 1804 that is associated with $$\frac{e}{n}$$

curve 1802.

Figure 19A:
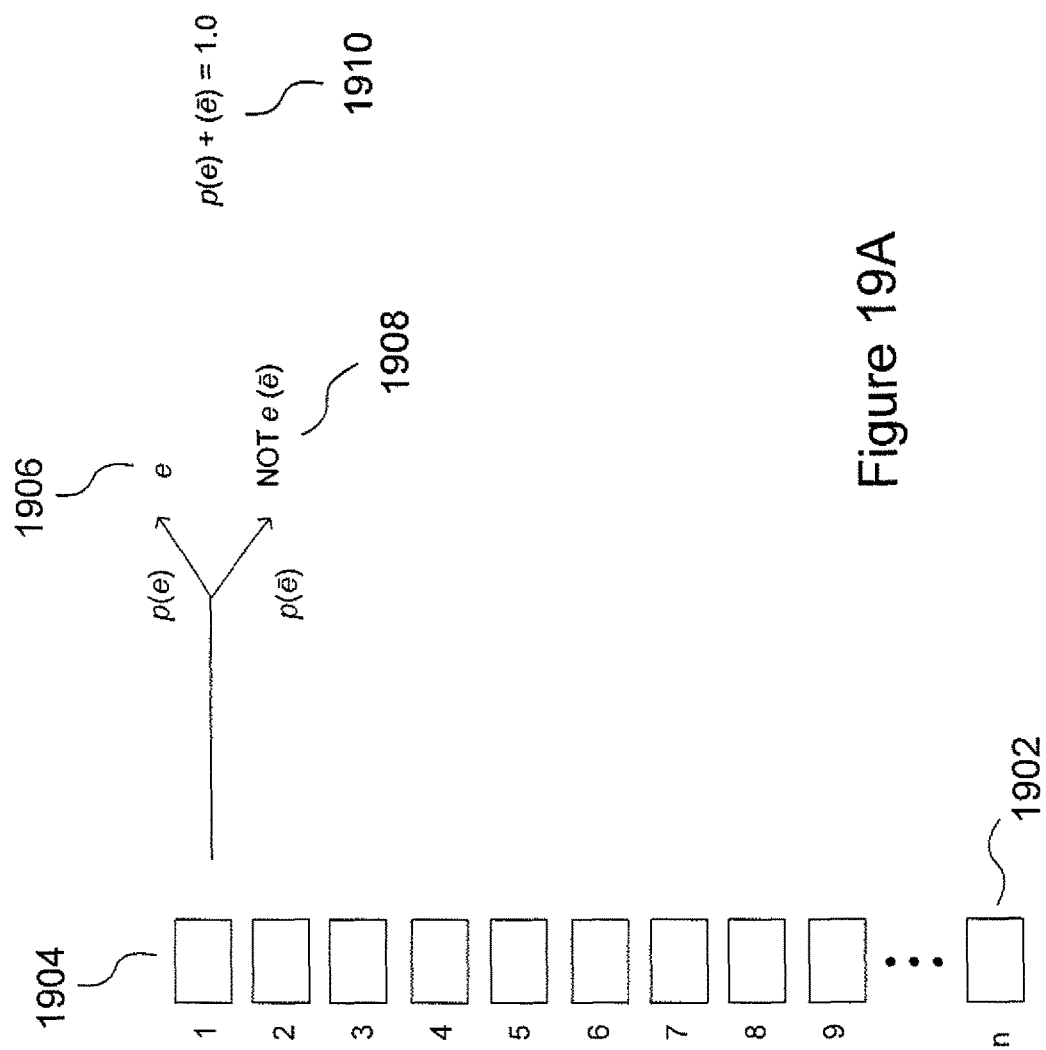
FIGS. 19A-C illustrate modeling the positive-event/non-positive-event data accumulated for a particular web-page variant using positive-event and non-positive event probabilities and the binomial distribution.
Figure 19B:
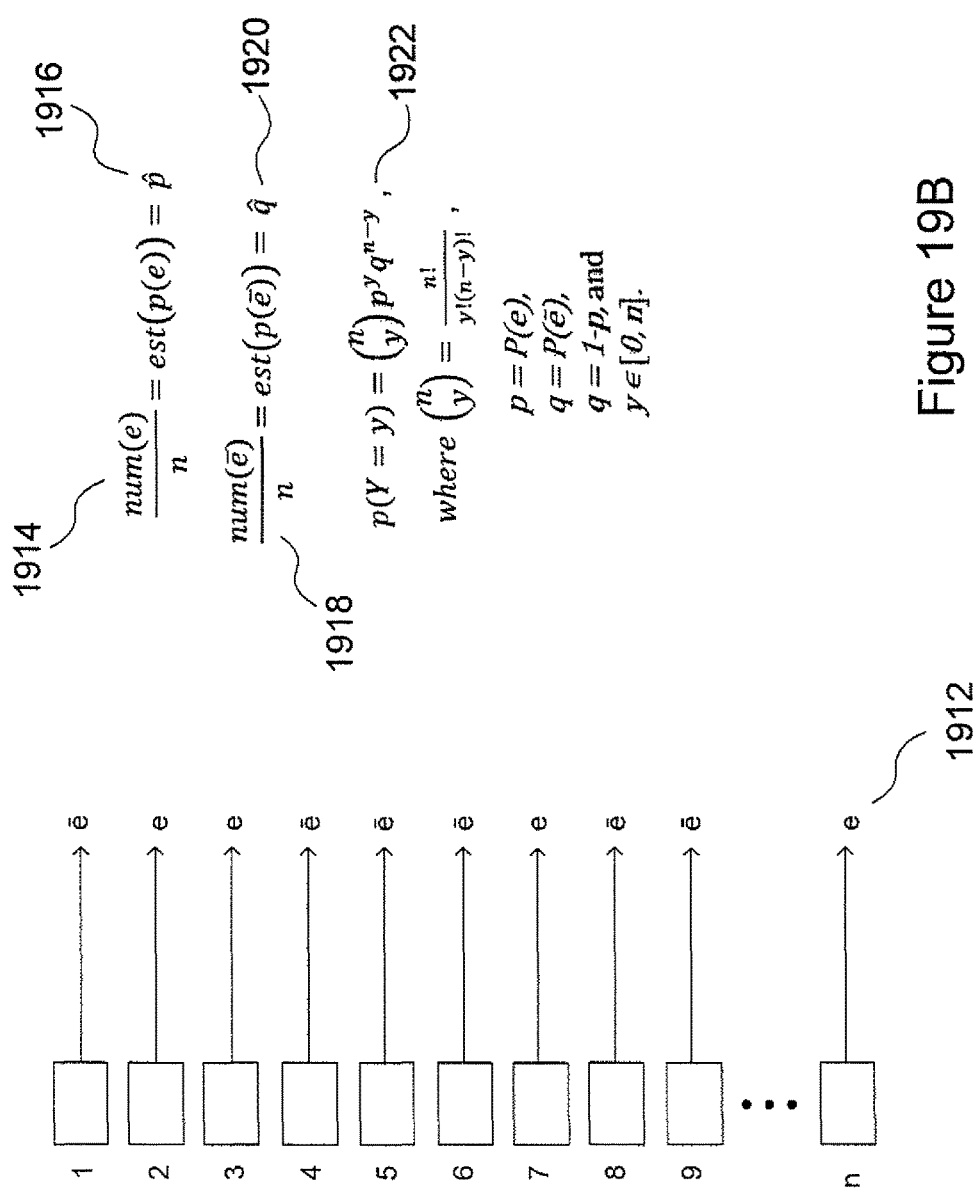
Figure 19C:
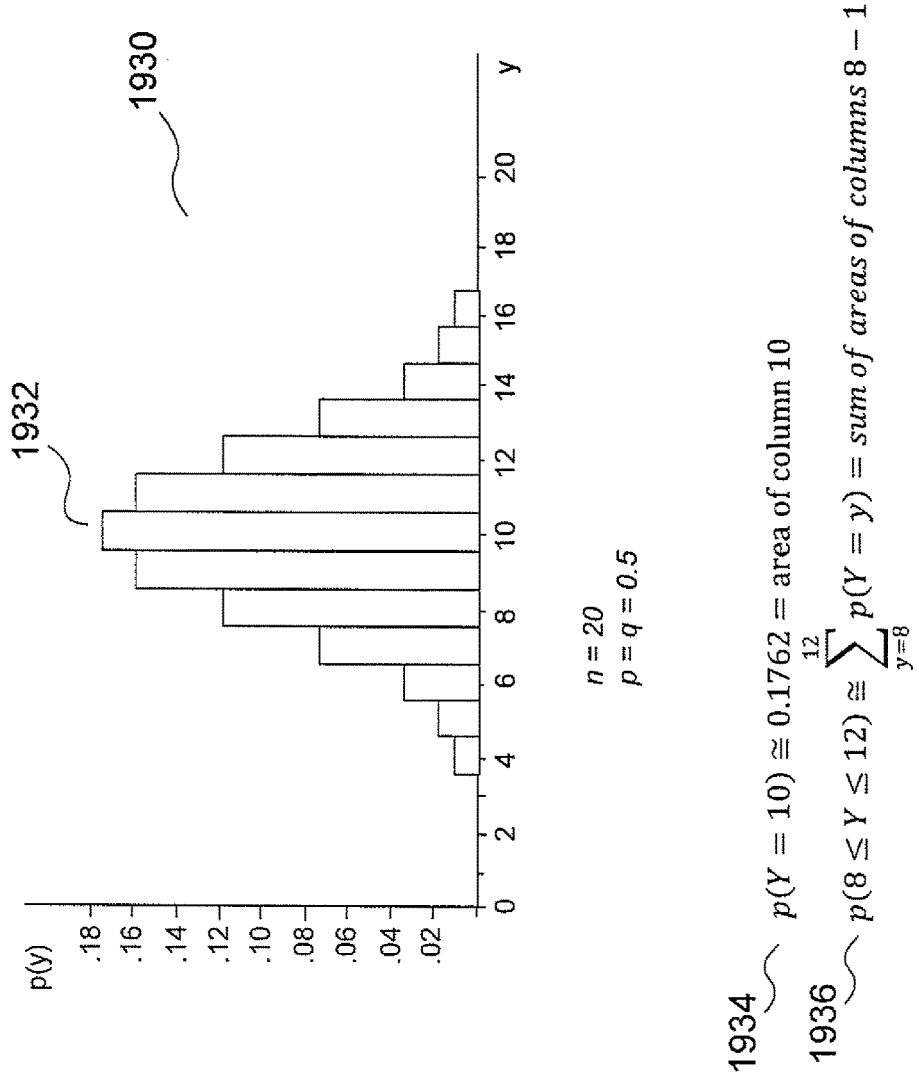

FIGS. 19A-C illustrate modeling the positive-event/non-positive-event data accumulated for a particular web-page variant using positive-event and non-positive event probabilities and the binomial distribution. In FIG. 19A-C, access to a particular web-page variant during testing is represented by a column of rectangles 1902, including rectangle 1904. Each access is represented by a single rectangle. The web-page variant is accessed n times during testing, represented by the rectangles with numeric indices 1, 2, 3, . . . , n in column 1902. As shown in FIG. 19A, each access to the particular web-page variant leads to either a positive event 1906, with an assumed probability of p(e) or to a non-positive event $\bar{e}$ 1908 with an assumed probabilities of p($\bar{e}$), or 1−p(e). The sum of the assumed probabilities is equal to 1.0 1910. Note that, in this notation, the symbol e refers to a positive event, or positive outcome, for a sample, or web-page access.

As shown in FIG. 19B, each access to the particular web-page variant leads to one of the two outcomes e or $\bar{e}$. These outcomes are shown in the column of outcomes 1912, each outcome corresponding to a rectangle-represented variant-web-page access. A random variable Y is equal to the number of observed positive events among n accesses to a web-page variant. The ratio of the number of positive outcomes to the total number of variant-web-page accesses 1914 is an estimate $\hat{p}$ 1916 for the probability p(e). The ratio of the number of non-positive outcomes to the total number of variant-web-page accesses 1918 is an estimate $\hat{q}$ 1924 for the probability p($\bar{e}$), also referred to a "q." The probability that the observed number of positive events Y is equal to a particular number y, p (Y=y), is given by the binomial-distribution expression 1922.

FIG. 19C shows a plot of the binomial distribution for n=20 samples when p=q=0.5. The plot 1930 shows a discrete distribution that is symmetric about the peak column 1932 corresponding to y=10. The probability that Y=10 (1934) is equal to the area within column 1932 which is, in turn, equal to 0.17624 in the plotted distribution 1930. The probability that Y falls within the range [8, 12] (1936) is computed as the sum of the areas of the columns corresponding to y=8 through 12. The binomial distribution, being discrete, can alternatively be represented by a probability mass function, for which each point on the x-axis has a mass, plotted with respect to the y-axis, that corresponds to the probability of occurrence of the outcome represented by the point on the x-axis. The total mass, of course, sums to 1.0.

Figure 20:
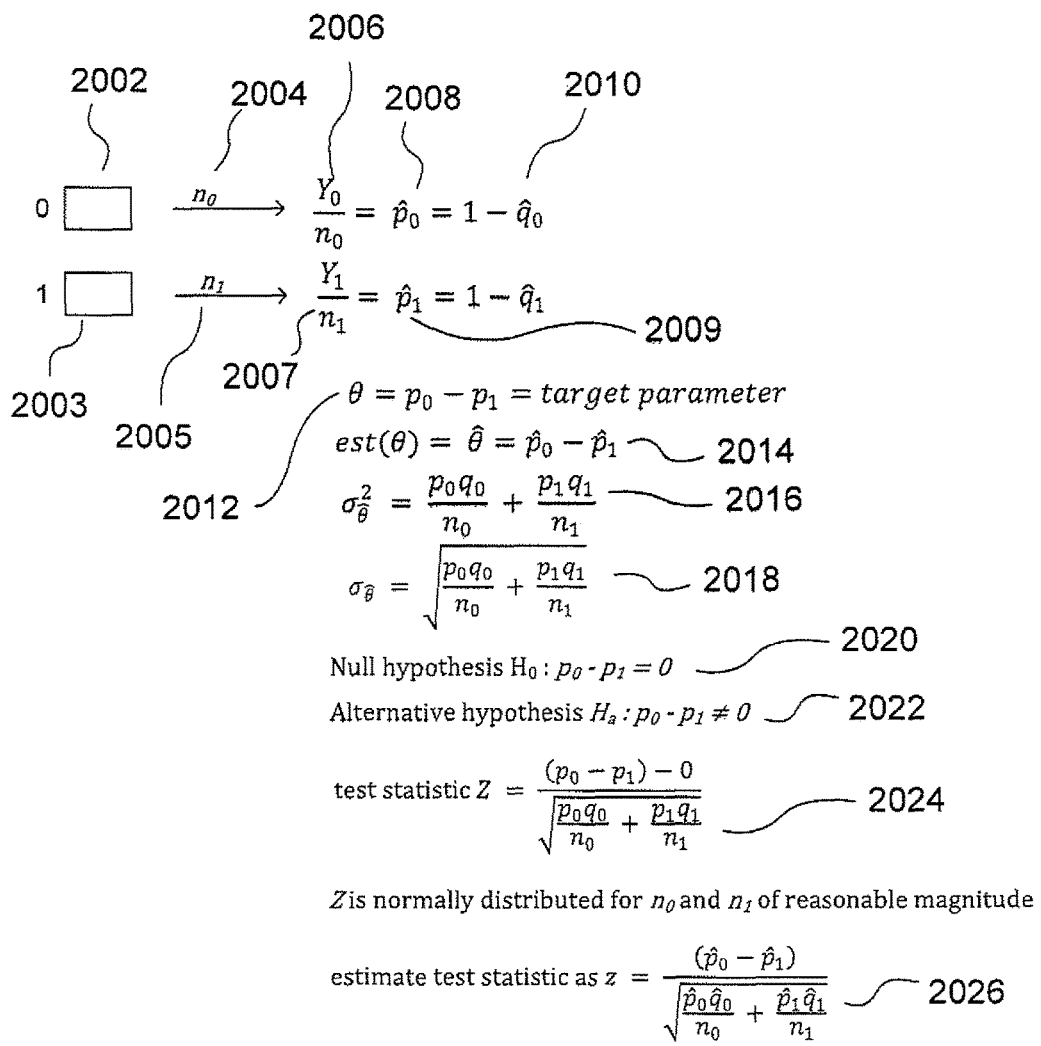
FIGS. 20-22 illustrate hypothesis testing based on observed positive-event frequencies to determine whether or not the probability of a positive event for an access to a first variant web page differs from the probability of a positive event for an access to a second variant web page.
Figure 21:
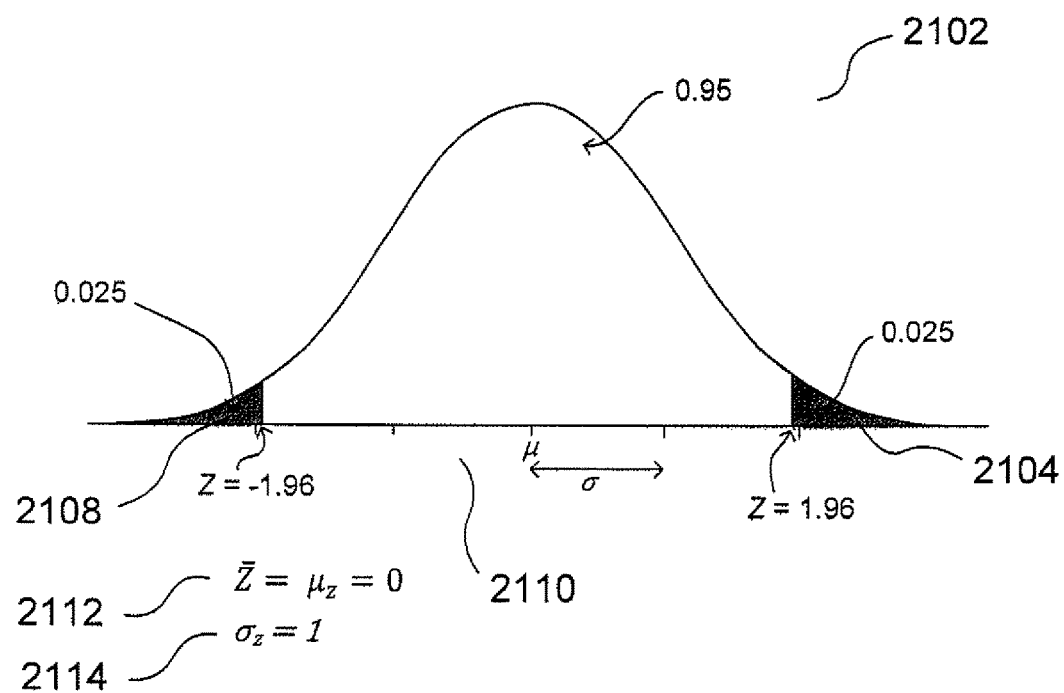
Figure 22:
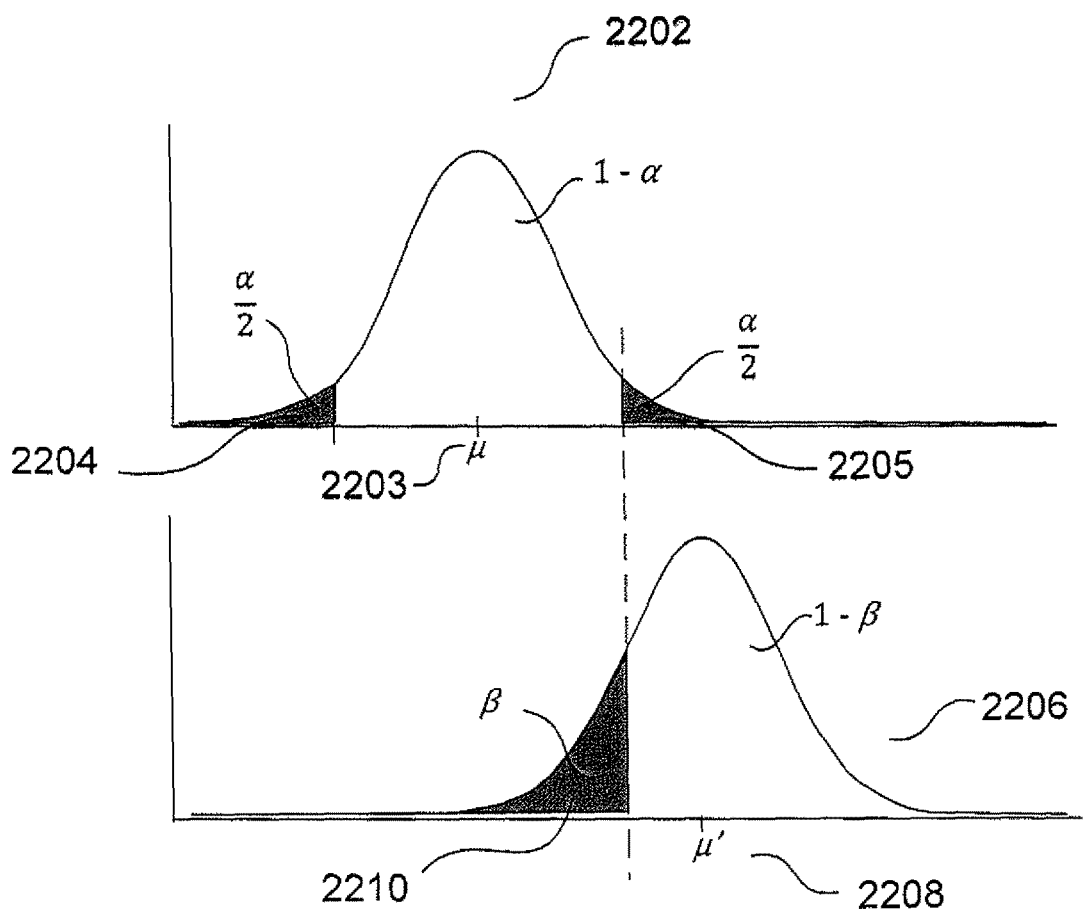

FIGS. 20-22 illustrate hypothesis testing based on observed positive-event frequencies to determine whether or not the probability of a positive event for an access to a first variant web page differs from the probability of a positive event for an access to a second variant web page. As shown in FIG. 20, during testing, a first variant web page 0 (2002) is accessed no times 2004, producing an observed number of positive events $Y_0$ 2006 from which an estimate for the probability of a positive event for variant web page 0, $\hat{p}_0$ 2008, is computed by dividing $Y_0$ by $n_0$. The estimated probability $\hat{p}_0$ is, of course, equal to 1−$\hat{q}_0$ 2010. Similarly, a second variant web page 1 (2003) is accessed $n_1$ times 2005, producing an observed number of positive events $Y_1$ 2007 from which an estimate for the probability of a positive event for variant web page 1, $\hat{p}_1$ 2008, is computed by dividing $Y_1$ by $n_1$. The estimated probability $\hat{p}_1$ is, of course, equal to 1−$\hat{q}_1$ 2010. For hypothesis testing, a target parameter θ 2012 is selected as the probability difference $p_0−p_1$. An estimate for the target parameter, $\hat{\theta}$, is $\hat{p}_0−\hat{p}_1$ 2014. The variance for the estimated target parameter $\hat{\theta}$ is shown in expression 2016. The standard deviation for the estimated target parameter $\hat{\theta}$ is shown in expression 2018 and is, of course, the square root of the variance.

The null hypothesis $H_0$ is that the target parameter θ, $p_0−p_1$, is equal to 0 (2020). When the null hypothesis is accepted, based on the observed data, the conclusion of the hypothesis test is that there is no statistically meaningful difference between $p_0$ and $p_1$. The alternative hypothesis $H_a$ is that the target parameter θ is not equal to 0 (2022). When the alternative hypothesis is accepted, based on the observed data, the conclusion of the hypothesis test is that there is a statistically meaningful difference between $p_0$ and $p_1$.

A test statistic Z for determining whether to accept the null hypothesis or the alternative hypothesis is given by expression 2024. The test statistic is approximately normally distributed when the number of accesses to the web-page variants and 0 and 1 are both greater than a threshold value. The test statistic distribution has a mean of 0 or, in other words, is symmetric about the Z=0 point on the horizontal axis (as shown in FIG. 21 and discussed below). An estimate of the value of the test statistic z is obtained using the estimated probabilities $\hat{p}_0$, $\hat{p}_1$, $\hat{q}_0$, and $\hat{q}_1$, as shown in expression 2026.

Paragraph FIG. 21 illustrates the normally distributed test statistic Z as well as the acceptance regions and rejection regions for the test statistic. Plot 2102 shows the normal distribution for the test statistic Z. When Z is equal to twice the standard deviation for the standard normal distribution, or, in other words, when Z=1.96, the area under the remaining portion of the distribution curve 2104, shaded in FIG. 21, is equal to 0.025, or 2.5% of the total area 1.0 under the distribution curve. Similarly, when Z has a negative value equal to twice the standard deviation for the normal distribution, or, in other words, when Z has the value −1.96 (2106), the area under the remaining portion of the distribution curve 2108, shown shaded in FIG. 21, is also 0.025. When the estimate for the Z test statistic, z, computed from the observed data for variant web pages 0 and 1 falls within the range [−1.96, 1.96], referred to as the "acceptance region," the null hypothesis $H_0$ is accepted with a 95% level of confidence, since, when the null hypothesis is true, the probability of falsely rejecting the null hypothesis is the total shaded area in plot 2102 under the distribution curve which is equal to 0.025+0.025=0.05, or 5%. When the computed test statistic z falls outside of the acceptance range or, in other words, within either of the two rejection ranges corresponding to the line segments underlying the shaded areas beneath the distribution curve, then the alternative hypothesis $H_a$ is accepted, also with a 95% confidence level.

FIG. 22 illustrates the significance level and the power of a hypothesis-testing method. In FIG. 22, two normal test-statistic distribution plots are shown aligned with respect to their horizontal axes. The first distribution 2202 has mean μ 2203 and represents an assumed distribution for the test statistic. The probability of falsely rejecting a true null hypothesis $H_0$ is equal to the sum of the shaded areas 2204-2205 below the first distribution curve, when the assumed distribution is correct. The sum of these two areas is α and is referred to as the "significance level" for the hypothesis-testing method. The value 1−α is the confidence level for the test when the assumed distribution is correct. The second distribution 2206 represents a subsequently determined correct probability distribution for the test statistic that has a mean μ' 2208. The second distribution can be thought of as an alternative hypothesis $H_a$. Given that the second distribution 2206 is the actual probability distribution for the test statistic, the shaded area 2210, having an area β, is the probability of falsely accepting the null hypothesis $H_0$ based on the test statistic computed for the first distribution. The remaining area beneath the second distribution curve, shown unshaded in FIG. 22, with area 1−β, is the probability of rejecting a false null hypothesis $H_0$ based on the test statistic computed for the first distribution. The value 1−β is referred to as the power of the hypothesis test.

Figure 23:
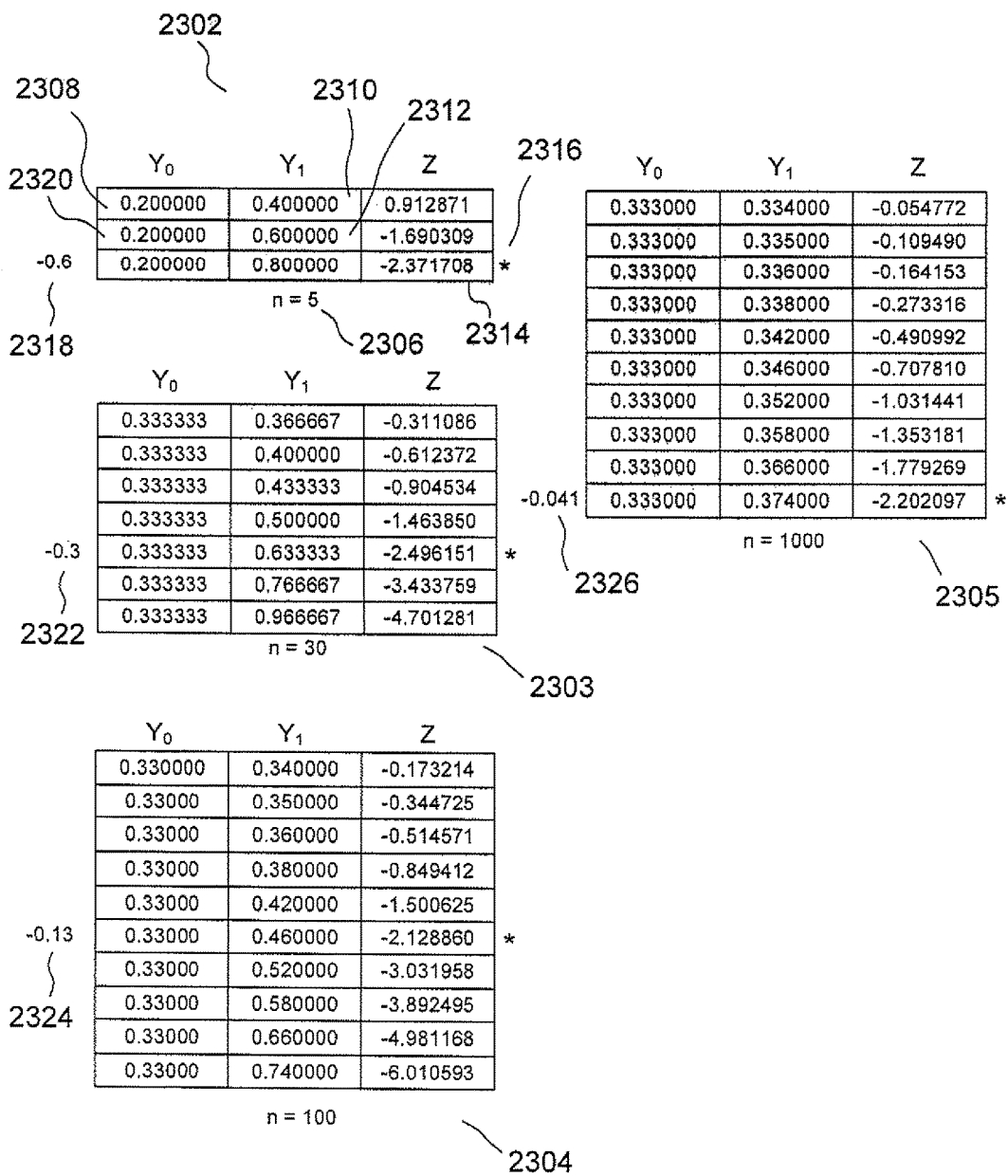
FIG. 23 illustrates the need for collecting adequate data, during the testing of web-page variants, in order to make statistically meaningful decisions with respect to the relative performance of two or more web-page variants.

FIG. 23 illustrates the need for collecting adequate data, during the testing of web-page variants, in order to make statistically meaningful decisions with respect to the relative performance of two or more web-page variants. FIG. 23 shows four tables 2302-2305 that illustrate computed estimates for the test statistic z according to equation 2026 in FIG. 20. For these computations, the number of samples $n_0$ and $n_1$ for the variants 0 and 1, discussed above with reference to FIG. 20, are both equal to the value n. A value for n of 5 was used to compute the z-statistic values in table 2302, as indicated below the table 2306. The value of n increases to 30, 100, and 1000 for tables 2303-2305.

In each table, there are three columns: (1) $Y_0$, the number of positive events for variant 0 observed in the n samples divided by n; (2) $Y_1$, the number of positive events for variant 1 observed in the n samples divided by n; and (3) z, the estimate for the test statistic Z computed according to equation 2026 shown in FIG. 20. The value of $Y_0$ is fixed for each table. The value of $Y_1$ starts, in the first row of each table, with the next-highest possible value above the fixed value for $Y_0$. The values of $Y_1$ increase down the column. For example, in table 2302, the value of $Y_0$ (2308) is fixed at 0.20. Because n is equal to 5, $Y_0$ represents one positive event out of 5 samples. In the above discussion, $Y_0$ is the number of positive events for variant 0 observed in n samples divided by n. Here, in FIG. 23, the values of $Y_0$ and $Y_1$ are given as the ratios of $Y_0$ and $Y_1$ to n. The first value of $Y_1$ 2310 in table 2303 is the ratio of the next highest possible number of positive events, 2, divided by n=5, or 0.40. The second value of $Y_1$ (2312) in table 2302 is the ratio of 3 positive events to the number of samples n, or 0.60.

In each table, the first row with a computed test statistic z less than the critical value −1.96, the lower of the two critical Z values for a hypothesis-testing confidence level of 95%, is associated with an asterisk. For example, in table 2302, the last row 2314 of the table is associated with an asterisk 2316 to indicate that the last row was the first row of the table, when traversed downward, having a computed z value less than the critical Z value −1.96. On the left side of the row associated with an asterisk, a numerical value of the difference between the value of $Y_1$ in the row associated with the asterisk and the value of $Y_1$ in the next highest row is shown, such as the value 0.60 (2318) associated with row 2314 in table 2302. Thus, when the number of samples is 5, the hypothesis test is able to determine that, when the difference between $Y_1$ and $Y_0$ for variants 0 and 1 is 0.6, the probability for the occurrence of a positive event for variant 0 is different than the probability of the occurrence of a positive event for variant 1. However, as shown in the second row 2320 in table 2302, when the number of samples is 5, the hypothesis test is unable to determine that, when the difference between $Y_1$ and $Y_0$ is 0.4, the probabilities of the occurrence of a positive event for the two variants are not equal. The value 0.4 represents a 40% difference in the estimated probabilities for the occurrence of a positive event for variants 0 and 1. This test would be almost certainly inadequate for web-page testing.

However, when the number of samples n is increased to 30, the hypothesis test is able to discriminate between $Y_1$ and $Y_0$ values that differ by 0.3 (2322). When the number of samples n increases to 100, the hypothesis test is able to discriminate between $Y_1$ and $Y_0$ values that differ by only 0.13 (2324). Finally, when the number of samples n is 1000, the hypothesis test is able to discriminate between $Y_1$ and $Y_0$ values that differ by only 0.041 (2326), or less than 5%. Clearly, the increase in sensitivity of hypothesis testing with the increase in the number of samples is not linear, but instead falls off exponentially. In many types of web-page testing, as well as testing of other types of entities, it may be desired to distinguish between variants that differ in the ratio of positive events to total samples by less than 5%. In certain cases, for example, even a 2% difference, if statistically meaningful, would justify using a variant with the greatest ratio of positive events to total samples rather than a currently used web page with a lower ratio. Such testing sensitivity generally involves a very large sample size in order to make a sound, statistically based decision. It would not be unusual for each variant needing to be sampled 20,000 or more times during web-page testing in order to provide sufficient sensitivity to distinguish differences in the probabilities of the occurrences of positive events based on relatively small differences in the ratio of the number of positive events to total samples observed among the different variants. It would also not be unusual for the number of variants to be a relatively large number, from 20 to several hundred or more variants. As a result, an exhaustive combinatorial test, as described above with reference to FIG. 16, could involve very large sample sizes, very large testing times, and a correspondingly large expenditure in computational resources. Even when orthogonal arrays are used, the sample sizes, testing times, and expenditures of computational resources may be large and onerous.

Figure 24A:
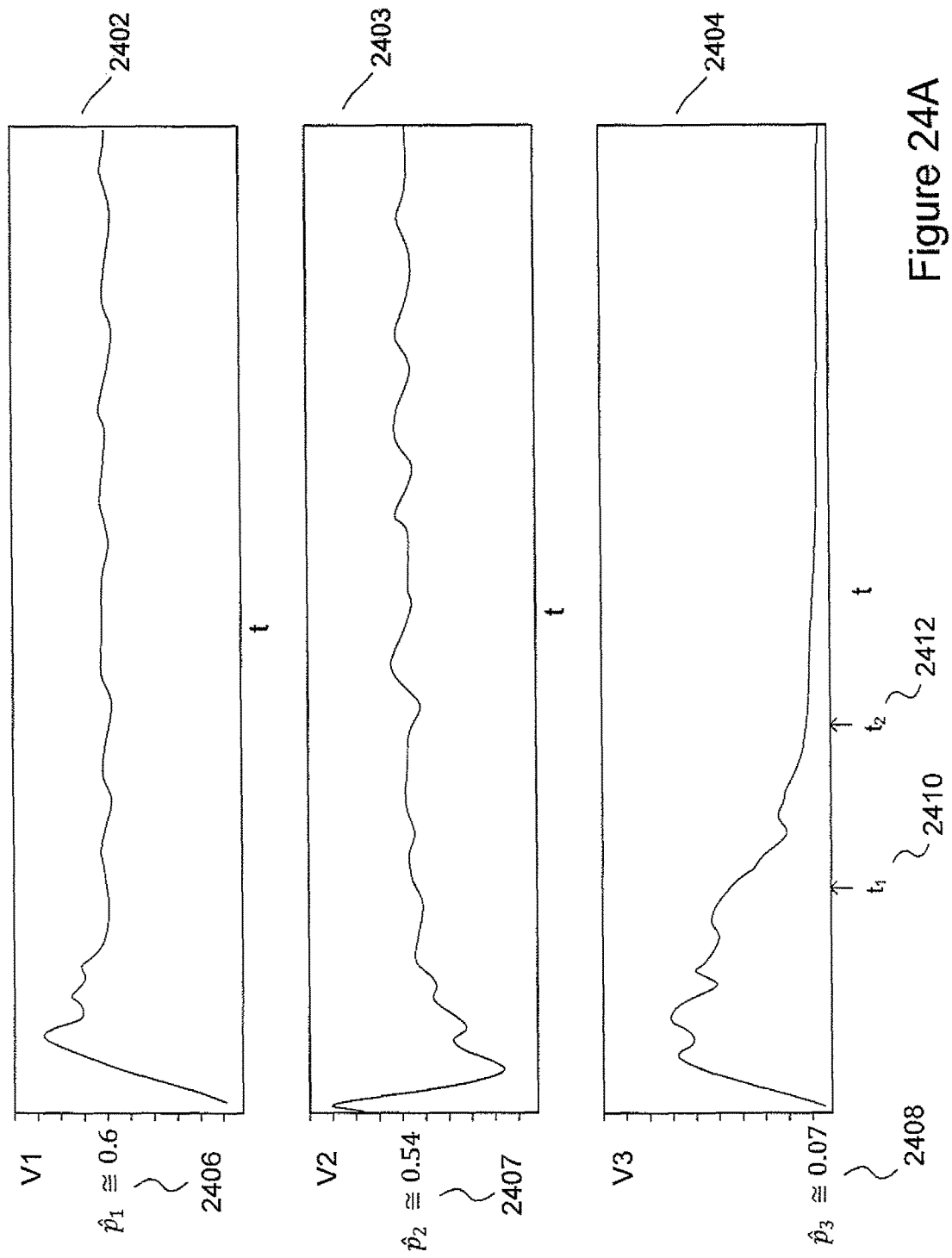
Figure 24B:
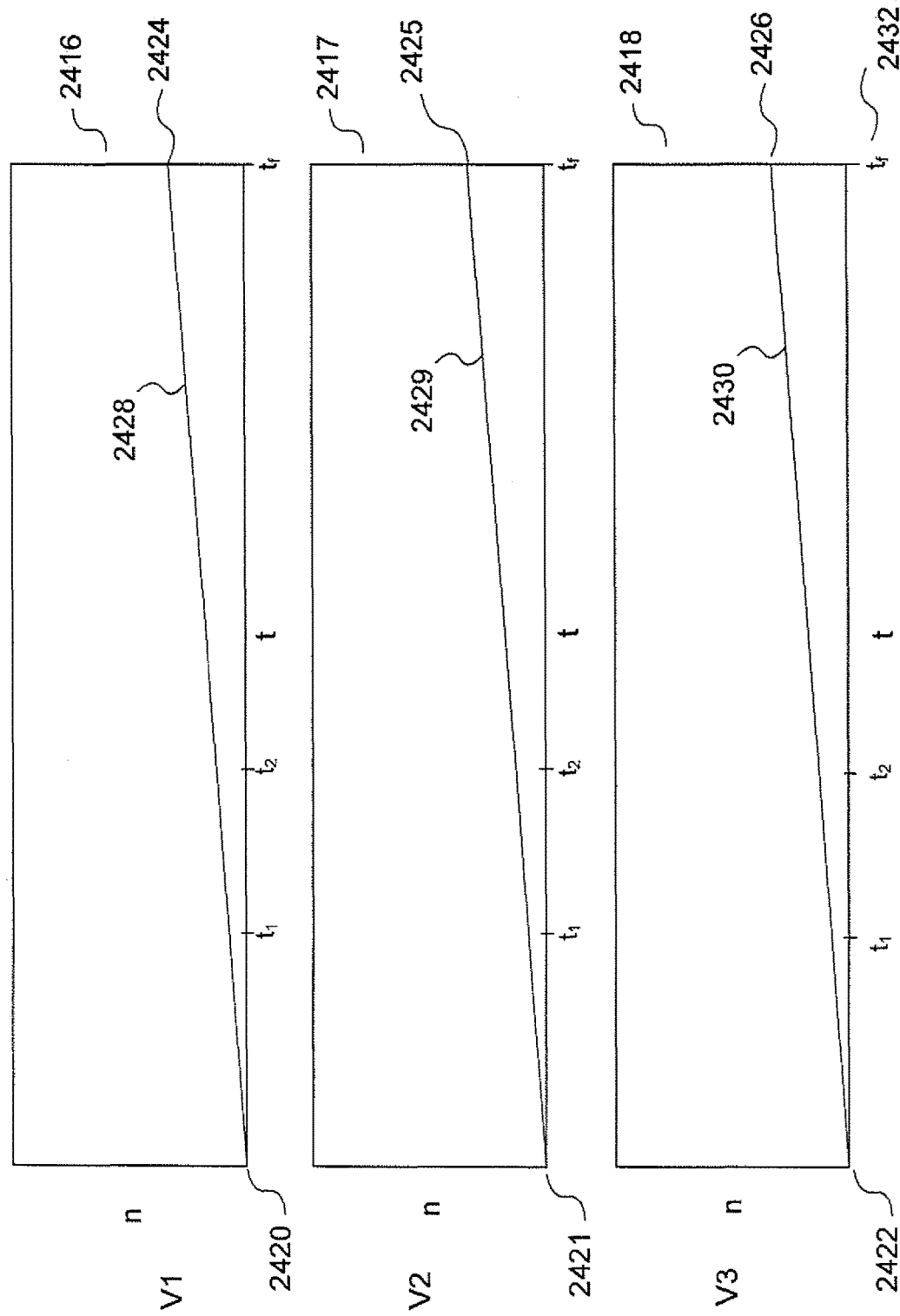

FIGS. 24A-C illustrate a problem with currently practiced web-page testing and a new method for web-page testing that more efficiently utilizes computational and temporal resources to select a best variant from among multiple variants under test. In FIG. 24A, plots of $$\frac{e}{n}$$

curves for three variants 2402-2404 are shown using illustration conventions similar to those previously used in FIG. 18. After initial erratic and unstable periods, the $$\frac{e}{n}$$

curves in all three plots settle into relatively stable forms that appear to be indicative of the estimated probabilities for the occurrences of a positive event for all three variants. The estimated probability 2406 for variant V1 is 0.6, the estimated probability 2407 for variant V2 is 0.59, and estimated probability 2408 for variant V3 is 0.07. Clearly, it would appear that there is only a small relative difference in the estimated probabilities for variants V1 and V2, on the order of 1%, while there is a relatively large difference between the estimated probabilities for variants V1 and V2 and the estimated probability for the third variant V3, on the order of 50%. In deciding between a selection of variant V1 or variant of V2 as the best variant, it is quite possible that many tens of thousands of samples may be needed for each, since the difference in the estimated probabilities for variants V1 and V2 is only 1%. However, it is likely that variant V3 could have been rejected as early as time point $t_1$ 2410 and almost certainly by time point t2 2412.

In many currently practiced web-page-testing methods and systems, as shown in FIG. 24B, the number of accesses to each web-page variant is approximately equal for all web-page variants over the entire course of web-page testing. The three plots 2416-2418 in FIG. 24B shows the number of samples obtained as a function of time for the three variants V1-V3. All three plots start out with the number of samples n equal to 0 (2420-2422) and, at a final time value $t_f$, all three plots end with an approximately common final number of samples 2424-2426. The slopes of the three linear curves 2428-2430, which each represents the increase in the number of samples for a particular variant over time, are essentially identical. Comparing the plots shown in FIG. 24B with the plots shown in FIG. 24A reveals that it would be more computationally efficient and more temporally efficient to increase the rate of sampling for variants V1 and V2 and decrease the rate of sampling for variant V3 as soon as it becomes apparent, either at time $t_1$ (2410) or at time $t_2$ (2412) that variant V3 is sufficiently lagging behind variants 1 and 2 in the estimated probability of the occurrence of a positive event to be likely to be rejected as a contender for best variant.

FIG. 24C illustrates the general approach of the new testing method, disclosed in the current document, for more efficiently using computational and temporal resources of a web-page testing system and the web-page serving system under test to collect data in order to select a best variant from among multiple variants. The duration of a web-page test may profoundly affect a web-site owner. Web-page testing consumes computational resources of both the testing system and the computing system that serves the web page. During web-page testing, a web-site owner may suffer sub-optimal web-site performance due to many users receiving non-optimal web-page variants. Long testing durations represent significant decreases the response time for updating a website based on testing results, which in turn may represent a decrease in web-site performance. Web-page testing may, in some cases, introduce unintended problems and security vulnerabilities. For these and many other reasons, it is desirable to web-site owners and other entities commissioning web-page testing for the duration of web-page testing to be as short as possible while providing statistically meaningful results that can be used to make statistically justifiable modifications to a web site.

The three plots 2440-2442 in FIG. 24C show curves representing the increase in the number of samples over time for each of the three web-page variants V1-V3, as in FIG. 24B. However, in FIG. 24C, the sample-size-increase curves reflect the currently disclosed, more efficient testing method. As in the currently practiced testing method illustrated in FIG. 24B, the increase in the number of samples during an initial period 2444 between time 0 and time $t_1$ 2445 is uniform. However, in the new, more efficient method, at time $t_1$, the distribution of web-page accesses among the three variants changes from a uniform distribution to a nonuniform distribution. The slopes of sample-number curve segments 2446 and 2448 both increase, reflecting an increase in the rate of web-page-access distribution to web-page variants V1 and V2 while the slope of sample-number curve segment 2450 decreases, reflecting a decrease in the rate of web-page-access distribution to web-page variant V3. At time point $t_2$ 2452, the slopes of sample-number curve segments 2454 and 2456 again increase while the slope of sample-number curve segment 2458 further decreases. At this point, most of the web-page accesses are distributed to web-page variants V1 and V2 and only a few of the web-page accesses are distributed to variant V3. All of the sample-number curve segments continue to have positive slopes, because it is desirable for a small number of web-page accesses to be distributed to even likely-to-be-rejected web-page variants in the case that test-environment conditions change and/or user preferences change, during the course of web-page testing, as a result of which a higher rate of positive-event occurrence is then observed for one or more of the previously rejectable web-page variants. In other words, no web-page variant is prematurely rejected, but until there is an indication that uncompetitive web-page variants may again become competitive, the majority of web-page accesses are distributed to the most competitive web-page variants so that a sufficient number of samples are quickly accumulated for the most competitive events to allow for a statistically meaningful discrimination between observed positive-event-occurrence rates for the most competitive events.

In FIG. 24B, the final time point of the test is denoted $t_f$ 2432. In FIG. 24C, at the point $t'_f$ 2460, as many samples have been collected for variants V1 and V2 by the new, more efficient testing method as were collected at time point $t_f$ 2432 by the less efficient testing method illustrated in FIG. 24B. A fewer number of samples has been collected at time point $t'_f$ in FIG. 24C for variant V3 than were collected at time point $t_f$ for variant V3 in FIG. 24B. The new, more efficient method, illustrated in FIG. 24C, has directed a larger fraction of the web-page accesses to variants V1 and V2 than distributed to variants V1 and V2 by the less efficient, currently practiced testing method illustrated in FIG. 24B. Had sufficient data been collected at time point $t_f$ 2432 in FIG. 24B to make a statistically meaningful selection between variants V1 and V2 by the less efficient testing method, then, at time point $t'_f$ 2460 in FIG. 24C, a statistically meaningful selection between variants V1 and V2 can also be made. Thus, using the new, more efficient testing method, the duration of the test can be shortened by a time corresponding to the time-axis segment 2462. Furthermore, fewer computational resources have been expended on testing web-page variant V3 by the new, improved method than by the less efficient testing method. In the case that, for example, there are 100 variants, only between two and five of which are competitive according to observations made during a web-page test, the new, more efficient testing method may realize much greater reductions in test durations and much smaller expenditures of computational resources than the reductions shown in FIGS. 24B-C.

Figure 25:
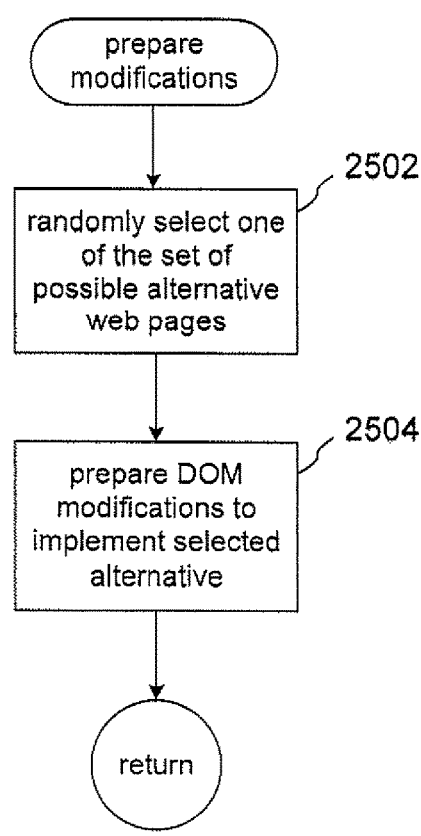
FIGS. 25-26C illustrate modifications to the control-flow diagrams.
Figure 26A:
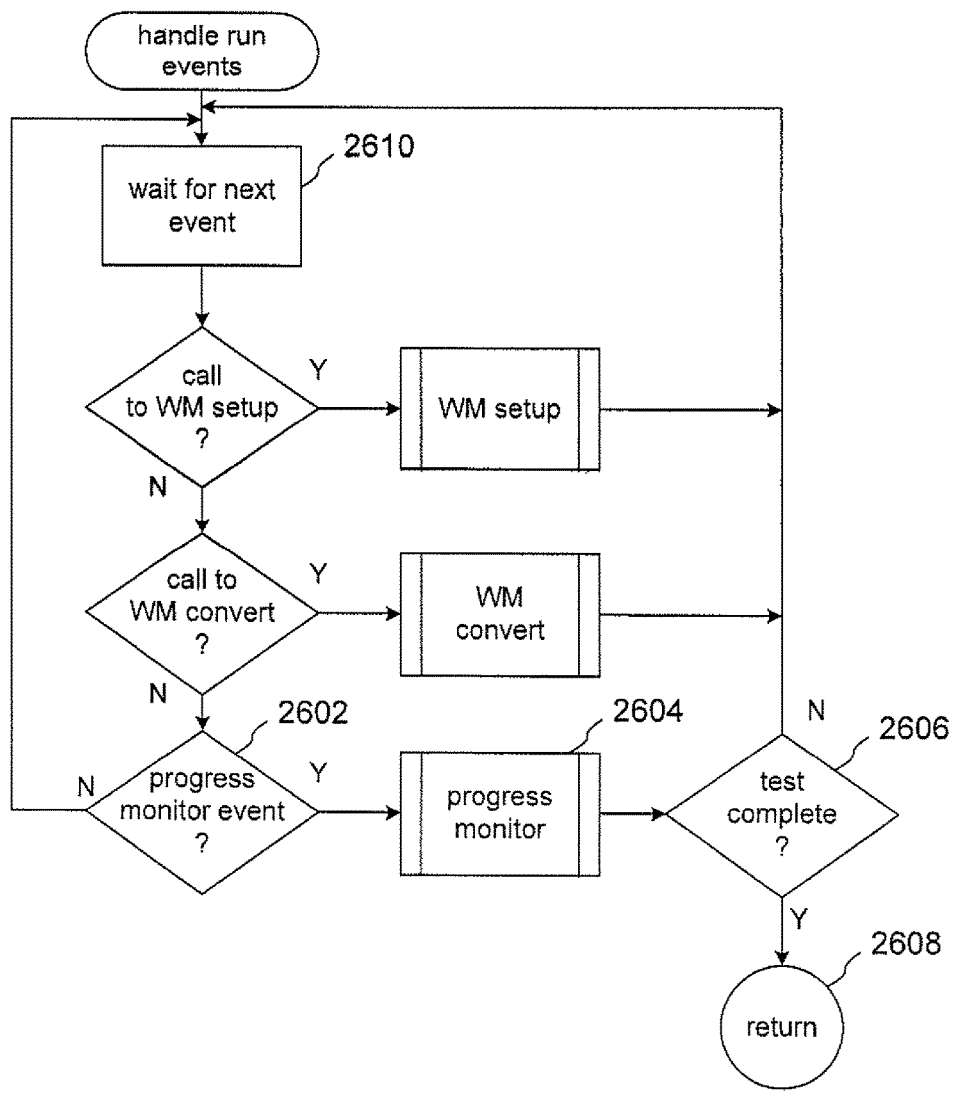
Figure 26B:
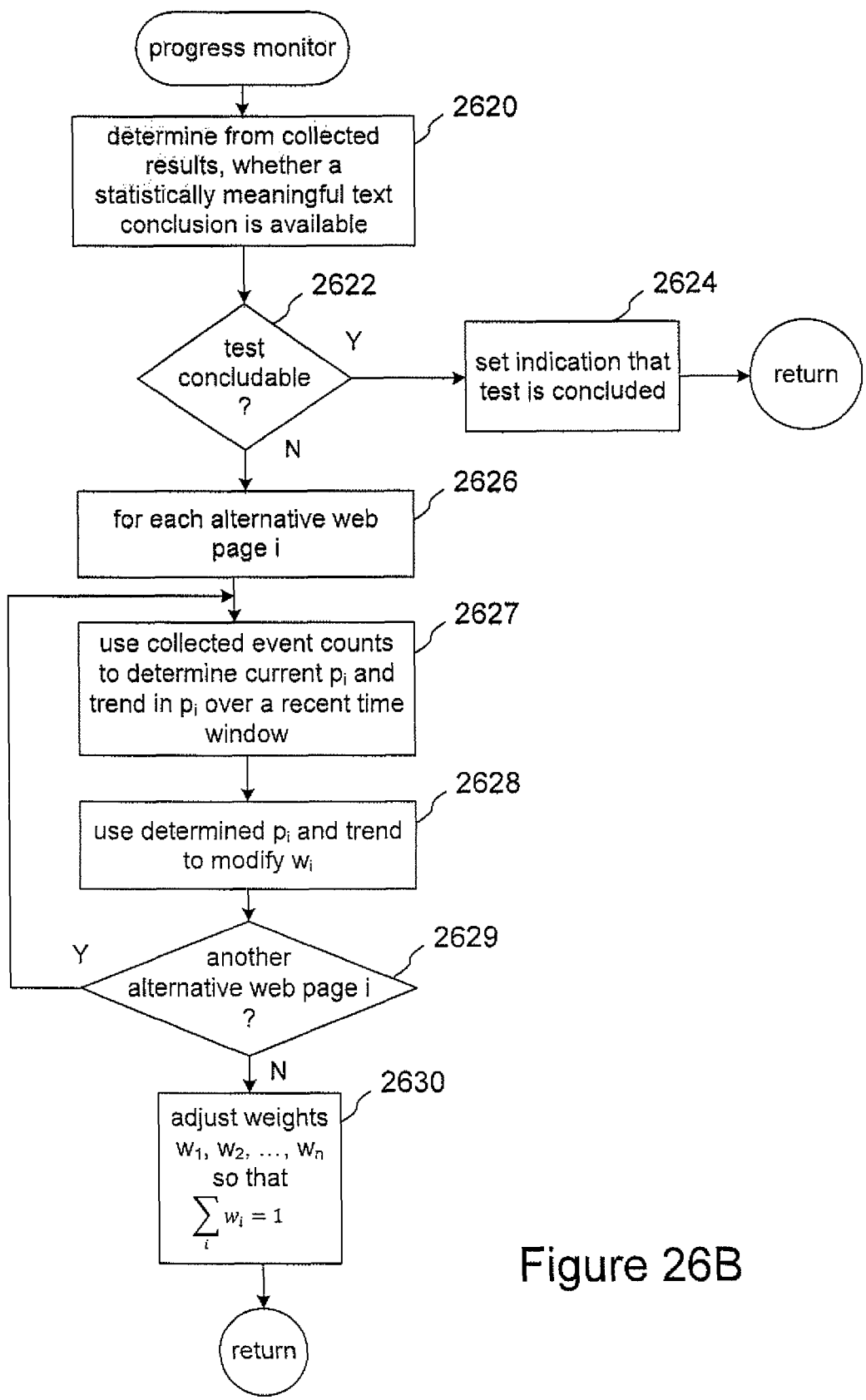
Figure 26C:
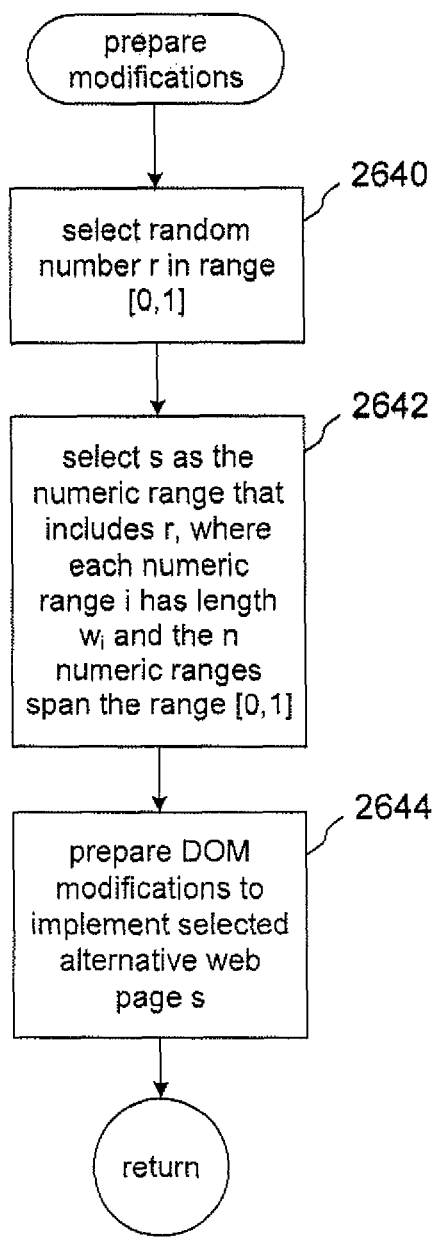

FIGS. 25-26C illustrate modifications to the control-flow diagrams discussed in the previous subsection that implement the new, more efficient testing method discussed above with reference to FIGS. 24A-C. FIG. 25 shows a control-flow diagram that expands step 1388 in FIG. 13G, discussed above in the previous subsection. In step 2502, the expanded prepare-modifications step randomly selects one of the set of possible alternative web pages, or variants. Then, in step 2504, the expanded prepare-modifications step carries out the DOM modifications needed to implement the selected variant.

FIG. 26 a provides a control-flow diagram for an alternative version of the routine "handle run events," previously shown in FIG. 13F. In this alternative version of the routine "handle run events," an additional event is detected, in step 2602, and handled by a call to a "progress monitor" event handler 2604. When the test is deemed complete by the progress-monitor event handler, as determined in step 2606, the routine "handle run events" returns, in step 2608. Otherwise, control flows back to step 2610, where the routine "handle run events" waits for the occurrence of a next event. In the alternative version of the routine "handle run events," the routine "handle run events" periodically or intermittently monitors the progress of the test and, upon determining that the test is complete, stops the test. A progress-monitor event may occur as a result of a timer expiration, in certain implementations, and is periodically or intermittently elicited in other ways, in other implementations.

FIG. 26B provides a control-flow diagram for the handler routine "progress monitor," called in step 2604 of FIG. 26A. In step 2620, the routine "progress monitor" determines, from already accumulated data, whether a statistically meaningful conclusion can be made for the testing hypothesis. When the test is conclusive, as determined in step 2622, the routine "progress monitor" sets an indication that the test is concluded in memory, in step 2624, and then returns. The indication may include an indication of the best variant detected in the test, in certain implementations. Otherwise, in the for-loop of steps 2626-2629, each variant i is considered. In step 2627, the data accumulated for variant i is used to determine a current estimate of the probability of the occurrence of a positive event, $\hat{p}_i$, for the variant i as well as, in certain implementations, the current trend in $\hat{p}_i$ value over a recent time window. In step 2628, the determined estimate for $p_i$ and the current trend in $\hat{p}_i$ is used to modify a weight $w_i$ for variant i. When the weights for all variants have been modified, in the for-loop of steps 2626-2629, the weights are adjusted, in step 2630, so that the sum of weights is 1.0.

FIG. 26C provides a control-flow diagram for an alternative version the extended step "prepare modifications," shown in FIG. 25. This alternative version of the extended step "prepare modifications" implements, in part, the currently disclosed improved testing. In step 2640, the extended step "prepare modifications" selects a random number r in the range [0, 1]. In step 2642, the routine "prepare modifications" selects a numeric range s that includes the selected random number r. A set of numeric ranges are constructed within the range [0, 1] so that each numeric range has a length equal to the weight of a corresponding variant. In this way, the randomly selected random number r is used to select, in a random fashion, the variant corresponding to numeric range s, referred to as "variant s," with the probability of selection of any particular variant proportional to the weight $w_i$ assigned to that variant. Initially, in certain implementations, all the variants are assigned a common weight, such as $$\frac{1}{n}.$$

However, as discussed above with reference to FIG. 26B, the weights are periodically modified by the routine "progress monitor" in order to nonuniformly distribute web-page accesses among variants, as discussed above with reference to FIG. 24C. Finally, in step 2644, DOM modifications are made to implement the selected variant.

Figure 27A:
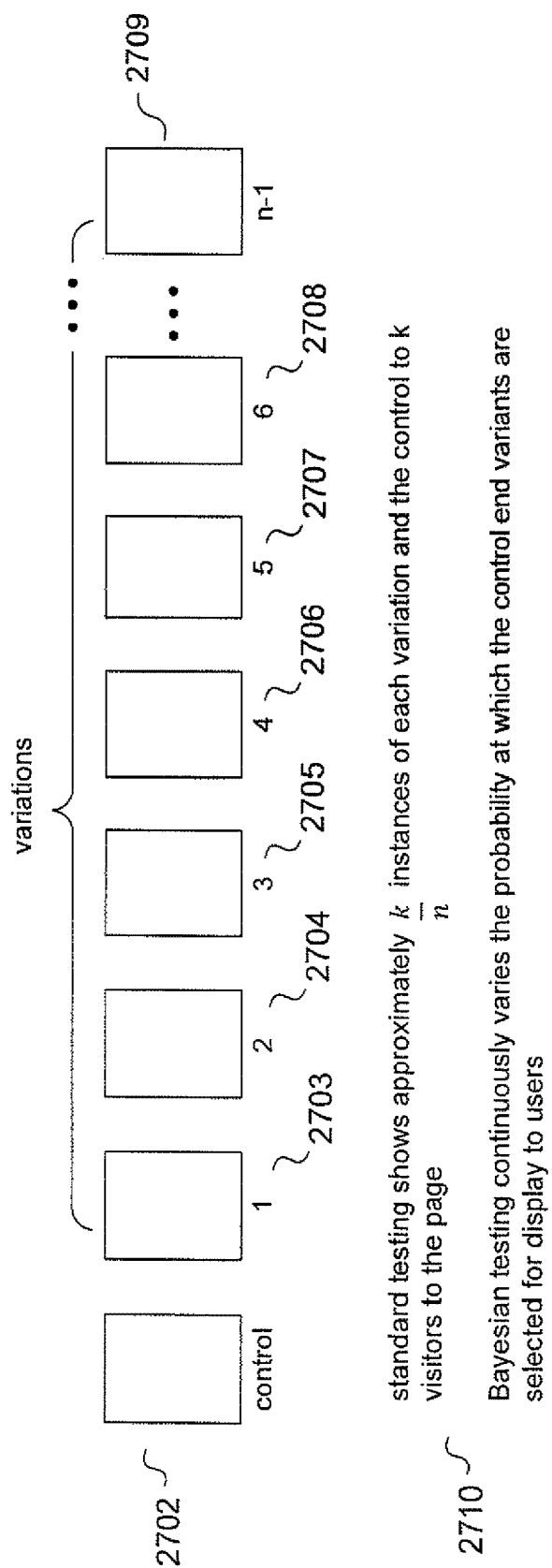

Next, a detailed discussion of the methods used, in one implementation, to monitor test progress and to modify the weights assigned to variants that control nonuniform distribution of web-page accesses to the variants during a web-page test is provided with references to FIGS. 27A-33B. FIGS. 27A-B provide an overview of the Bayesian-probability-based approach used in one implementation of the currently described testing method. As shown in FIG. 27A, each web-page test often involves a control web page 2702 and n−1 variants 2703-2709. The control is often the current web page used within a website and, as discussed above, the variants represent modifications of the currently used web page. For discussion purposes, the control may be viewed as one of and variants under test during a web-page test, so that, rather than explicitly mentioning a control and n−1 variants, the discussion generally refers to n variants, one of which is the control. As indicated in the text 2710 in FIG. 27A, standard, currently available testing methods distributes approximately $$\frac{k}{n}$$

of the accesses to a web page under test to each of the n variants, where k is the number of visitors that access the web page during testing. Accesses to the web page are, in the context of web-page testing, samples, with the accesses distributed to a particular variant web-page i comprising the samples for variant i. In the new, currently described method, a Bayesian approach is used to continuously or periodically vary the probabilities that each of the variants are selected for display to web-page accessors during testing.

FIG. 27B shows a fundamental equation of Bayesian probability and inference. The equation 2712 relates a posterior probability 2714 to a prior probability 2716 based on evidence collected subsequent to determination of the prior probability. In this equation, H is a hypothesis, such as a hypothesis that probability of the occurrence of a positive event for a particular web-page variant i is greater than that for a different web-page variant j. E represents the evidence or, in other words, new data collected following determination of the prior probability. The prior probability is an estimate of the probability, or likelihood, of the hypothesis being true prior to observation and accumulation of the new data E. The posterior probability is an estimated probability of the truth of hypothesis H that includes consideration of the new data E. The factor P(E/H) is the probability of observing the new data E given that the hypothesis His true, often referred to as the "data likelihood." The probability P(E) is the unconditional probability of observing the new data E. Equation 2712 provides a basis for periodic readjustment of an estimated probability that a hypothesis is true based on periodically observed new data.

Figure 28:
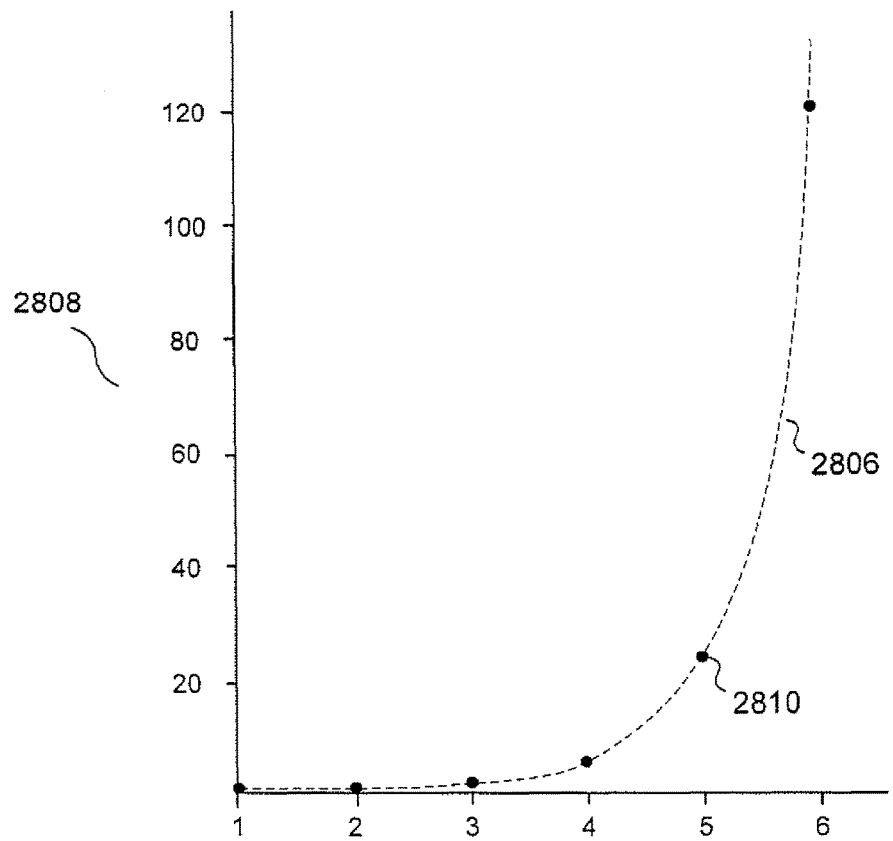
FIG. 28 illustrates the Gamma function, $\Gamma$.

FIG. 28 illustrates the Gamma function, Γ. For positive-integer arguments n, the value returned by the Gamma function is defined to be the factorial of n−1 2802. However, the Gamma function is further defined for complex numbers, which include the real numbers, by expression 2804. In the case of positive real numbers greater than or equal to 1, the Gamma function can be thought of as creating a continuous curve, shown in FIG. 28 as a dashed curve 2806 in plot 2008, that includes the values for the Gamma function for positive integers, shown in FIG. 28 as discrete points, such as discrete point 2810.

Figure 29:
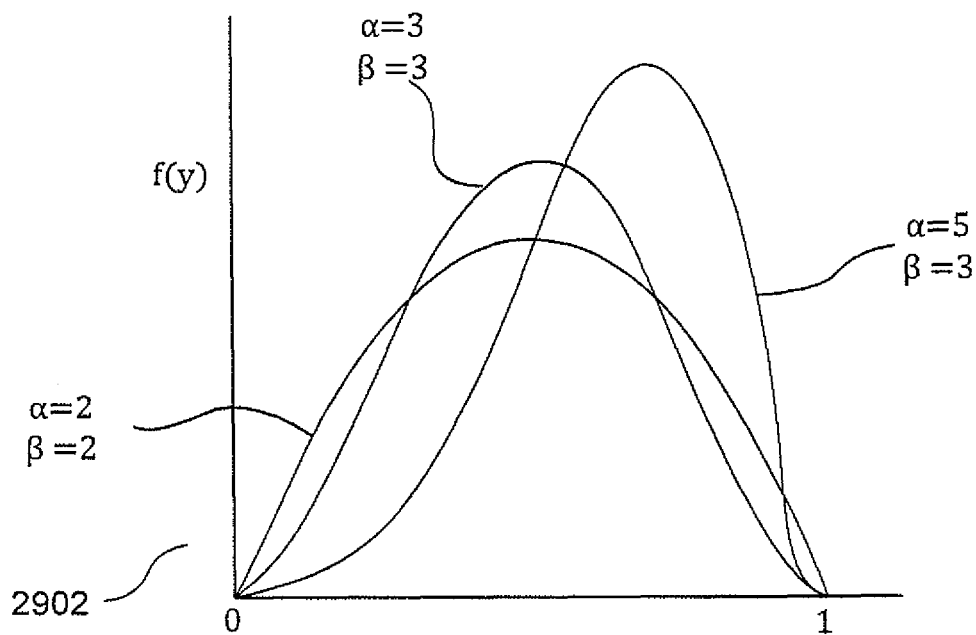
FIG. 29 illustrates the beta distribution.

FIG. 29 illustrates the beta distribution. At the top of FIG. 29, FIG. 29 shows a plot 2902 of three curves representing the beta-distribution probability density function for three different sets of beta-distribution parameters α and β2902. The probability distribution function for the beta distribution is defined by equations 2904 and 2905. The parameters α and β are referred to as "hyperparameters" for the beta distribution. As indicated in equation 2904, the support for the beta distribution is the real-number range [0, 1]. Expression 2908 in FIG. 29 represents the cumulative distribution function for the beta distribution. In the methods discussed below, the beta distribution is used to model the prior and posterior probabilities for various hypotheses. In one example, discussed below, the parameter α is set to the number of positive events that are observed for a particular variant and the parameter β is set to the number of non-positive events observed for the particular variant to model the probability density function for the positive-event-occurrence rate for the particular variant.

In one method for adjusting weights associated with variants to control the distribution of web-page accesses to the variants during testing, or, in other words, to control the sampling rates for the variants, the probability that the number of positive events observed for a variant $s_i$ is equal to a specific number within the range $[0, v_i]$ is modeled by the binomial distribution, expressed as equation 3002 in FIG. 30. The value $r_i$ is the positive-event rate. In the case that positive events are conversions, the number $r_i$ is the conversion rate for a variant. The prior probability for the positive-event rate is modeled using the beta distribution, as expressed by equation 3004 in FIG. 30. The posterior probability for the positive-event rate is also modeled by a beta distribution, as shown in expression 3006 in FIG. 30. The posterior probability is an updated estimate of the positive-event rate that incorporates the prior and a new number of positive events $x_i$ for a new member of web-page accesses $v_i$ to variant i. Equations 3004 and 3006 form the basis of a continuous, periodic, or intermittent update of the weights assigned to variants to control the nonuniform distribution of web accesses to variants during testing. The weights assigned to the variants are proportional to the currently estimated probability, for each variant i, that the positive-event rate for variant i is greater than that for the other variants. In other words, the weight corresponds to the probability that a value drawn from that variant's posterior distribution is larger than a sample drawn from any of the other variants' posterior distributions.

Figure 31:
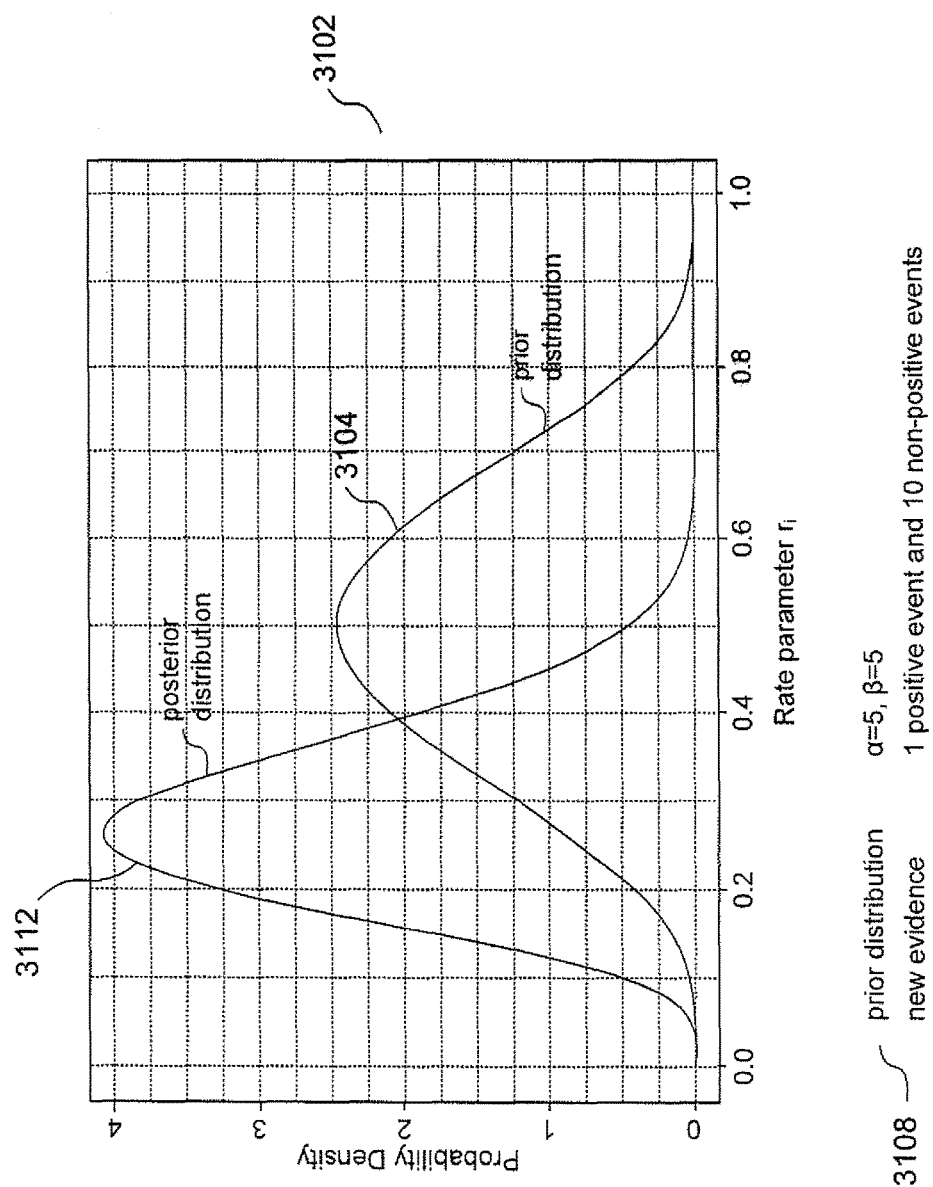
FIG. 31 illustrates the effects of new evidence on the estimated probability density function for the positive-event-occurrence rate for a web page variant.

FIG. 31 illustrates the effects of new evidence on the estimated probability density function for the positive-event-occurrence rate for a web page variant. In FIG. 31, two distributions are plotted in plot 3102. The prior distribution 3104 is based on an initial observation of the occurrence of five positive events in 10 samples for a web-page variant. Then, additional data, or new evidence, is obtained 3108. The new evidence is the observation of one additional positive event in 11 new samples. The posterior distribution is then computed 3110 based on the prior distribution and on the new evidence. The graph of the posterior distribution 3112 shows that the mean value has shifted with respect to the mean value of the prior distribution 3104 and that the posterior distribution has narrowed about the mean with respect to the prior distribution. The shift of the mean of the posterior distribution with respect to the prior distribution reflects the fact that the new evidence indicates that the actual positive-event-occurrence rate is lower than originally estimated. The narrowing of the posterior distribution reflects an overall reduction in the variance due to a larger number of samples.

FIG. 32 illustrates computation of an estimate for the probability that the posterior positive-event rate $p'_i$ for a web-page variant i is greater than the posterior positive-event rates $p'_j$ for the other web-page variants j under test. The probability that the posterior positive-event rate for variant i is greater than those for the other variants j is computed as indicated by expressions 3202 in FIG. 32. The final expression 3204 is seen to be a product of factors that are each computed as an integration of the product of the beta-distribution cumulative density function and the posterior probability based on the beta function. In one implementation of the currently described method, new estimates for the probability that the posterior positive-event rate for variant i is greater than that for the other variants j, $p'_i$, are computed for each variant i and used as one component of a vector 3206 that includes the computed new estimates p' for the control and the n−1 variants in a web-page test. This vector is referred to as $P_{init}$. In the currently described implementation, the components of this vector are modified to produce the vector $P_{final}$. This is because any of the estimated probabilities p' for the variants may fall to extreme values such as 0 and 1. This would have the effect of halting distribution of web-page accesses to variants with estimated p' equal to 0 or to values close to 0 and directing all web-page accesses to a variant with an estimated p' equal to or close to the value 1. As discussed above with reference to FIG. 24C, it is desirable for the rate of sample-size increase to have a positive value for all variants during a web-page test. In order to accomplish this, and to accomplish the desired nonuniform distribution based on estimated p' values, two constraints are defined. The first constraint 3208 is that each estimated probability p' should fall in the range $[\varepsilon_{min}, \varepsilon_{max}]$. The second constraint 3210 is that the sum of the estimated probabilities p' is 1.0. Conversion of $P_{init}$ to $P_{final}$ is therefore carried out by an optimization method 3212. Any of various optimization methods, such as various gradient-based descent optimizations, can be used to optimize the components of vector $P_{init}$ defined by expression 3214 FIG. 32. The optimization minimizes the sum of adjustments $z_i$ made to the initial estimated probabilities $p'_i$ subject to the above-discussed constraints 3208 and 3210.

Figure 33A:
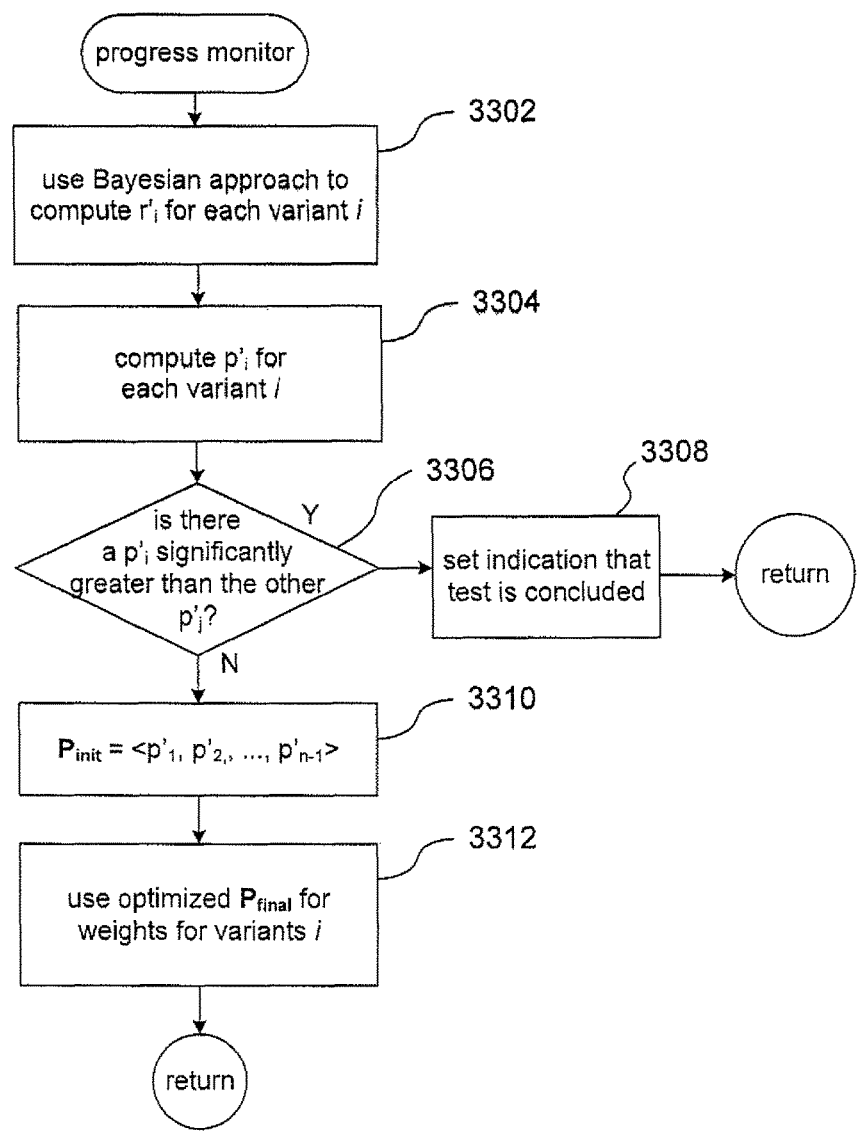
FIG. 33A-B summarize the Bayesian approach to weight adjustment.
Figure 33B:
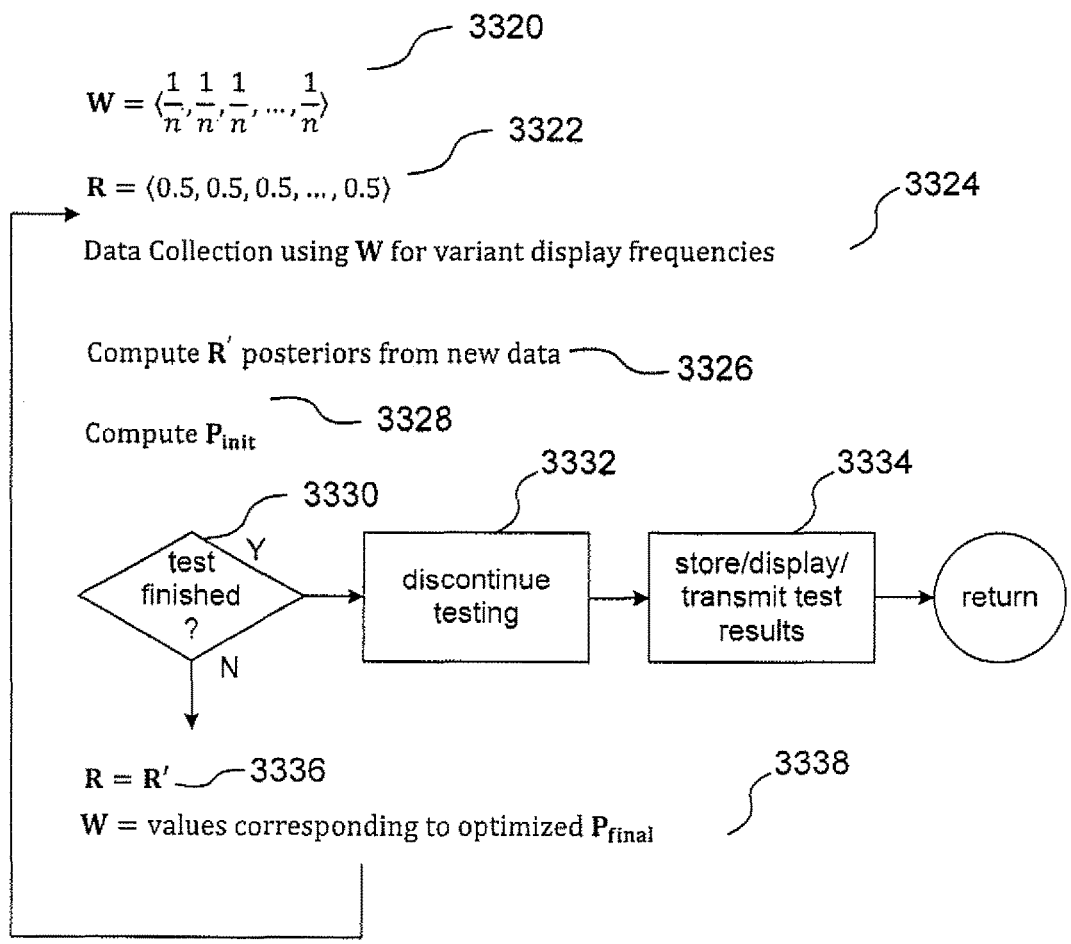

FIG. 33A-B summarize the Bayesian approach to weight adjustment, discussed above. FIG. 33A provides an alternative version of the routine "progress monitor," a control-flow diagram for a previous version of which is shown in FIG. 26B. The updated "progress monitor" routine incorporates the Bayesian approach to weight adjustment used in the currently described implementation. In step 3302, the routine "progress monitor" uses the Bayesian approach, discussed above with reference to FIG. 30, to compute prior positive-event rate $r_i$ for each variant i. Then, in step 3304, the routine "progress monitor" computes, for each of the variants, an estimated probability $p'_i$, the probability that the posterior positive-event rate $r_i$ for variant i is greater than the posterior positive-event rates of the other variants. In step 3306, the routine "progress monitor" determines whether there are grounds to end the test. For example, in certain implementations, when a sufficient number of samples have been collected for each of the variants and when one of the variants has an estimated $p'_i$ greater than those of each of the other variants by at least a threshold margin, the test may be ended. When the test is ended, the routine "progress monitor" sets an indication that the test is concluded, in step 3308. Otherwise, the vector $P_{init}$ is created, in step 3310, and, in step 3312, the vector $P_{init}$ is optimized to produce the vector $P_{final}$. Components of this vector are the new weights assigned to each of the variants.

FIG. 33B provides a different representation of the currently described detailed method for reassigning weights to variants. Initially, the weights for the variants, components of vector W, are uniformly assigned to be $$\frac{1}{n} 3320.$$

In similar fashion, the current estimated positive-event rates for the variants are assigned to be a common value, such as the value 0.5, and are used as the components of vector R (3322). Then, data collection ensues for the variants using the weights in vector W to control the display frequencies for the variants 3324. At the next monitoring time point, the posterior positive-event rates are computed, using the Bayesian method, based on the new data and used as components of vector R' 3326. The new posterior positive-event rates are then used to compute the vector $P_{init}$ 3328. Then, one or more criteria are used to decide whether or not the test is finished 3330. When the test is finished, testing is discontinued 3332 and the results of the test are stored, displayed, and/or transmitted to remote systems by the testing system 3334. Otherwise, when the test continues, the vector R is updated to the value stored in the vector R' 3336 and the vector W is updated to have values corresponding to the values in the optimized vector $P_{final}$ 3338.

Although the present invention has been described in terms of particular embodiments, it is not intended that the invention be limited to these embodiments. Modifications will be apparent to those skilled in the art. For example, many different alternative embodiments of the testing service can be implemented by varying software-implementation parameters, including choice of programming languages, operating systems, control structures, data structures, modular organization, and by varying other such parameters. Alternative embodiments may provide for enhanced testing services and functionality, and may use a variety of different analytics packages and report-generation tools for processing collected data. The above-described techniques for virtual incorporation of the testing service into a client web server can be also employed for non-testing applications, including automated generation and display of advertising, automated display of rapidly changing information, and other applications in which web pages need to be dynamically modified and provided to users. As discussed above, different implementations may use different methods for determining when to terminate a test and different methods to modify weights that control the distribution of web-page accesses among variants.

The foregoing description, for purposes of explanation, used specific nomenclature to provide a thorough understanding of the invention. However, it will be apparent to one skilled in the art that the specific details are not required in order to practice the invention. The foregoing descriptions of specific implementations are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A testing service comprising:
one or more testing-service computer systems connected to the Internet that
execute testing-service routines,
maintain one or more databases,
receive requests for modifications to a data-object-model representation of a web page under test from user computers, and
respond to a received request by selecting a web-page variant using a probability-based weight associated with the web-page variant and transferring, to the user computer from which the request was received, modifications to the data-object-model representation of the web page under test that direct a browser on the user computer to display the selected web-page variant; and
a client web server that serves web pages to users, the client web server storing a library of routines downloaded to the client web server by the testing service and storing encodings of web pages, the encoding of each web page tested by the testing service including modifications that direct a user's web browser to download the library of routines from the client web server and to request modifications to a data-object-model representation of the web page by calling a script-library routine.

2. The testing service of claim 1 wherein selecting a web-page variant using a probability-based weight associated with the web-page variant further comprises:
ordering two or more web-page variants and their associated probability-based weights as line segments that span a segment of the real-number line between a first real number and a second real number;
randomly selecting a real number in the inclusive range defined by the first and second real numbers; and
selecting the variant corresponding to the line segment corresponding to the randomly selected real number.

3. The testing service of claim 1 wherein the testing service monitors progress of testing of the web page to determine whether or not to terminate testing and, when testing is not terminated, to adjust the probability-based weights associated with two or more web-page variants from which the web-page variant is selected using the probability-based weight associated with the web-page variant.

4. The testing service of claim 3 wherein the testing service monitors progress of testing of the web page on one of:
a continuous basis, as part of servicing each request for modifications to the data-object-model representation of the web page;
a continuous basis, as part of servicing every nth request for modifications to the data-object-model representation of the web page, where n is an integer greater or equal to 2;
an intermittent basis, in response to occurrences of one or more events; and
on a periodic basis, at regular time intervals.

5. The testing service of claim 3 wherein, during monitoring of the progress of testing the web page, the testing service:
uses a set of current probability-based weights, each current probability-based weight uniquely associated a web-page variant, represented by a vector of weights W, a set of current positive-event-occurrence ratios, each positive-event-occurrence ratio uniquely associated a web-page variant, represented by a vector of positive-event-occurrence ratios R, and new data comprising positive-event-occurrence data collected since a previous, most recent monitoring of the progress of testing the web page, to determine whether or not to terminate testing and, when testing is not terminated, to adjust the probability-based weights associated with two or more web-page variants from which the web-page variant is selected using the probability-based weight associated with the web-page variant.

6. The testing service of claim 5 wherein the testing service determines:
new, posterior positive-event-occurrence ratios for each web-page variant, represented by a vector of positiveevent-occurrence ratios R', using the vector of positive-event-occurrence ratios R and the new data, and a set of estimates, represented by a vector $P_{init}$, one for each web-page variant, each estimate an estimate of the probability that the new, posterior positive-event-occurrence ratio for the web-page variant with which it is associated is greater than the posterior positive-event-occurrence ratios for all other web-page variants, the set of estimates determined using the new, posterior positive-event-occurrence ratios for each web-page variant R'.

7. The testing service of claim 6 wherein, when the estimate in $P_{init}$ for a first web-page variant is greater than the estimates in $P_{init}$ for all other web-page variants, the testing service determines that testing of the web page is terminated.

8. The testing service of claim 6 wherein, when no estimate in $P_{init}$ for a particular web-page variant is greater than the estimates in $P_{init}$ for all other web-page variants, the testing service optimizes $P_{init}$ to generate a corresponding vector $P_{final}$ under a first constraint that each value in $P_{final}$ falls between a minimum value and a maximum value and a second constraint that the sum of the values in $P_{final}$ is equal to 0;

sets R to R'; and sets W to $P_{final}$.

9. The testing service of claim 1 wherein the testing service concurrently tests multiple web pages for multiple client web-page servers.

10. A method that test a web page on behalf of a client web server that serves web pages to users, the method comprising:

providing a testing service that
includes one or more testing-service computer systems that are connected to the Internet and that execute testing-service routines,
maintains one or more databases, and
receives requests for modifications to a data-object-model representation of a web page under test from user computers;

responding, by the testing service, to a received request by selecting a web-page variant using a probability-based weight associated with the web-page variant and transferring, to the user computer from which the request was received, modifications to the data-object-model representation of the web page under test that direct a browser on the user computer to display the selected web-page variant;

storing, by the client web server, a library of routines downloaded to the client web server by the testing service; and storing, by the client web server, encodings of web pages, the encoding of each web page tested by the testing service including modifications that direct a user's web browser to download the library of routines from the client web server and to request modifications to a data-object-model representation of the web page by calling a script-library routine.

11. The method of claim 10 wherein selecting a web-page variant using a probability-based weight associated with the web-page variant further comprises:

ordering two or more web-page variants and their associated probability-based weights as line segments that span a segment of the real-number line between a first real number and a second real number;

randomly selecting a real number in the inclusive range defined by the first and second real numbers; and selecting the variant corresponding to the line segment corresponding to the randomly selected real number.

12. The method of claim 10 wherein the testing service monitors progress of testing of the web page to determine whether or not to terminate testing and, when testing is not terminated, to adjust the probability-based weights associated with two or more web-page variants from which the web-page variant is selected using the probability-based weight associated with the web-page variant.

13. The method of claim 12 wherein the testing service monitors progress of testing of the web page on one of:

a continuous basis, as part of servicing each request for modifications to the data-object-model representation of the web page;

a continuous basis, as part of servicing every nth request for modifications to the data-object-model representation of the web page, where n is an integer greater or equal to 2;

an intermittent basis, in response to occurrences of one or more events; and on a periodic basis, at regular time intervals.

14. The method of claim 12 wherein, during monitoring of the progress of testing the web page, the testing service:

uses a set of current probability-based weights, each current probability-based weight uniquely associated a web-page variant, represented by a vector of weights W, a set of current positive-event-occurrence ratios, each positive-event-occurrence ratio uniquely associated a web-page variant, represented by a vector of positive-event-occurrence ratios R, and new data comprising positive-event-occurrence data collected since a previous, most recent monitoring of the progress of testing the web page, to determine whether or not to terminate testing and, when testing is not terminated, to adjust the probability-based weights associated with two or more web-page variants from which the web-page variant is selected using the probability-based weight associated with the web-page variant.

15. The method of claim 14 wherein the testing service determines:

new, posterior positive-event-occurrence ratios for each web-page variant, represented by a vector of positive-event-occurrence ratios R', using the vector of positive-event-occurrence ratios R and the new data, and a set of estimates, represented by a vector $P_{init}$, one for each web-page variant, each estimate an estimate of the probability that the new, posterior positive-event-occurrence ratio for the web-page variant with which it is associated is greater than the posterior positive-event-occurrence ratios for all other web-page variants, the set of estimates determined using the new, posterior positive-event-occurrence ratios for each web-page variant R'.

16. The method of claim 15 wherein, when the estimate in $P_{init}$ for a first web-page variant is greater than the estimates in $P_{init}$ for all other web-page variants, the testing service determines that testing of the web page is terminated.

17. The method of claim 15 wherein, when no estimate in $P_{init}$ for a particular web-page variant is greater than the estimates in $P_{init}$ for all other web-page variants, the testing service optimizes $P_{init}$ to generate a corresponding vector $P_{final}$ under a first constraint that each value in $P_{final}$ falls between a minimum value and a maximum value and a second constraint that the sum of the values in $P_{final}$ is equal to 0;

sets R to R'; and sets W to $P_{final}$.

18. Computer instructions, stored in one or more memories of a testing service that includes one or more testing-service computer systems that are connected to the Internet and that execute testing-service routines, that maintains one or more databases, and that receives requests for modifications to a data-object-model representation of a web page under test from user computers, that, when executed by one or more of the one or more testing-service computer systems, control the testing service to respond to a received request by selecting a web-page variant using a probability-based weight associated with the web-page variant and transferring, to the user computer from which the request was received, modifications to the data-object-model representation of the web page under test that direct a browser on the user computer to display the selected web-page variant, wherein the web page is served by a client web server that serves web pages to users, the client web server storing a library of routines downloaded to the client web server by the testing service and storing encodings of web pages, the encoding of each web page tested byte testing service including modifications that direct a user's web browser to download the library of routines from the client web server and to request modifications to a data-object-model representation of the web page by calling a script-library routine.

19. The testing service of claim 18 wherein the testing service monitors progress of testing of the web page to determine whether or not to terminate testing and, when testing is not terminated, to adjust the probability-based weights associated with two or more web-page variants from which the web-page variant is selected using the probability-based weight associated with the web-page variant; and wherein the testing service monitors progress of testing of the web page on one of a continuous basis, as part of servicing each request for modifications to the data-object-model representation of the web page;

a continuous basis, as part of servicing every nth request for modifications to the data-object-model representation of the web page, where n is an integer greater or equal to 2;

an intermittent basis, in response to occurrences of one or more events; and on a periodic basis, at regular time intervals.

* * * * *